(12) United States Patent
Seymour et al.

(10) Patent No.: US 11,037,407 B2
(45) Date of Patent: Jun. 15, 2021

(54) ENHANCED GAME RANDOMIZATION WITH MACHINE MAPPING

(71) Applicant: Sockeye Software Development, LLC, Arvada, CO (US)

(72) Inventors: Todd M. Seymour, Arvada, CO (US); Eve Mae Park, Littleton, CO (US)

(73) Assignee: Sockeye Software Development, LLC, Arvada, CO (US)

(*) Notice: Subject to any disclaimer, the term of this patent is extended or adjusted under 35 U.S.C. 154(b) by 0 days.

(21) Appl. No.: 15/681,605

(22) Filed: Aug. 21, 2017

(65) Prior Publication Data

US 2018/0053380 A1 Feb. 22, 2018

Related U.S. Application Data

(60) Provisional application No. 62/377,398, filed on Aug. 19, 2016.

(51) Int. Cl.
| | |
|---|---|
| *G06F 17/00* | (2019.01) |
| *G07F 17/32* | (2006.01) |
| *G06F 3/048* | (2013.01) |
| *A63F 13/00* | (2014.01) |

(52) U.S. Cl.
CPC .......... *G07F 17/3288* (2013.01); *A63F 13/00* (2013.01); *G06F 3/048* (2013.01); *G07F 17/323* (2013.01); *G07F 17/326* (2013.01); *G07F 17/3211* (2013.01); *G07F 17/3227* (2013.01)

(58) Field of Classification Search
CPC . A63F 3/06; A63F 13/00; G07F 17/32; G07F 17/3288; G07F 17/3211; G07F 17/3227; G07F 17/323; G07F 17/326; G06F 3/048
See application file for complete search history.

(56) References Cited

U.S. PATENT DOCUMENTS

| | | | |
|---|---|---|---|
| 9,728,046 B2 | 8/2017 | Forman et al. | |
| 2005/0059469 A1* | 3/2005 | Gail | G07F 17/32 463/19 |
| 2005/0101387 A1* | 5/2005 | Wolf | G07F 17/3286 463/42 |
| 2005/0119042 A1* | 6/2005 | Chamberlain | G07F 17/32 463/19 |
| 2006/0025198 A1* | 2/2006 | Gail | G07F 17/32 463/19 |
| 2006/0058096 A1* | 3/2006 | Lind | G07F 17/32 463/19 |
| 2006/0211483 A1* | 9/2006 | Padgett | G07F 17/32 463/19 |

(Continued)

*Primary Examiner* — Dmitry Suhol
*Assistant Examiner* — Carl V Larsen
(74) *Attorney, Agent, or Firm* — The Marbury Law Group, PLLC

(57) ABSTRACT

Systems, methods, devices, and non-transitory media of the various embodiments provide games and/or gaming machines that conform to Class II regulations, while producing randomness similar to Class III machines by assigning a set of common numbers to a unique machine map to create one or more randomized patterns which correspond to plurality of symbols outputting a game of chance on the display based at least in part on the one or more randomized patterns, wherein the game of chance is a new game or an existing game including but not limited to poker, keno, video reels, bingo, etc.

18 Claims, 53 Drawing Sheets

(56) References Cited

U.S. PATENT DOCUMENTS

| | | | |
|---|---|---|---|
| 2006/0247003 A1* | 11/2006 | Macke | G07F 17/32 463/20 |
| 2007/0010319 A1* | 1/2007 | Lind | G07F 17/32 463/25 |
| 2009/0075714 A1* | 3/2009 | Meyer | G07F 17/32 463/19 |
| 2009/0117970 A1* | 5/2009 | De Waal | G07F 17/32 463/20 |
| 2012/0172105 A1* | 7/2012 | Huynh | G07F 17/3286 463/18 |
| 2016/0035176 A1* | 2/2016 | Forman | G07F 17/329 463/19 |
| 2017/0301176 A1 | 10/2017 | Forman et al. | |
| 2018/0102027 A1* | 4/2018 | Paiva | G07F 17/3267 |

\* cited by examiner

690

| | reel 1 | reel 2 | reel 3 | reel 4 | reel 5 |
|---|---|---|---|---|---|
| line 1 | 5 | 6 | 7 | 8 | 9 |
| line 2 | 0 | 1 | 2 | 3 | 4 |
| line 3 | 10 | 11 | 12 | 13 | 14 |
| line 4 | 0 | 6 | 12 | 8 | 4 |
| line 5 | 10 | 6 | 2 | 8 | 14 |
| line 6 | 0 | 1 | 7 | 13 | 14 |
| line 7 | 10 | 11 | 7 | 3 | 4 |
| line 8 | 5 | 11 | 12 | 13 | 9 |
| line 9 | 5 | 1 | 2 | 3 | 9 |
| line 10 | 0 | 6 | 7 | 8 | 4 |
| line 11 | 10 | 6 | 7 | 8 | 14 |
| line 12 | 0 | 6 | 2 | 8 | 4 |
| line 13 | 10 | 6 | 12 | 8 | 14 |
| line 14 | 5 | 6 | 2 | 8 | 9 |
| line 15 | 5 | 6 | 12 | 8 | 9 |
| line 16 | 5 | 11 | 7 | 3 | 9 |
| line 17 | 5 | 1 | 7 | 13 | 9 |
| line 18 | 0 | 11 | 2 | 13 | 4 |
| line 19 | 10 | 1 | 12 | 3 | 14 |
| line 20 | 5 | 1 | 12 | 3 | 9 |
| line 21 | 5 | 11 | 2 | 13 | 9 |
| line 22 | 10 | 11 | 2 | 13 | 14 |
| line 23 | 0 | 1 | 12 | 3 | 4 |
| line 24 | 10 | 1 | 2 | 3 | 14 |
| line 25 | 0 | 11 | 12 | 13 | 4 |

Screen Layout — 692

| 0 | 1 | 2 | 3 | 4 |
|---|---|---|---|---|
| 5 | 6 | 7 | 8 | 9 |
| 10 | 11 | 12 | 13 | 14 |

694

| | Reel | 1 | 2 | 3 | 4 | 5 |
|---|---|---|---|---|---|---|
| Pattern 1 | | whale | whale | whale | whale | whale |
| Pattern 2 | | dolphin | dolphin | dolphin | dolphin | dolphin |
| Pattern 3 | | crab | crab | crab | crab | crab |
| Pattern 4 | | fish | fish | fish | fish | fish |
| Pattern 5 | | A | WILD | A | WILD | A |
| Pattern 6 | | A | WILD | A | WILD | A |
| Pattern 7 | | A | WILD | A | WILD | A |
| Pattern 8 | | A | A | A | A | A |
| Pattern 9 | | K | K | K | K | K |
| Pattern 10 | | K | Q | K | Q | K |
| Pattern 11 | | Q | WILD | Q | WILD | Q |
| Pattern 12 | | Q | WILD | Q | WILD | Q |
| Pattern 13 | | J | WILD | J | WILD | J |
| Pattern 14 | | J | WILD | J | WILD | J |
| Pattern 15 | | 10 | J | 10 | J | 10 |
| Pattern 16 | | 10 | 10 | 10 | 10 | 10 |

| 2 | 3 | 4 | 8 | 11 | 20 | 21 | 24 | 26 | 27 |
|---|---|---|---|---|---|---|---|---|---|
| 47 | 48 | 49 | 50 | 52 | 54 | 55 | 56 | 57 | 58 |

| 31 | 33 | 34 | 35 | 37 | 38 | 41 | 42 | 44 | 45 |
|---|---|---|---|---|---|---|---|---|---|
| 60 | 61 | 63 | 65 | 69 | 71 | 74 | 76 | 78 | 79 |

1201 Card 1

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |

1202 Card 2

| 21 | 22 | 23 | 24 | 25 |
|---|---|---|---|---|
| 26 | 27 | 28 | 29 | 30 |
| 31 | 32 | 33 | 34 | 35 |
| 36 | 37 | 38 | 39 | 40 |

1203 Card 3

| 41 | 42 | 43 | 44 | 45 |
|---|---|---|---|---|
| 46 | 47 | 48 | 49 | 50 |
| 51 | 52 | 53 | 54 | 55 |
| 56 | 57 | 58 | 59 | 60 |

1204 Card 4

| 61 | 62 | 63 | 64 | 65 |
|---|---|---|---|---|
| 66 | 67 | 68 | 69 | 70 |
| 71 | 72 | 73 | 74 | 75 |
| 76 | 77 | 78 | 79 | 80 |

ENHANCED GAME RANDOMIZATION WITH MACHINE MAPPING

RELATED APPLICATIONS

The present application claims the benefit of priority to U.S. Provisional Patent Application No. 62/377,398 entitled "Enhanced Game Randomization With Machine Mapping" filed Aug. 19, 2016, the entire contents of which are hereby incorporated by reference.

BACKGROUND

In the current market, Class III games outperform Class II games in gaming establishments. However, Class II games are exempt from certain fees and taxes in some Indian gaming jurisdictions. Class III games are 100% random and typically outperform Class II games by an average of 40%. There are over 850,000 slot machines in the U.S. gaming market, and only approximately 20% are Class II games. Typically, Indian casinos do not pay state taxes on class II games. States with Indian gaming have entered into compacts with the Indian casinos to allow the Indian casinos to have Class III games, but typically charge the Indian casinos with a luxury tax of up to $35 per day per Class III machine in operation on the Indian casino floor. Indian casinos in most states can have an unlimited number of Class II games without paying any taxes. Due to the current poor performance of Class II vs Class III games, the Indian casinos can only afford to use about 20% of their gaming space for current Class II games.

SUMMARY

The systems, methods, devices, and non-transitory media of the various embodiments provide games and/or gaming machines that conform to Class II regulations, while producing a randomness similar to Class III machines. The various embodiments enable games and/or gaming machines that perform as a Class III game without actually being Class III games (i.e., the various embodiments provide Class II games that play in a similar manner to Class III games), thereby allowing Indian casinos to retain more revenue by avoiding additional fees and/or operating an unlimited number of games and/or gaming machines. By providing well-performing Class II games and/or gaming machines, the various embodiments may enable Indian casinos to expand operations.

Various embodiments not only create Class II games that play as Class III games, but various embodiments also may convert existing Class III games into Class II games. Thus, various embodiments may enable developers of successful Class III games to modify those games to expand into the Class II market.

Various embodiments may provide an electronic gaming machine, including a processor configured with processor executable instructions to perform operations to map a set of common numbers to a machine map of bingo cards to create one or more randomized results and output a game of chance on the display based at least in part on the one or more randomized results. In various embodiments, the common numbers may be determined based on a Class II gaming ball drop. In various embodiments, the ball drop may be a common server ball drop. In various embodiments, the one or more randomized result may be one or more reel strip symbols. In various embodiments, the bingo cards may be four or more bingo cards. In various embodiments, mapping the set of common numbers to the machine map of bingo cards to create the one or more randomized results may include mapping an area of the machine map of bingo cards to a pattern of symbols for display. In various embodiments, the pattern of symbols for display may be a pattern of playing card values, a reel stop key, or a reel pattern key. In various embodiments, the game of chance may be a poker game, a keno game, a reel game, or a bingo game. In various embodiments, the processor may be configured with processor executable instructions to perform operations to evaluate a game ending pattern from the machine map of bingo cards to determine a winner.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 7A, 7B, 7C, 7D, and 7E illustrate machine mapping of a stacked four-number pattern ball drop reel game according to an embodiment.

FIGS. 12A, 12B, 12C, and 12D illustrate a video poker game based on machine mapping of ball drop patterns according to an embodiment.

FIGS. 13A and 13B illustrate a keno game based on machine mapping of ball drop patterns according to an embodiment.

FIGS. 17A, 17B, 17C, 17D, and 18 illustrate poker games based on machine mapping of ball drop patterns according to various embodiments.

DETAILED DESCRIPTION

Figure 1:
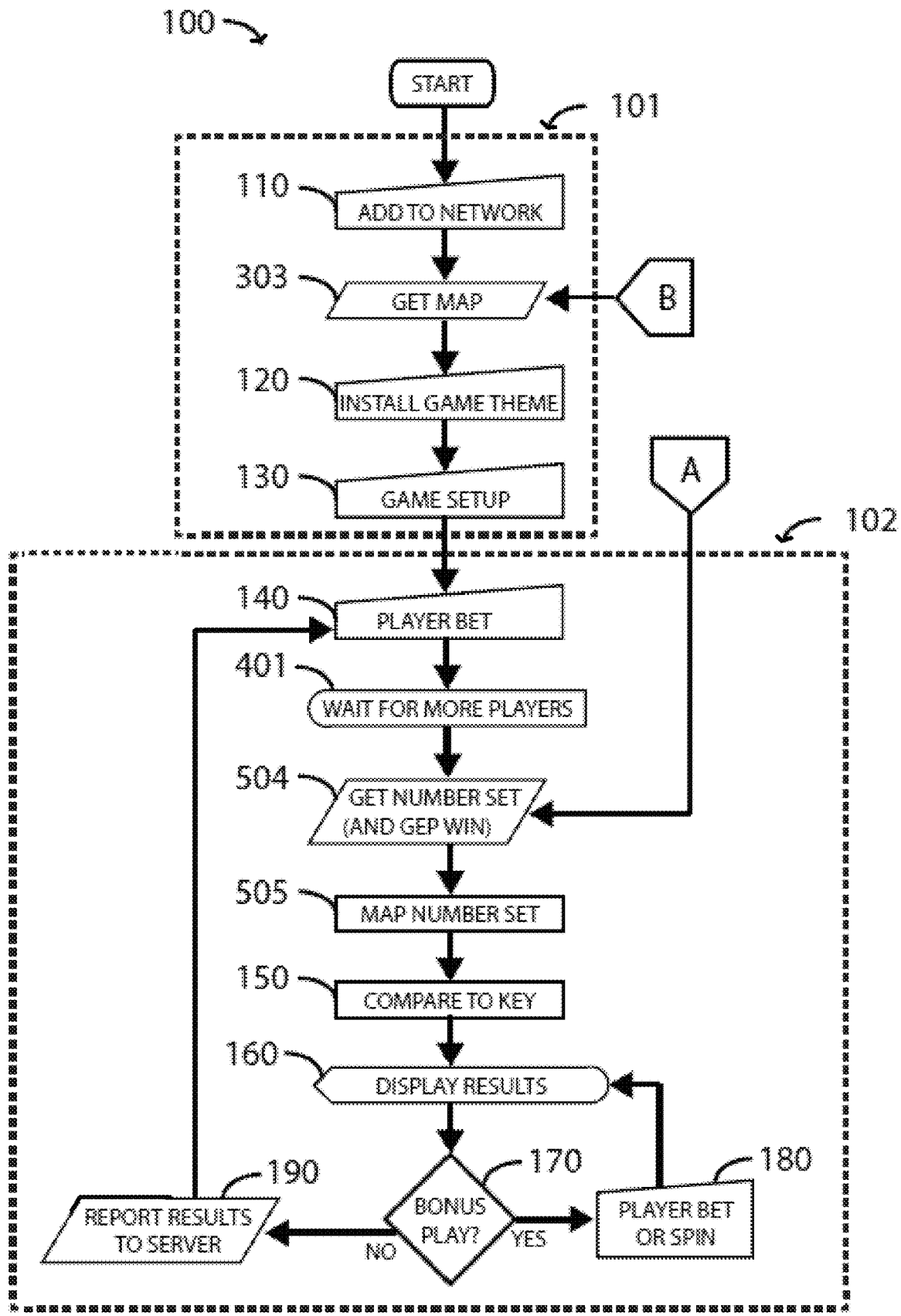
FIG. 1 is process flow diagram illustrating an embodiment method for setting and using a machine map on a Class II gaming machine.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" as used herein refers to any one or all of electronic gaming machines, cellular telephones, smartphones, personal or mobile multi-media players, personal data assistants (PDA's), laptop computers, personal computers, tablet computers, smartbooks, ultrabooks, palm-top computers, multimedia Internet enabled cellular telephones, gaming controllers, set-top boxes, and similar electronic devices that include a memory and a programmable processor to provide the functionality described herein.

The various embodiments are described herein using the term "server" to refer to any computing device capable of functioning as a server, such as a master exchange server, web server, mail server, document server, content server, game server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

The term "Class II" as used herein refers to games and/or gaming machines as defined by the Indian Gaming Regulation at 25 U.S.C. § 2703 as being part of "class II gaming". Such "Class II" games and/or gaming machines include bingo and games associated with bingo, such as pull-tabs, and non-banking card games.

The term "Class III" as used herein refers to games and/or gaming machines as defined by the Indian Gaming Regulation at 25 U.S.C. § 2703 as being part of "class III gaming". Such "Class III" games and/or gaming machines include lotteries, banking-card games, roulette, slot machines, and blackjack.

The systems, methods, devices, and non-transitory media of the various embodiments provide games and/or gaming machines that conform to Class II regulations, while producing a randomness similar to Class III machines. The various embodiments enable games and/or gaming machines that perform as a Class III game without actually being Class III games (i.e., the various embodiments provide Class II games that play in a similar manner to Class III games), thereby allowing Indian casinos to retain more revenue by avoiding additional fees and/or operating an unlimited number of games and/or gaming machines. By providing well-performing Class II games and/or gaming machines, the various embodiments may enable Indian casinos to expand operations.

Various embodiments not only create Class II games that play as Class III games, but various embodiments also may convert existing Class III games into Class II games. Thus, various embodiments may enable developers of successful Class III games to modify those games to expand into the Class II market.

FIG. 1 illustrates an embodiment method 100 for setting and using a machine map on a Class II gaming machine. The operations of method 100 may be performed by a processor of a computing device, such as a processor of an electronic gaming machine. In various embodiments, the operations of method 100 may be performed in conjunction with the operations of one or more of methods 200, 300, and 401 described below with reference to FIGS. 2, 3, and 4.

The method 100 may include a method (or subroutine) 101 executed by the processor to set the machine map. In block 110 the processor may add the game machine to the network, such as a casino network or other network of gaming machines. The network may connect the processor to other computing devices, such as a server generating machine maps. In block 303 the processor may get a map. The map may be received from another computing device, such as a server. The map may be generated according to method 200 of FIG. 2 performed by the processor of a server as described below. In block 120 the processor may install the game theme and in block 103 the processor may perform game setup operations.

Figure 4:
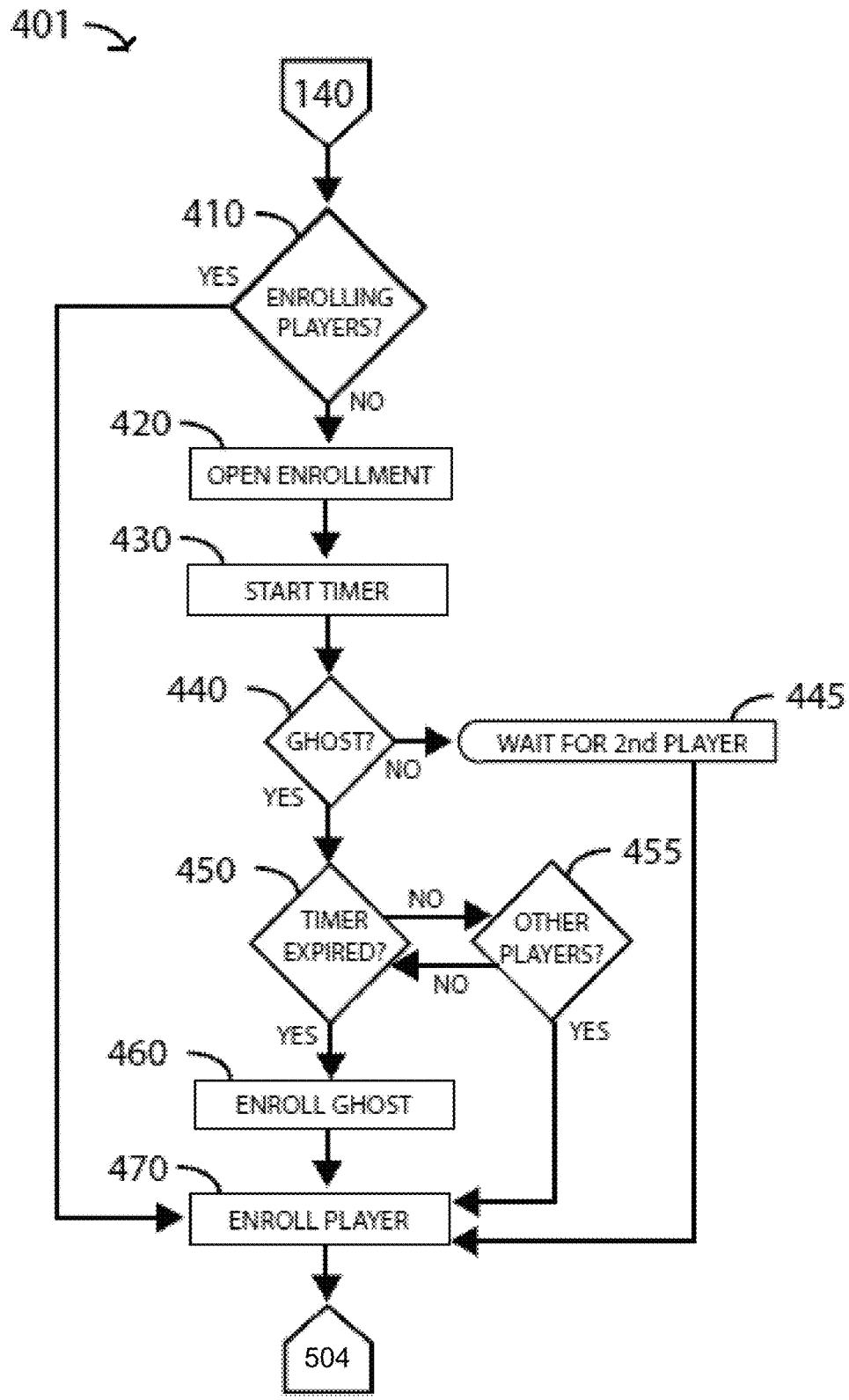
FIG. 4 is a process flow diagram illustrating an embodiment method for enrolling players into a Class II game.

The method 100 may include a method (or subroutine) 102 executed by the processor to present the Class II game to a player. In block 140 the processor may receive an indication of a player bet. In block 401 the processor may wait to determine whether more players will be joining the Class II game. Block 401 may itself be a method (or subroutine) as illustrated in FIG. 4 discussed below. In block 504 the processor may get the number set and game ending pattern (GEP) win. The number set and GEP win may be received from another computing device, such as a server. The number set and GEP win may be generated according to method 200 of FIG. 2 performed by the processor of a server as described below. In block 505 the processor may map a number set. In block 150 the processor may compare to a key. In block 160 the processor may display results. In determination block 170 the processor may determine whether a bonus play is available/achieved. In response to a bonus being available/achieved (i.e., determination block 170="Yes"), the processor may enable a player bet or spin in block 180 and return to block 160 to display the results. In response to a bonus not being available/achieved (i.e., determination block 170="No"), the processor may report the game results to the server in block 190. The processor may return to block 140 to await the next bet by a player.

Figure 2:
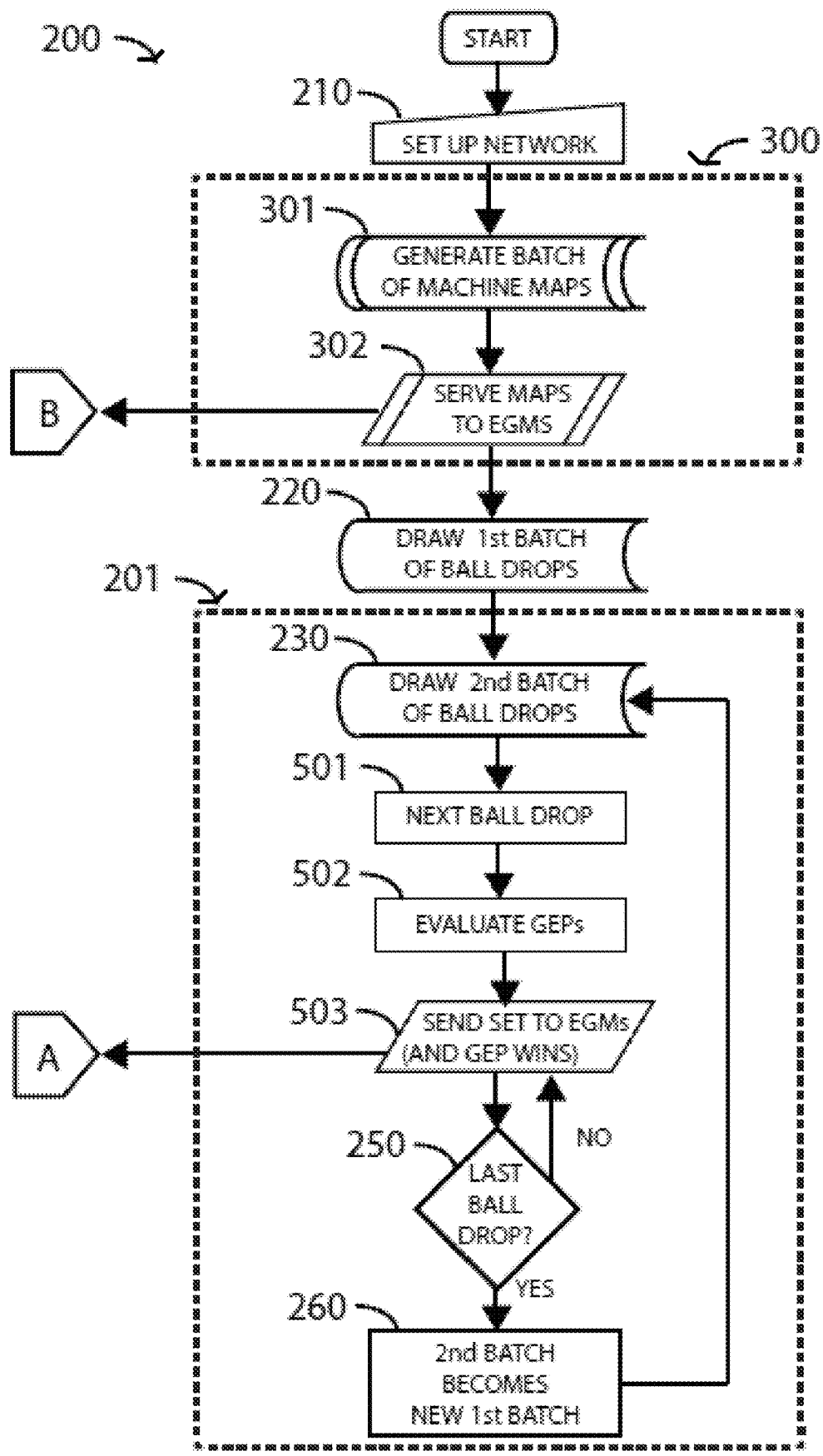
FIG. 2 is a process flow diagram illustrating an embodiment method for ball drop draws for use in conjunction with the operations of the method illustrated in FIG. 1.

FIG. 2 illustrates an embodiment method 200 for ball drop draws for use in conjunction with the operations of method 100 illustrated in FIG. 1. The operations of method 200 may be performed by a processor of a computing device, such as a processor of a server. In various embodiments, the operations of method 200 may be performed in conjunction with the operations of one or more of methods 100, 300, and 401 described above and below with reference to FIGS. 1, 3, and 4.

In block 210 the server may set up the network. The method 200 may include a method (or subroutine) 300 executed by the server to provide maps to electronic gaming machines (EGMs). In block 301 the server may generate a batch of machine maps. The machine maps may be machine map card of any quantity and dimension to produce selected odds. The machine maps may create an entertaining new Class II game or replicate the game play of an existing Class III game while meeting the Class II game requirements. In block 302 the server may serve the maps to the EGMs and the maps may be received in block 303 of FIG. 1 as described above.

In block 220 the server may draw a first batch of ball drops. The method 200 may include a method (or subroutine) 201 executed by the server to provide sets and GEP wins to EGMs. In block 230 the server bay draw a second batch of ball drops. In block 501 the server may execute a next ball drop. In block 502 the server may evaluate the GEPs. The GEPs may be evaluated by comparing the current drop results to GEPs and determining whether the current drop results match any GEPs. In block 503 the set may be sent to the EGMs along with any GEP wins. The set and GEP wins may be received in block 504 of FIG. 1 as described above. In determination block 250 the server may determine whether the last ball has dropped. In response to determining the last ball has not dropped (i.e., determination block 250="No"), the server may proceed to block 503. In response to determining the last ball has dropped (i.e., determination block 250="Yes"), the server may transition the second batch of ball drops to be the new first batch of ball drops in block 260 and proceed to block 230.

Figure 3:
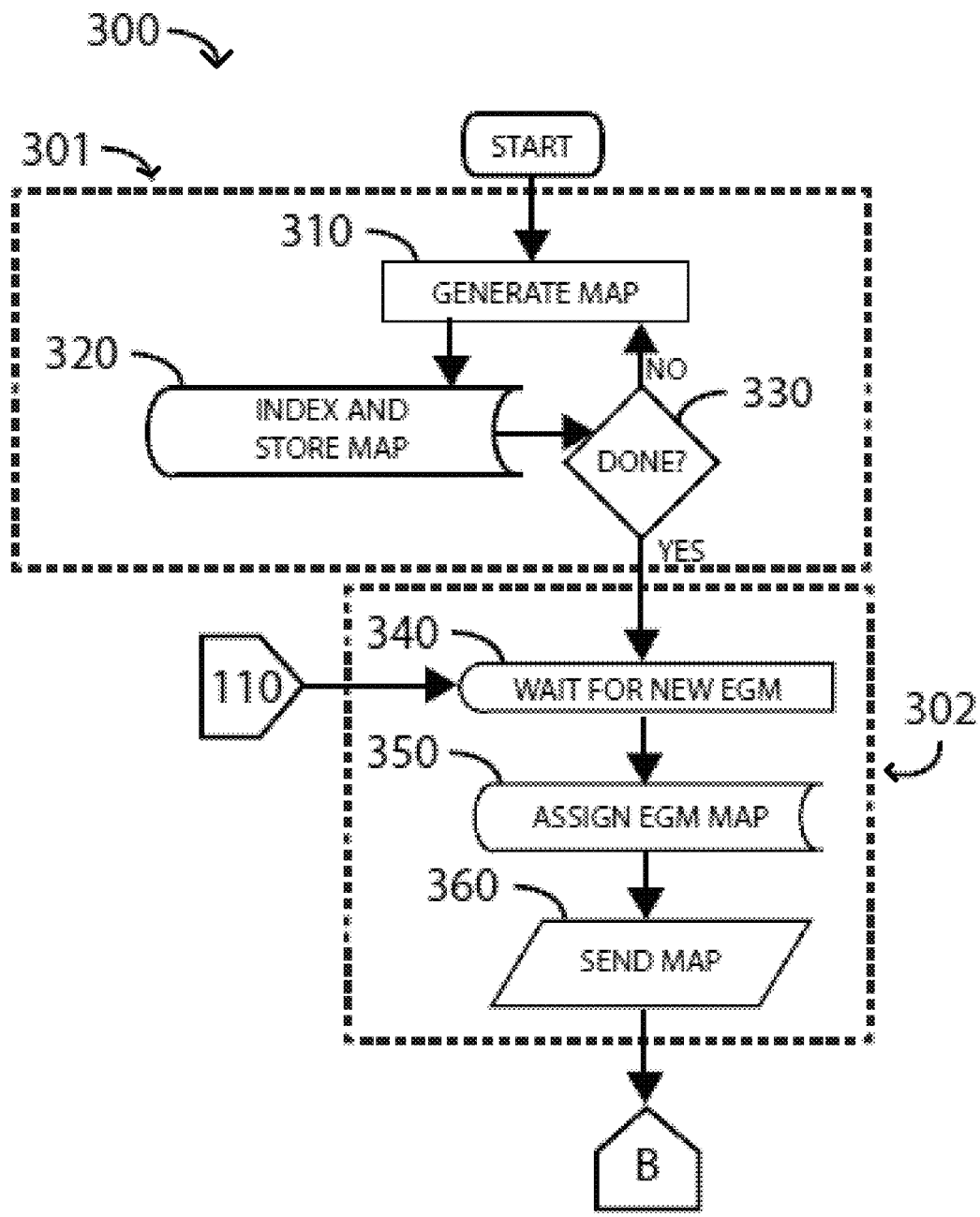
FIG. 3 is a process flow diagram illustrating an embodiment method for generating and distributing a batch of machine maps.

FIG. 3 illustrates an embodiment method 300 for generating and distributing a batch of machine maps. The operations of method 300 may be performed by a processor of a computing device, such as a processor of a server. In various embodiments, the operations of method 300 may be performed in conjunction with the operations of one or more of methods 100, 200, and 401 described above and below with reference to FIGS. 1, 2, and 4.

The method 300 may include a method (or subroutine) 301 executed by the server to generate maps. In block 310 the server may generate a map. In block 320 the server may index and store the map. In determination block 330 the server may determine whether all maps are done being created. In response to determining maps are not done (i.e., determination block 330="No"), the server may return to block 310.

The method 300 may include a method (or subroutine) 302 executed by the server to send maps. In response to determining map generation is completed (i.e., determination block 330="Yes"), the server may wait for a new EGM to be added in block 340. The indication that a new EGM is added may be a message received from the new EGM as part of adding the game machine to the network in block 10 of FIG. 1 discussed above. In block 305 the server may assign the EGM a map and in block 360 may send the map. The map may be received by the processor of an electronic gaming machine in block 303 of FIG. 1 as discussed above.

FIG. 4 illustrates an embodiment method 401 for enrolling players into a Class II game. The operations of method 401 may be performed after an indication of a player bet in block 140 of FIG. 1. The operations of method 401 may be performed by a processor of a computing device, such as a processor of an electronic gaming machine. In various embodiments, the operations of method 401 may be performed in conjunction with the operations of one or more of methods 100, 200, and 300 described above with reference to FIGS. 1, 2, and 3.

In determination block 410 the processor may determine whether players are enrolling. In response to determining players are not enrolling (i.e., determination block 410="No"), the processor may open enrollment in block 420. In block 430 the processor may start a timer. In determination block 440 the processor may determine whether a ghost player is to be created. If a ghost player is not to be created (i.e., determination block 440="No"), the processor may wait for a second player in block 445. If a ghost player is to be created (i.e., determination block 440="Yes"), the processor may determine whether the time expired in determination block 450. If the timer is not expired (i.e., determination block 450="No"), the processor may determine whether there are other players in determination block 455. If there are no other players (i.e., determination block 455="No"), the processor may proceed to determination block 450. If the timer is expired (i.e., determination block 450="Yes"), the processor may enroll a ghost player in block 460. Upon enrolling a ghost player, in response to other players enrolling (i.e., determination blocks 410 or 455="Yes"), or in response to a second player enrolling (block 445), the processor may enroll the players in block 470 and proceed to block 504 of FIG. 1.

FIGS. 5A, 5B, 5C, and 5D illustrate machine mapping of a common ball drop in a bingo game according to an embodiment. Various operations of methods 100, 200, 300, and/or 401 described above may be executed by one or more servers and/or one or more computing devices (e.g., EGMs) to provide the bingo game illustrated in FIGS. 5A, 5B, 5C, and 5D. FIGS. 5A, 5B, 5C, and 5D show a sequence of graphics of a portion of a play through of the bingo game on two machines. The play through demonstrates how the use of individually and uniquely mapped machines creates random results. Both example machines have the opportunity to purchase the maximum number of extra balls for purposes of the demonstration. In the example, all numbers for all bonus rounds are drawn along with the original set, whether or not the bonus numbers may actually be needed in any given game.

Figure 5A:
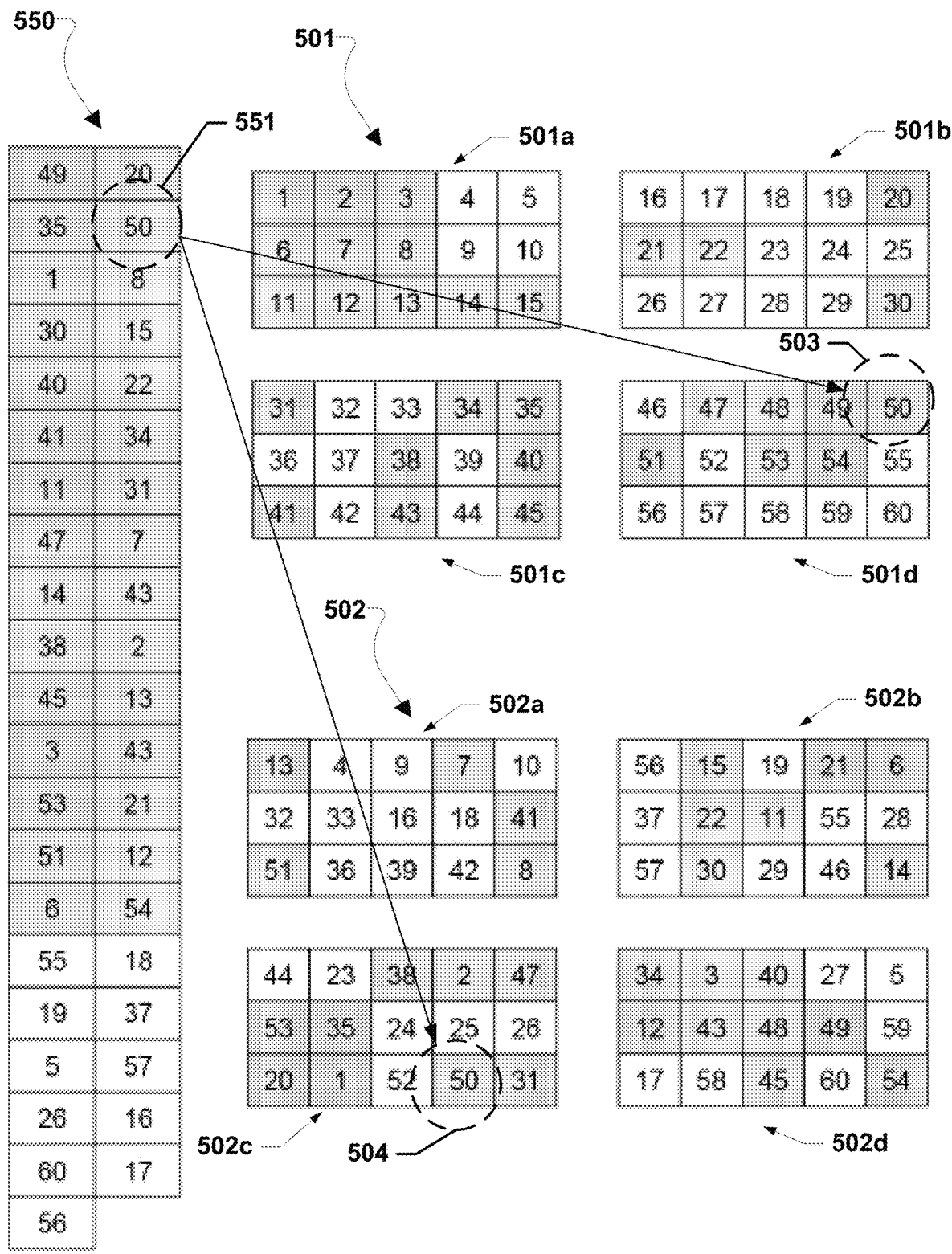
FIGS. 5A, 5B, 5C, and 5D illustrate machine mapping of a common ball drop in a bingo game according to an embodiment.

Referring to FIG. 5A, at the start of the game a server may randomly pick common numbers 550 for use by all EGMs offering a game at that time. The randomly picked common numbers 550 may represent a ball drop or draw as used in Class II gaming. A portion of the numbers may be regular plays, such as 30 numbers, and the remaining numbers may be bonus numbers, such as 11 numbers. Each EGM may have a set of four randomly populated cards, such as set of cards 501 for a first EGM and set of cards 502 for a second EGM. There may be sets for each EGM playing at the time, and the number of playing EGMs may be any number of EGMs. The set of cards 501 may include four cards 501a, 501b, 501c, and 501d. The set of cards 502 may include four cards 502a, 502b, 502c, and 502d. The cards 501a, 501b, 501c, 501d, 502a, 502b, 502c, and 502d may be unique bingo type cards. The server may provide the common numbers 550 to each EGM and the EGMs may daub the selected corresponding numbers on their respective cards 501a, 501b, 501c, 501d, 502a, 502b, 502c, and 502d. For example, the selected number 50 at position 551 on the common numbers 550 may result in the number 50 at position 503 of card 501d being daubed on a first machine and the number 50 at position 504 of card 502c being daubed by a second machine.

Figure 5B:
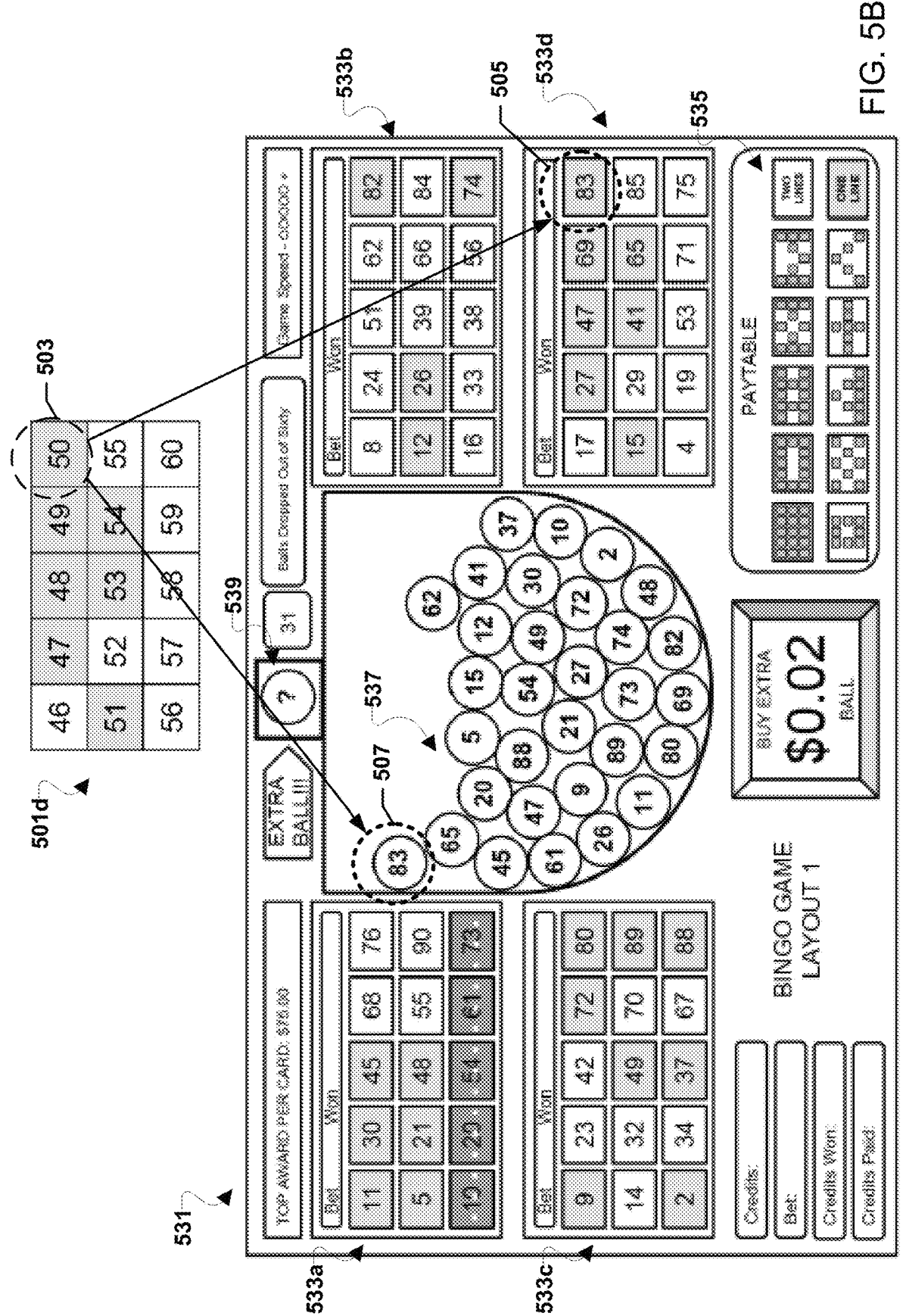

FIG. 5B illustrates the card 501d and the resulting display 530 of the first machine. The display 530 may include a ball drop area 537, a pay table 535, a bonus area 539, and bingo cards 533a, 533b, 533c, and 533d. Each of the cards 501a, 501b, 501c, and 501d may be mapped to cards 533a, 533b, 533c, and 533d shown in the display 530. The numbers on cards 533a, 533b, 533c, and 533d may be different than the numbers on the cards 501a, 501b, 501c, and 501d. However, the positions on the cards 533a, 533b, 533c, and 533d and cards 501a, 501b, 501c, and 501d may correspond to one another. Thus, the hit on card 501d at position 503 (i.e., the daubed number 50 at row 1 column 5) may result in the ball 507 labeled 83 dropping in the ball drop area 537 and the number 83 being daubed in position 505 of the displayed card 533d as the number 83 is the number at position 505 on card 533d (i.e., the number at row 1 column 5 on card 533d corresponding to row 1 column 5 on card 501d. In a similar manner, bonus balls may be provided from the common numbers 550 as purchased by the player and may appear in the bonus area 539 resulting in their respective daubing on the cards 533a, 533b, 533c, and 533d. Via the mapping of the common numbers 550 drawn by the server to the machine maps at the first EGM to the bingo cards on the display 531, a bingo game may be presented and played on the first EGM.

Figure 5C:
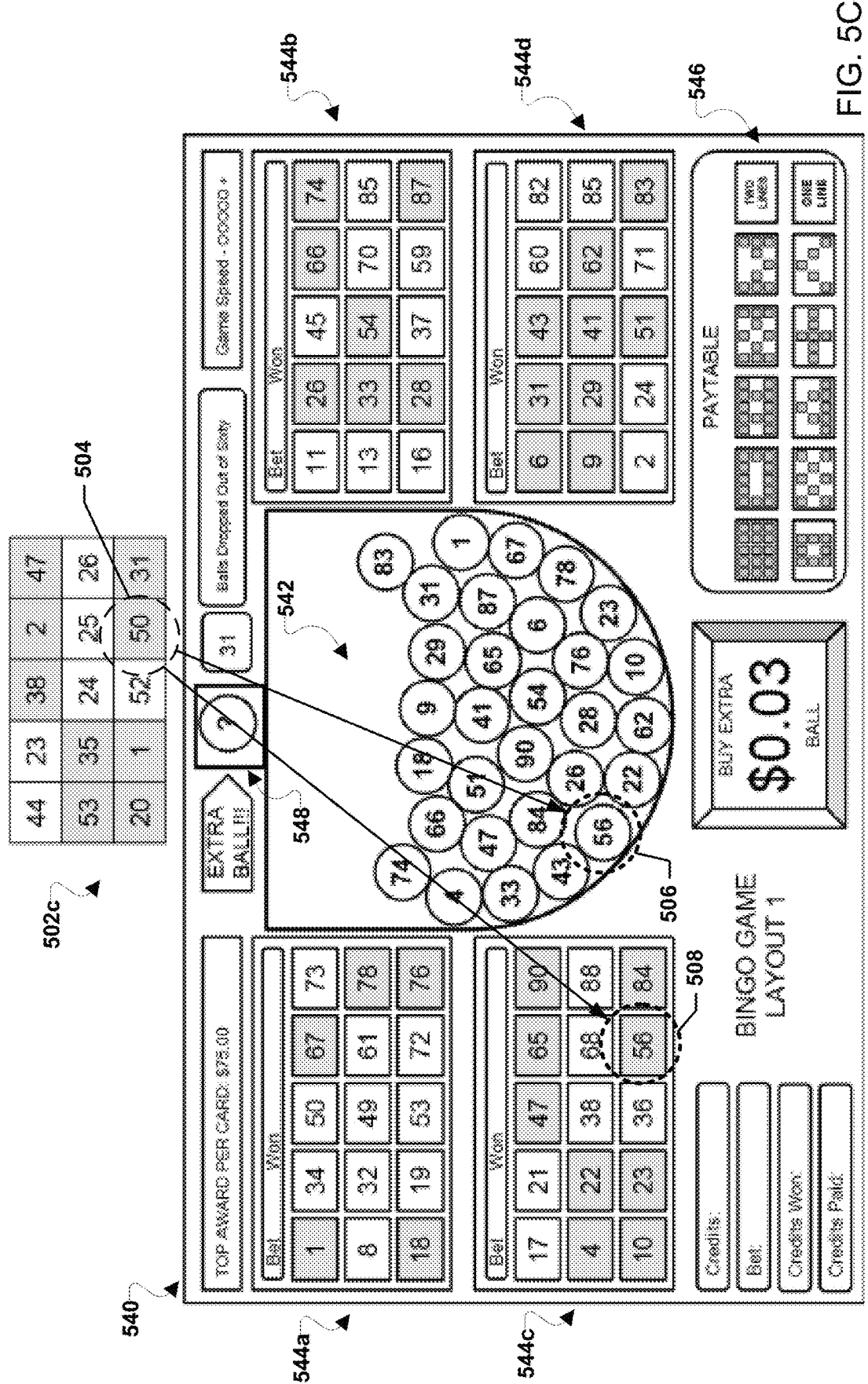

FIG. 5C illustrates the card 502c and the resulting display 540 of the second machine. The display 540 may include a ball drop area 542, a pay table 546, a bonus area 548, and bingo cards 544a, 544b, 544c, and 544d. Each of the cards 502a, 502b, 502c, and 501d may be mapped to cards 544a, 544b, 544c, and 544d shown in the display 540. The numbers on cards 544a, 544b, 544c, and 544d may be different than the numbers on the cards 502a, 502b, 502c, and 502d. However, the positions on the cards 544a, 544b, 544c, and 544d and cards 502a, 502b, 502c, and 502d may correspond to one another. Thus, the hit on card 502c at position 504 (i.e., the daubed number 50 at row 3 column 4) may result in the ball 506 labeled 56 dropping in the ball drop area 542 and the number 56 at position 508 being daubed in the displayed card 533d as the number 56 is the number at position 508 on card 544c (i.e., the number at row 3 column 4 on card 544c corresponding to row 3 column 4 on card 502c. In a similar manner, bonus balls may be provided from the common numbers 550 as purchased by the player and may appear in the bonus area 5487 resulting in their respective daubing on the cards 544a, 544b, 544c, and 544d. Via the mapping of the common numbers 550 drawn by the server to the machine maps at the second EGM to the bingo cards on the display 540, a bingo game may be presented and played on the second EGM.

Figure 5D:
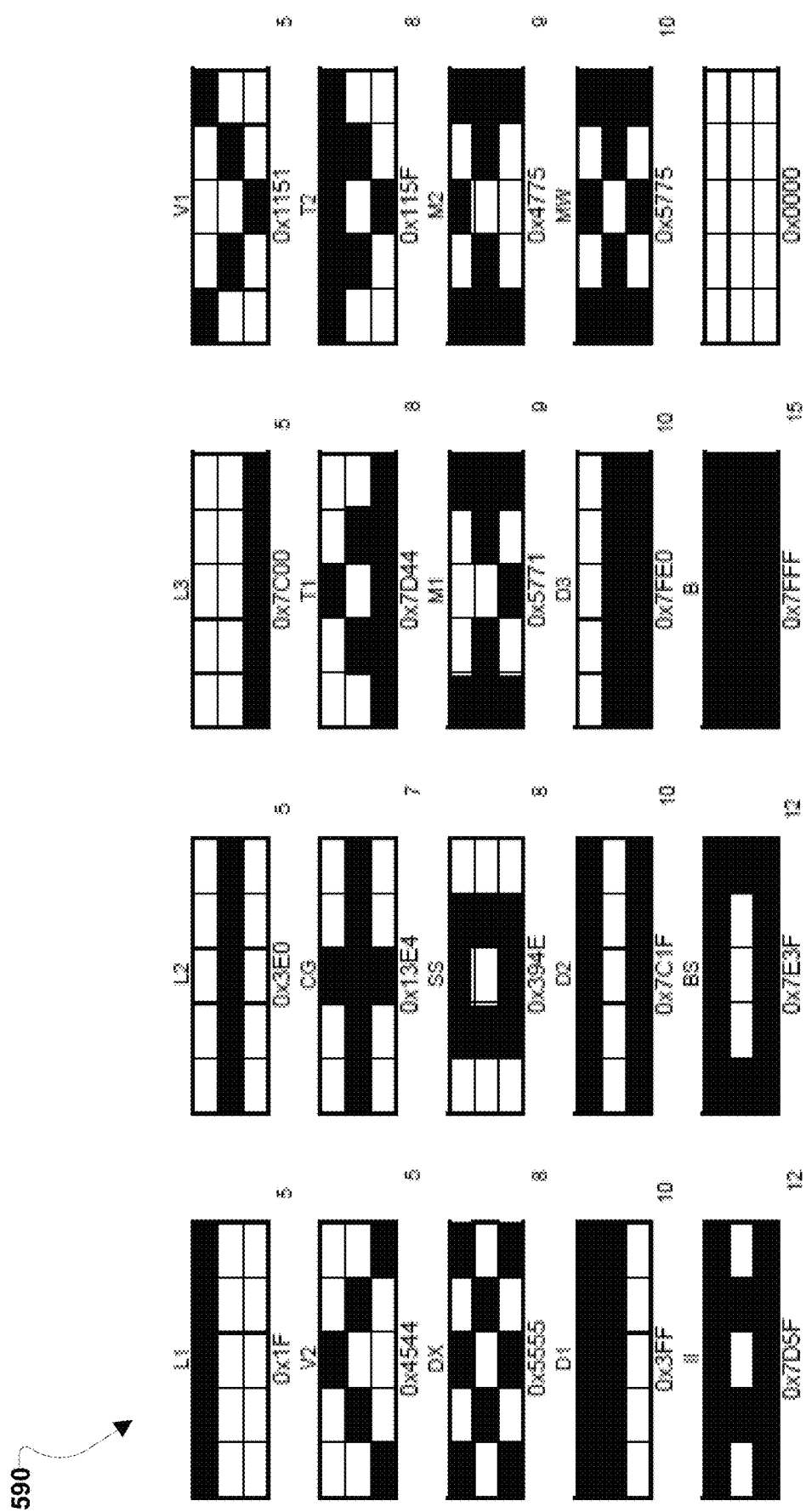

FIG. 5D illustrates a pay table of example winning card patterns 590 that may be used with the bingo games on displays 530 and 541 described above.

FIGS. 6A, 6B, 6C, and 6D illustrate machine mapping of a common ball drop reel line game according to an embodiment. Various operations of methods 100, 200, 300, and/or 401 described above may be executed by one or more servers and/or one or more computing devices (e.g., EGMs) to provide the line game illustrated in FIGS. 6A, 6B, 6C, and 6D. FIGS. 6A, 6B, 6C, and 6D show a sequence of graphics of a portion of a play through of the reel game on two machines, and the game may include three bonus rounds.

Figure 6A:
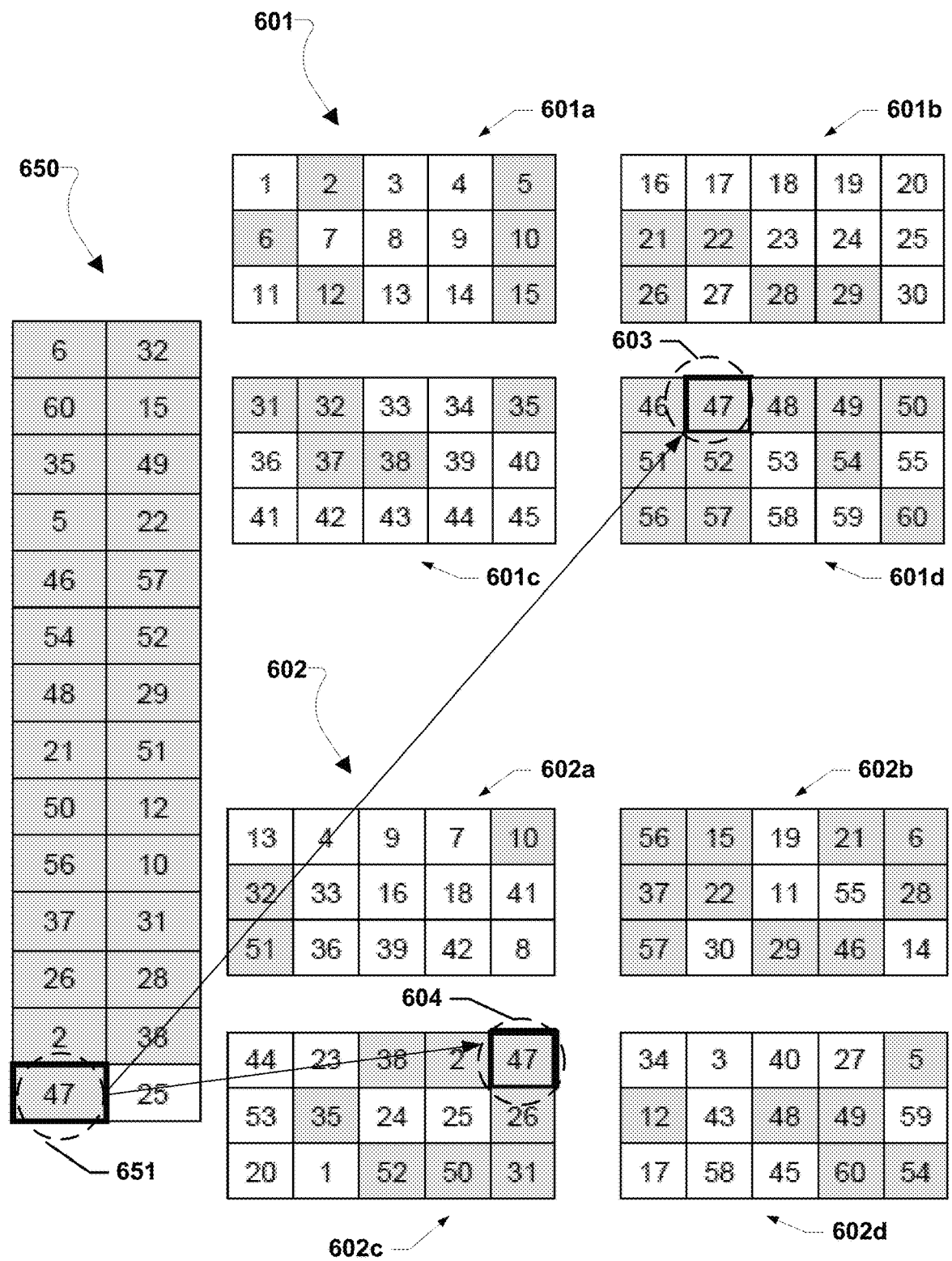
FIGS. 6A, 6B, 6C, and 6D illustrate machine mapping of a common ball drop reel line game according to an embodiment.

Referring to FIG. 6A, at the start of the game a server may randomly pick common numbers 650 for use by all EGMs offering a game at that time. The randomly picked common numbers 650 may represent a ball drop or draw as used in Class II gaming. Each EGM may have a set of four randomly populated cards, such as set of cards 601 for a first EGM and set of cards 602 for a second EGM. There may be sets for each EGM playing at the time, and the number of playing EGMs may be any number of EGMs. The set of cards 601 may include four cards 601a, 601b, 601c, and 601d. The set of cards 502 may include four cards 602a, 602b, 602c, and 602d. The cards 601a, 601b, 601c, 601d, 602a, 602b, 602c, and 602d may be unique bingo type cards. The server may provide the common numbers 650 to each EGM and the EGMs may daub the selected corresponding numbers on their respective cards 601a, 601b, 601c, 601d, 602a, 602b, 602c, and 602d. For example, the selected number 47 at position 651 on the common numbers 650 may result in the number 47 at position 603 of card 601d being daubed on a first machine and the number 47 at position 604 of card 602c being daubed by a second machine.

Figure 6B:
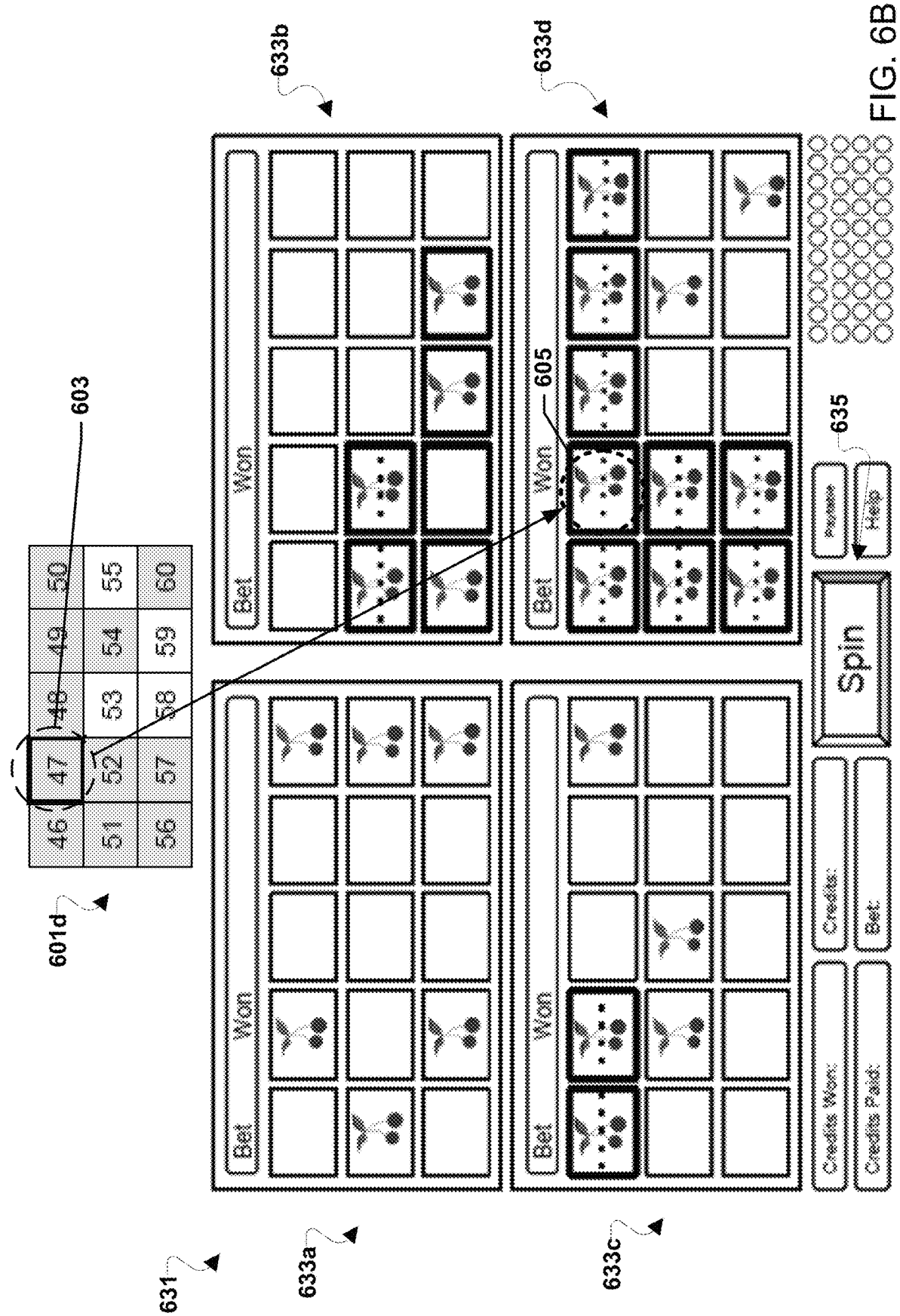

FIG. 6B illustrates the card 601d and the resulting display 631 of the first machine. The display 631 may include a spin button 635 and four line reel areas 633a, 633b, 633c, and 633d. Each of the cards 601a, 601b, 601c, and 601d may be mapped to line reel areas 633a, 633b, 633c, and 633d shown in the display 631. The positions on the line reel areas 633a, 633b, 633c, and 633d and cards 601a, 601b, 601c, and 601d may correspond to one another. Thus, the hit on card 601d at position 603 (i.e., the daubed number 47 at row 1 column 2) may result in the cherry symbol appearing in the corresponding position 605 in line reel area 633d (i.e., at row 1 column 2). In a similar manner, all hits on the set of cards 601 may result in cherry symbols being displayed at the corresponding locations on the line reel areas 633a, 633b, 633c, and 633d. Patterns of the resulting lines/arrangements of the cherry symbols may result in wins as shown in the pay table of example winning patterns/paylines 694 shown in FIG. 6D. The resulting reel strips 690 and screen layout 692 for each of the line reel areas 633a, 633b, 633c, and 633d are shown in FIG. 6D and the twenty five different winning patterns/paylines 694 are also shown. Thus, via the mapping of the common numbers 650 drawn by the server to the machine maps at the first EGM to the line reel areas on the display 631, a line reel game may be presented and played on the first EGM.

Figure 6C:
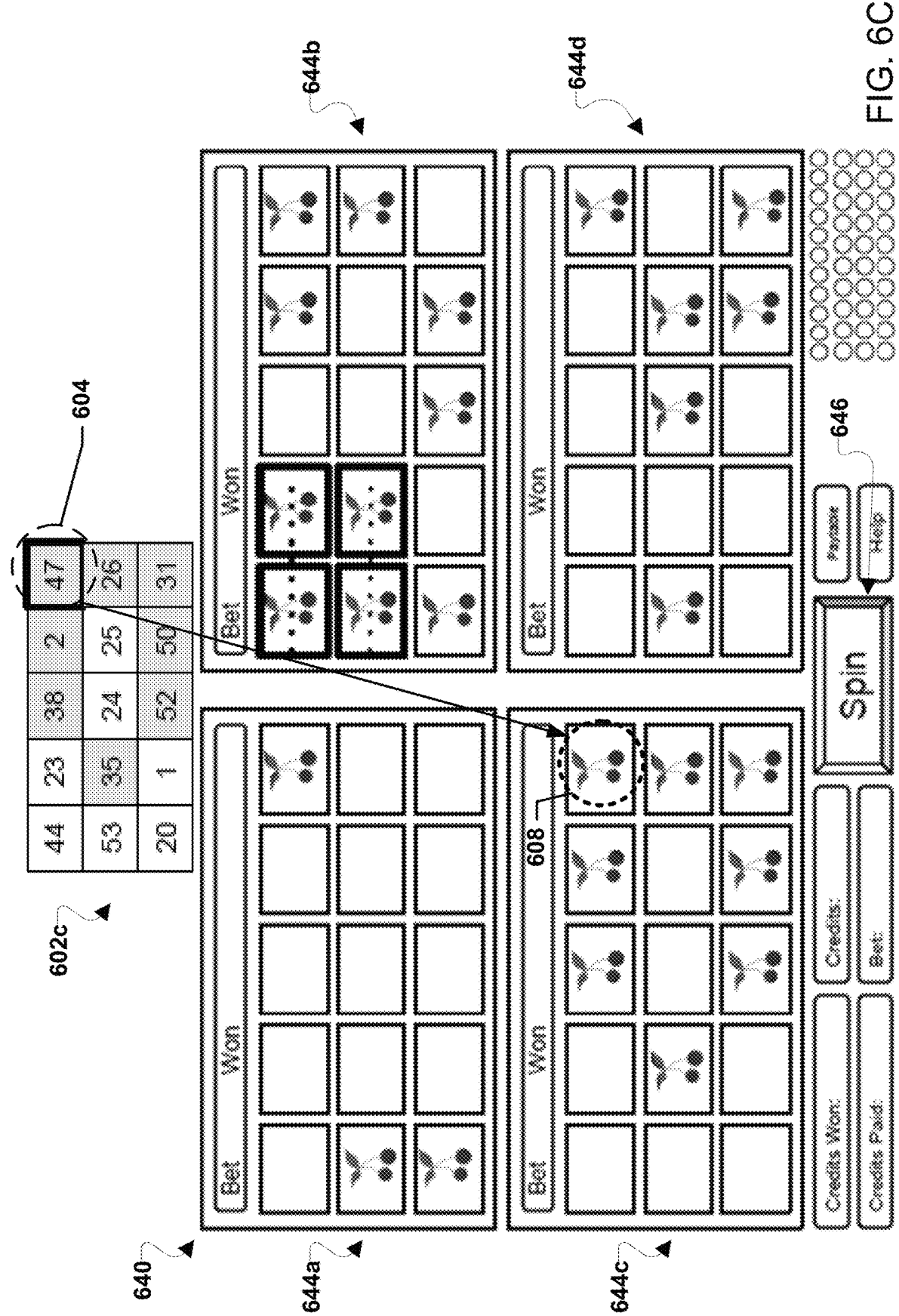
Figure 6D:
Figure 6D:
Figure 6D:
Figure 6D:
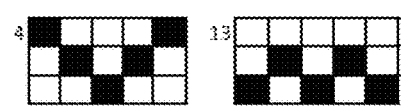
Figure 6D:
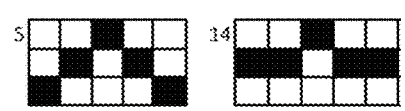
Figure 6D:
Figure 6D:
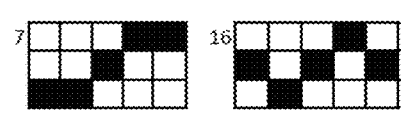
Figure 6D:
Figure 6D:
Figure 6D:
Figure 6D:
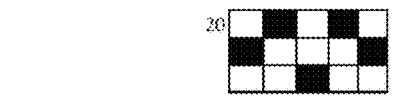
Figure 6D:
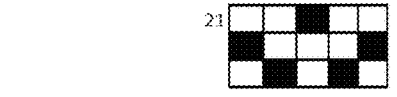
Figure 6D:
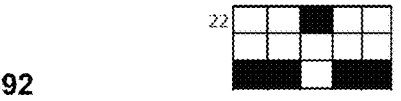
Figure 6D:
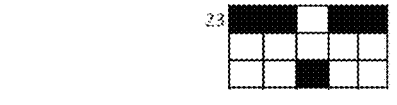
Figure 6D:
Figure 6D:
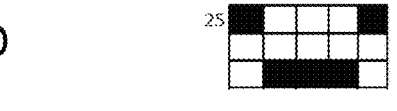

FIG. 6C illustrates the card 602c and the resulting display 640 of the second machine. The display 640 may include a spin button 646 and four line reel areas 644a, 644b, 644c, and 644d. Each of the cards 602a, 602b, 602c, and 602d may be mapped to line reel areas 644a, 644b, 644c, and 644d shown in the display 640. The positions on the line reel areas 644a, 644b, 644c, and 644d and cards 602a, 602b, 602c, and 602d may correspond to one another. Thus, the hit on card 602c at position 604 (i.e., the daubed number 47 at row 1 column 5) may result in the cherry symbol appearing in the corresponding position 608 in line reel area 644d (i.e., at row 1 column 5). In a similar manner, all hits on the set of cards 602 may result in cherry symbols being displayed at the corresponding locations on the line reel areas 644a, 644b, 644c, and 644d. Patterns of the resulting lines/arrangements of the cherry symbols may result in wins as shown in the pay table of example winning patterns/paylines 694 shown in FIG. 6D. The resulting reel strips 690 and screen layout 692 for each of the line reel areas 644a, 644b, 644c, and 644d are shown in FIG. 6D and the twenty five different winning patterns/paylines 694 are also shown. Thus, via the mapping of the common numbers 650 drawn by the server to the machine maps at the second EGM to the line reel areas on the display 640, a line reel game may be presented and played on the second EGM.

FIGS. 7A, 7B, 7C, 7D, and 7E illustrate machine mapping of a stacked four-number pattern ball drop reel game according to an embodiment. Various operations of methods 100, 200, 300, and/or 401 described above may be executed by one or more servers and/or one or more computing devices (e.g., EGMs) to provide the reel game illustrated in FIGS. 7A, 7B, 7C, 7D, and 7E. FIGS. 7A, 7B, 7C, 7D, and 7E show a sequence of graphics of a portion of a play through of a 3×5 reel game. In the game, cards are stacked to create a combined map to produce four-block patterns which determine reel stops.

Figure 7A:
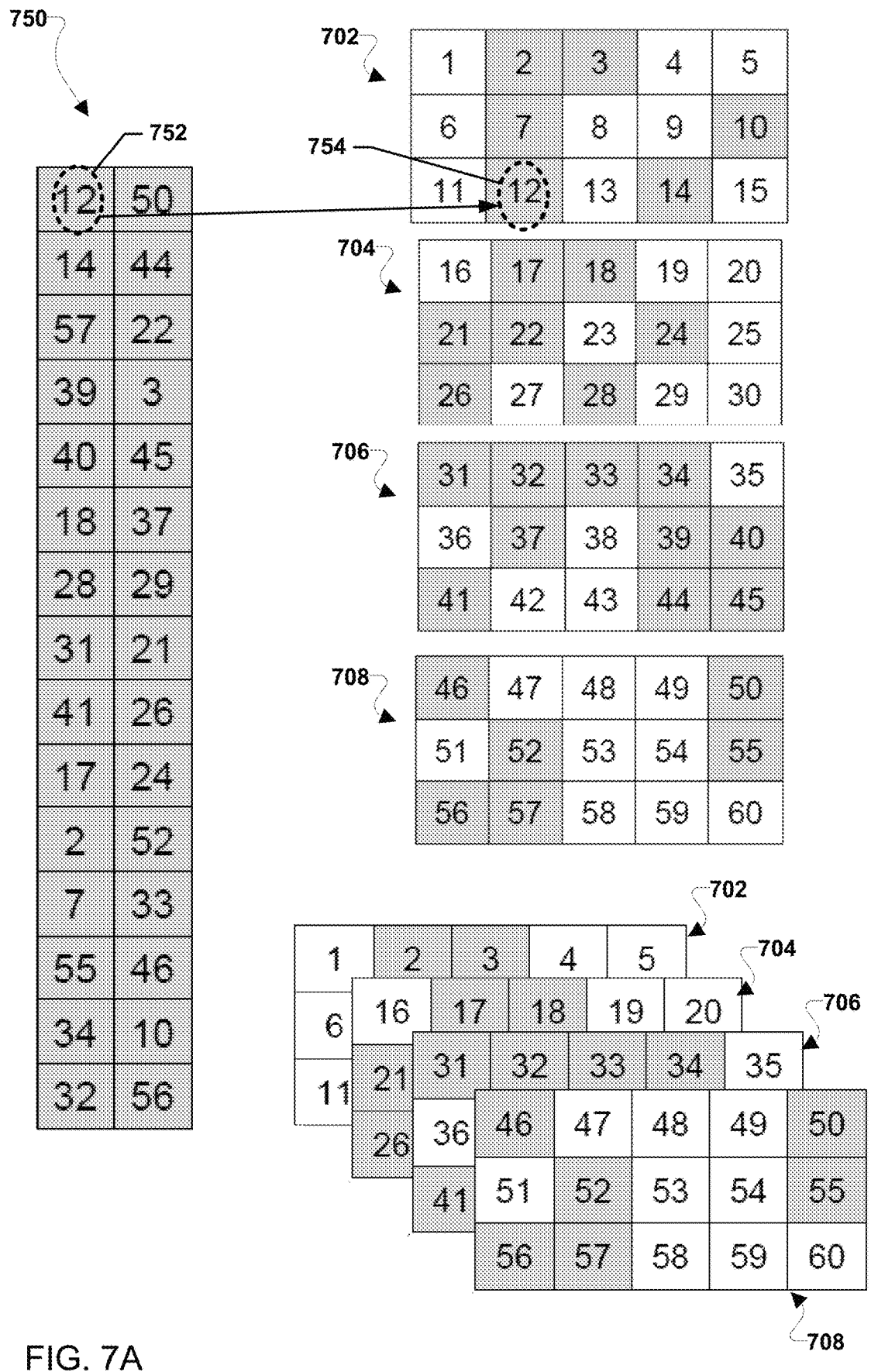

Referring to FIG. 7A, at the start of the game a server may randomly pick common numbers 750 for use by all EGMs offering a game at that time. The randomly picked common numbers 750 may represent a ball drop or draw as used in Class II gaming. Each EGM may have a set of four randomly populated cards, such as cards 702, 704, 706, and 708. There may be sets for each EGM playing at the time, and the number of playing EGMs may be any number of EGMs. The set of cards 702, 704, 706, and 708 may be unique bingo type cards. The server may provide the common numbers 750 to each EGM and the EGMs may daub the selected corresponding numbers on their respective cards 702, 704, 706, and 708. For example, the selected number 12 at position 752 on the common numbers 750 may result in the number 12 at position 754 of card 702 being daubed on at the EGM storing card 702.

Figure 7B:
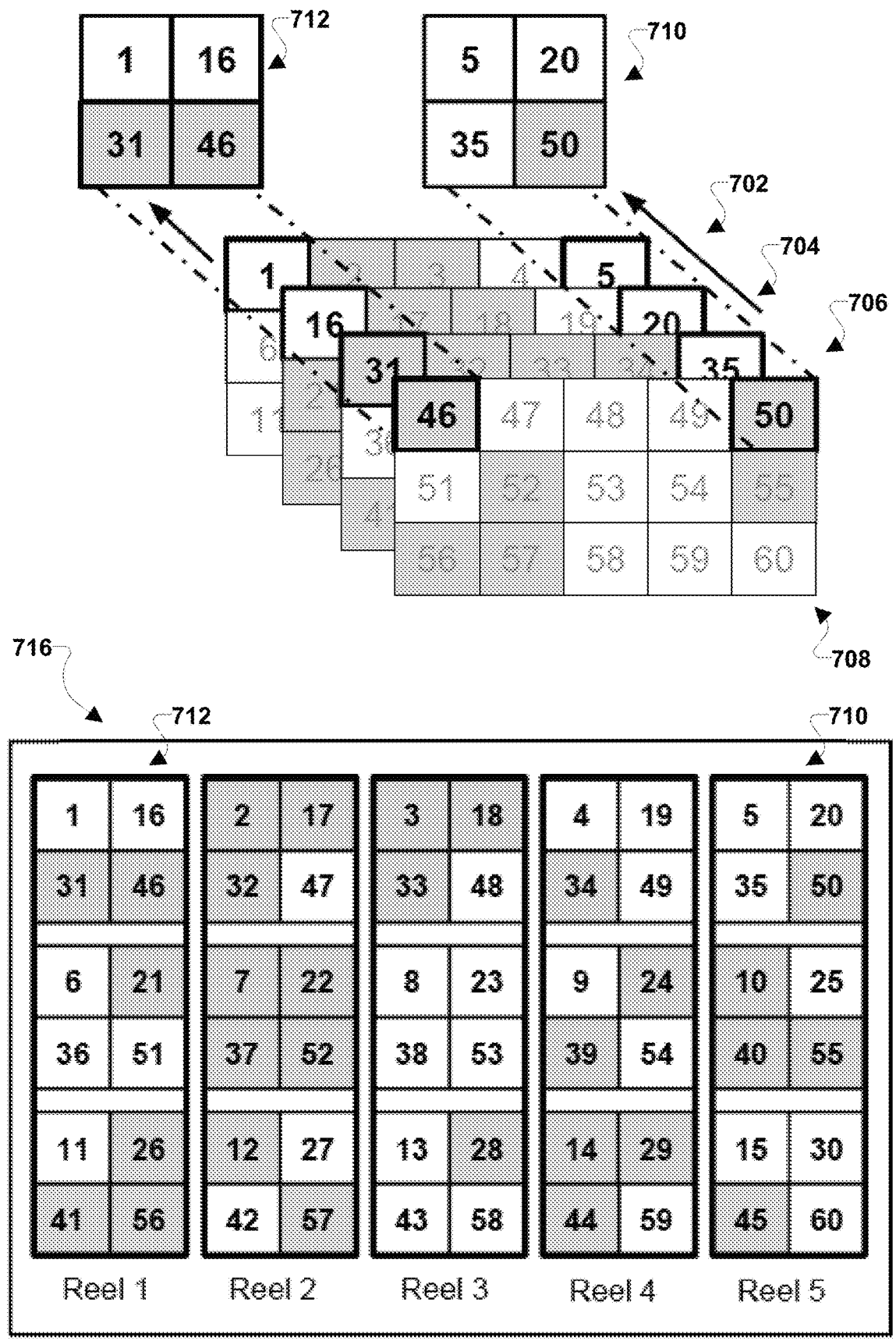
Figure 7C:
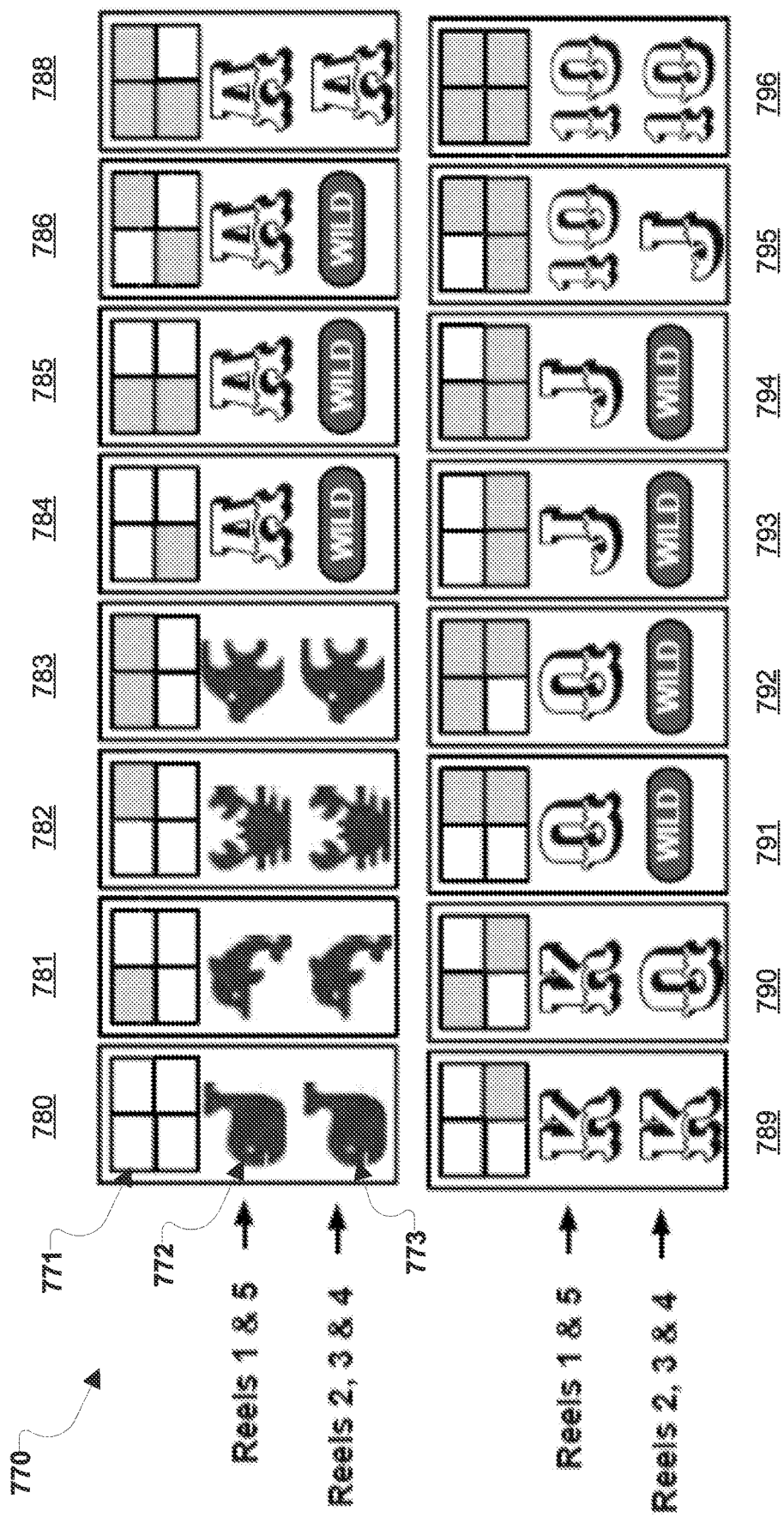

Once all the numbers on the cards 702, 704, 706, and 708 from the common numbers 750 are daubed on the cards 702, 704, 706, and 708, the EGM may combine the cards 702, 704, 706, and 708. For example, the cards 702, 704, 706, and 708 may be combined by associating the cards 702, 704, 706, and 708 overtop one another such that each position in each card 702, 704, 706, and 708 is associated with its counterpart position on the other cards 702, 704, 706, and 708. FIG. 7B illustrates that the combined cards 702, 704, 706, and 708 may be used to generate a series of four block pattern cards. For example, the first row and first column position on each card 702, 704, 706, and 708 may be combined to form a four block pattern card 712 and the first row fifth column position on each card 702, 704, 706, and 708 may be combined to form four block pattern card 710. Each row and column position on the cards 702, 704, 706, and 708 may be used in a similar manner to form four block pattern cards, and these cards may be mapped to reel positions for a three by five reel pattern map 716 as shown in FIG. 7B.

The EGM may use the pattern map 716 with a reel pattern key stored in memory to select symbols for display on the reels shown to the player. For example, a reel pattern key 770 may include a two by two representation of possible hit and miss patterns for four block cards associated with symbols for displays on the reels. The reel pattern key 770 includes 16 different patterns 780-796 mapped to symbols for reels 1 and 5 and reels 2, 3, and 4. For example, pattern 780 includes the two by two representation 771 of no hits and the mapping of a whale symbol 772 for reels 1 and 5 and whale symbol 773 for reels 2, 3, and 4. Thus, a no hit four block pattern at a reel position on pattern map 716 may result in a whale symbol being displayed at that reel position on the display of the EGM. As another example, another reel pattern key 775 is shown in FIG. 7D. Here two by two representations of possible hit and miss patterns for four block cards are correlated with positions on five reel strips, one for each reel. For example, pattern 776 of no hits maps to a whale for reel 1. Thus, a no hit four block pattern at any reel position on pattern map 716 may result in a whale symbol being displayed at that reel position on the display of the EGM according to pattern 775.

Figure 7E:
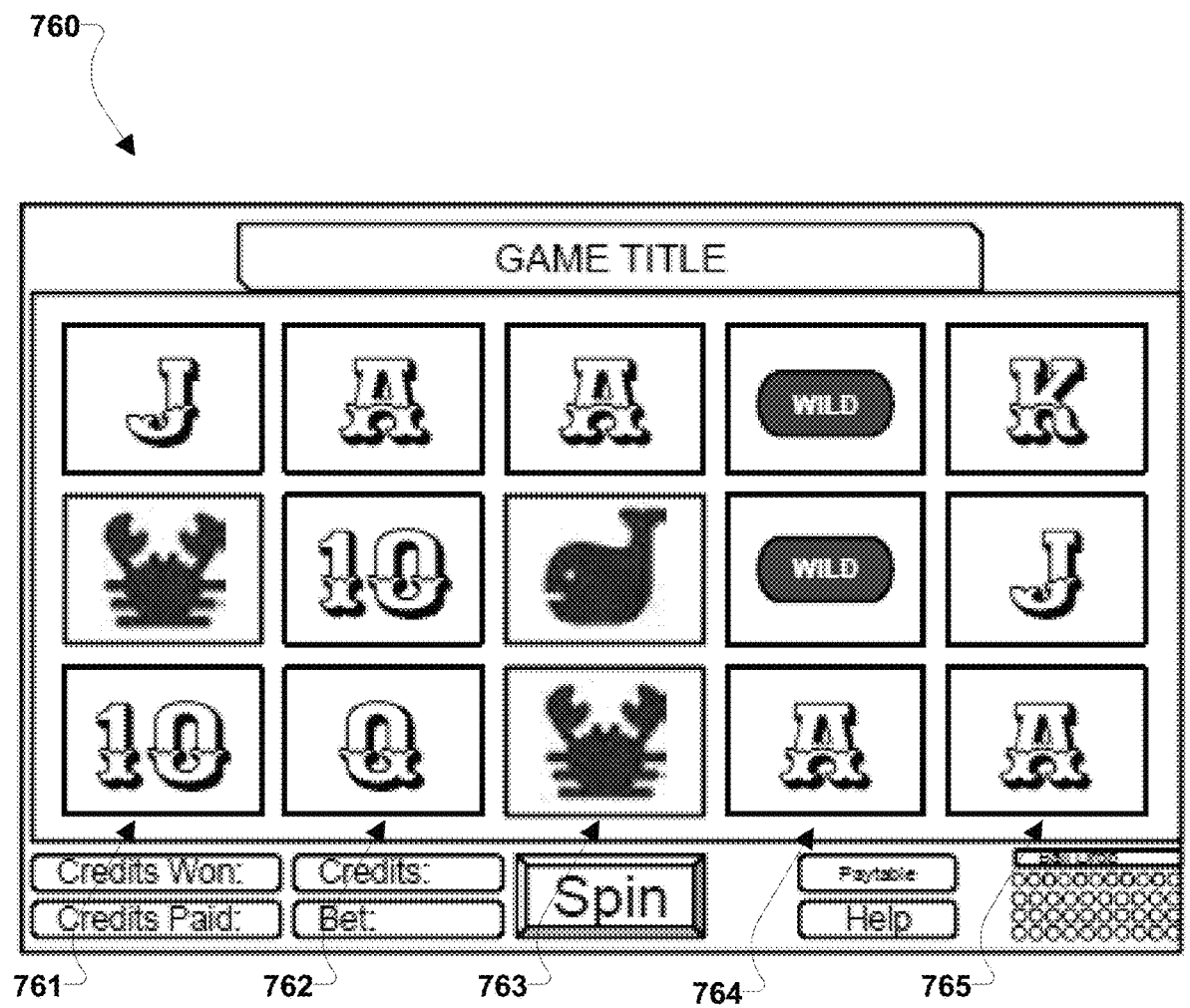

FIG. 7E shows a resulting display of a 3×5 reel strip game display 760 according to the pattern map 716 and a reel pattern key according to various embodiments. The drawn pattern map 716 is used by the EGM to output symbols on each of the reels 761, 762, 763, 764, and 765 on the display 760. In this manner, the player may experience a simulated spinning reel game provided by a ball drop or draw as used in Class II gaming from the common numbers 750.

Figure 8A:
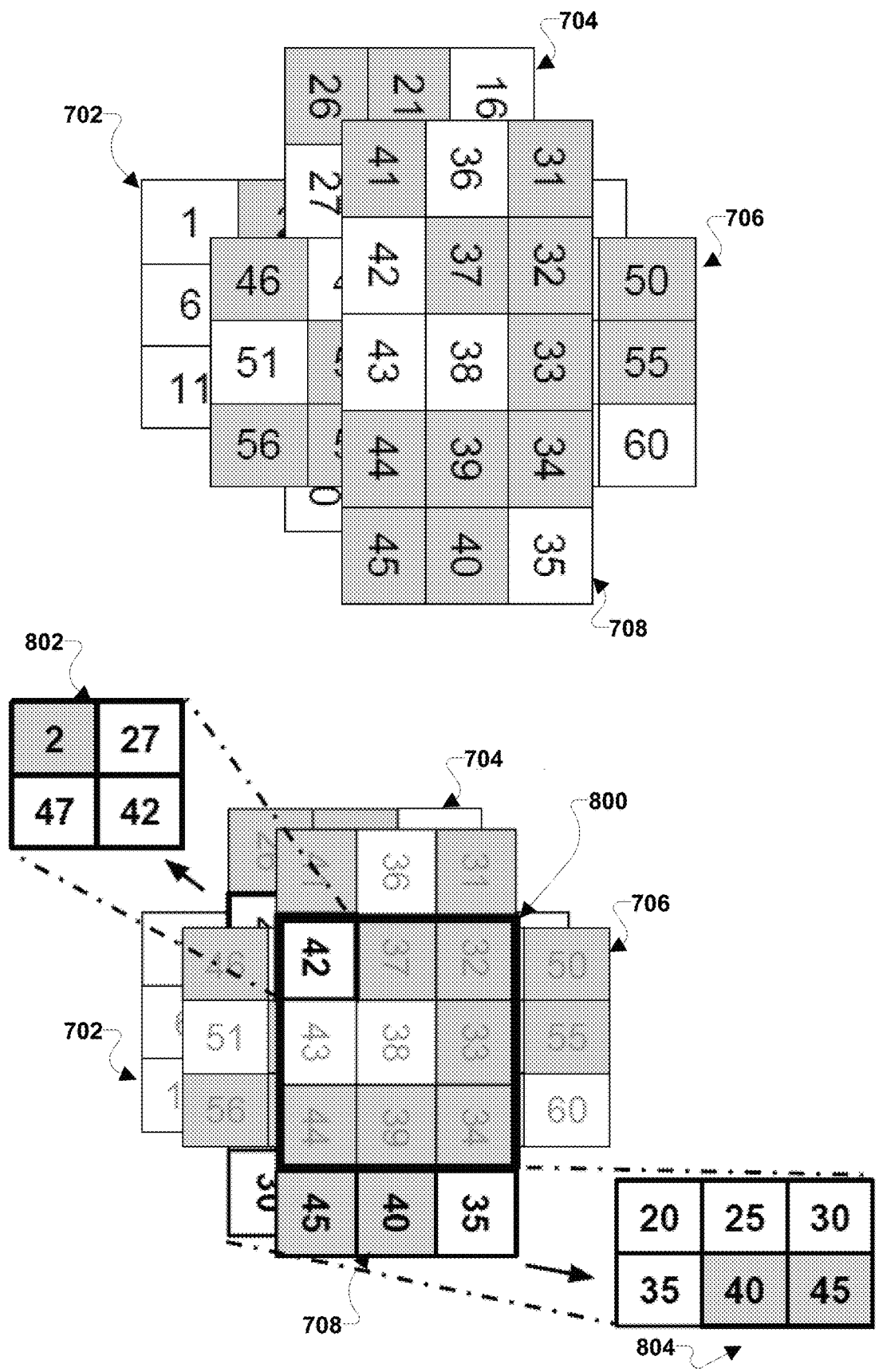
FIGS. 8A, 8B, and 8C illustrate machine mapping of another stacked four-number pattern ball drop reel game according to an embodiment.
Figure 8B:
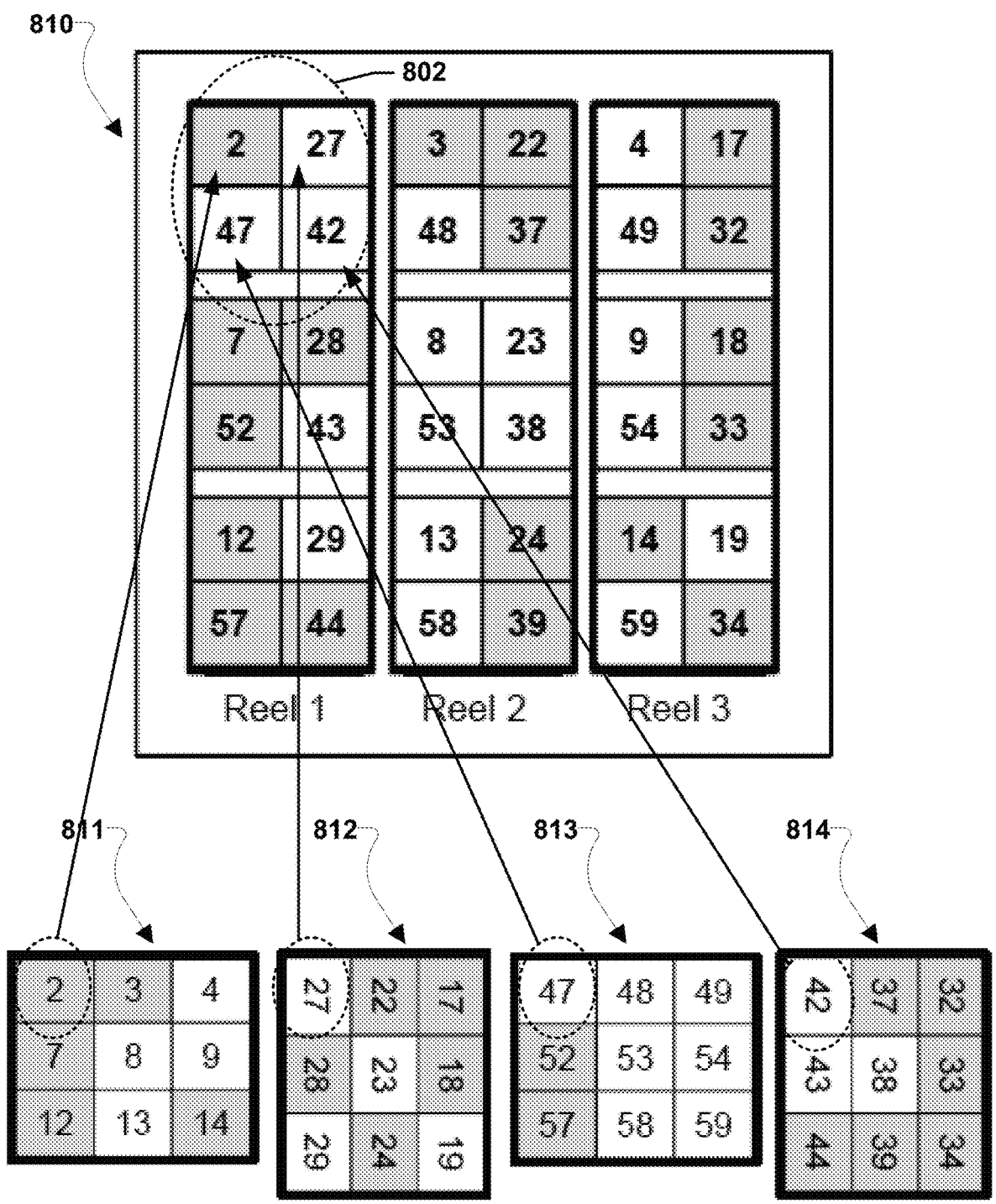
Figure 8C:
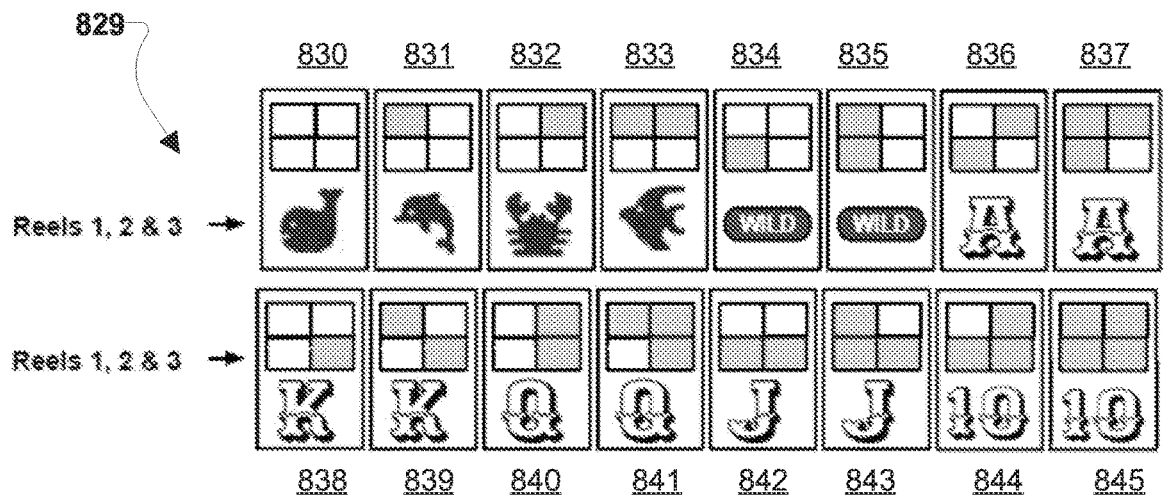
Figure 8C:
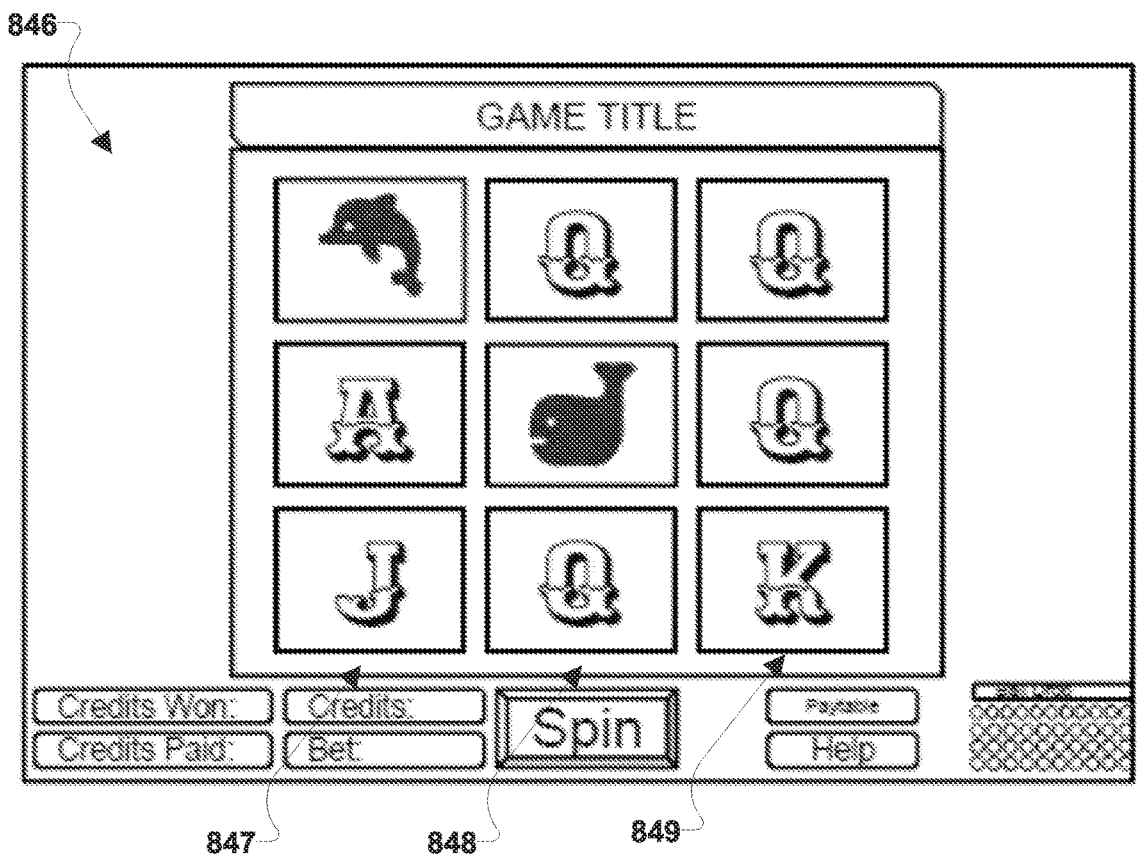

FIGS. 8A, 8B, and 8C illustrate machine mapping of another stacked four-number pattern ball drop reel game according to an embodiment. Various operations of methods 100, 200, 300, and/or 401 described above may be executed by one or more servers and/or one or more computing devices (e.g., EGMs) to provide the reel game illustrated in FIGS. 8A, 8B, and 8C. FIGS. 8A, 8B, and 8C show a sequence of graphics of a portion of a play through of a 3×3 reel game. In the game cards are stacked to create a combined map to produce four-block patterns which determine reel stops. The cards 702, 704, 706, and 708 are the same as discussed above with reference to FIG. 7A and populated by the same ball drop or draw as used in Class II gaming of common numbers 750. However, rather than merely aligning the cards 702, 704, 706, and 708 over one another, a portion of the cards 702, 704, 706, and 708 may be rotated with reference to another portion of the cards 702, 704, 706, and 708. Specifically, FIG. 8A shows cards 704 and 708 rotated 90 degrees to cards 702 and 706. The resulting 3×3 area of positions 800 may include the center rows columns 2-4 of each card 702, 704, 706, and 708 and may be used to create four block patterns, such as pattern 802 (formed from row 1 column 2 of card 702, row 3 column 2 of card 704, row 1 column 2 of card 706, and row 3 column 2 of card 708). The extending six positions for each set of two cards (702 with 706 and 704 with 708) may be used to form six block patterns, such as pattern 804 (formed from column 5 of card 704 and column 5 of card 708).

As shown in FIG. 8B, the 3×3 area of positions 811, 812, 813, and 814 for each card 702, 704, 706, and 708 may be mapped to reel positions for a three by three reel pattern map 810. The EGM may use the pattern map 810 with a reel pattern key stored in memory to select symbols for display on the reels shown to the player. For example, a reel pattern key 829 as shown in FIG. 8C may include a two by two representation of possible hit and miss patterns for four block cards associated with symbols for displays on the reels. The reel pattern key 829 includes 16 different patterns 830-845 mapped to symbols for reels 1, 2, and 3. For example, pattern 830 includes the two by two representation of no hits and the mapping of a whale symbol for reels 1, 2, and 3. Thus, a no hit four block pattern at a reel position on pattern map 810 may result in a whale symbol being displayed at that reel position on the display of the EGM. Display 846 shows one such example, with reels 847, 848, and 849 populated with symbols according to the pattern map 810 and reel pattern key 829. In this manner, the player may experience a simulated three spinning reel game provided by a ball drop or draw as used in Class II gaming from the common numbers 750.

Figure 9A:
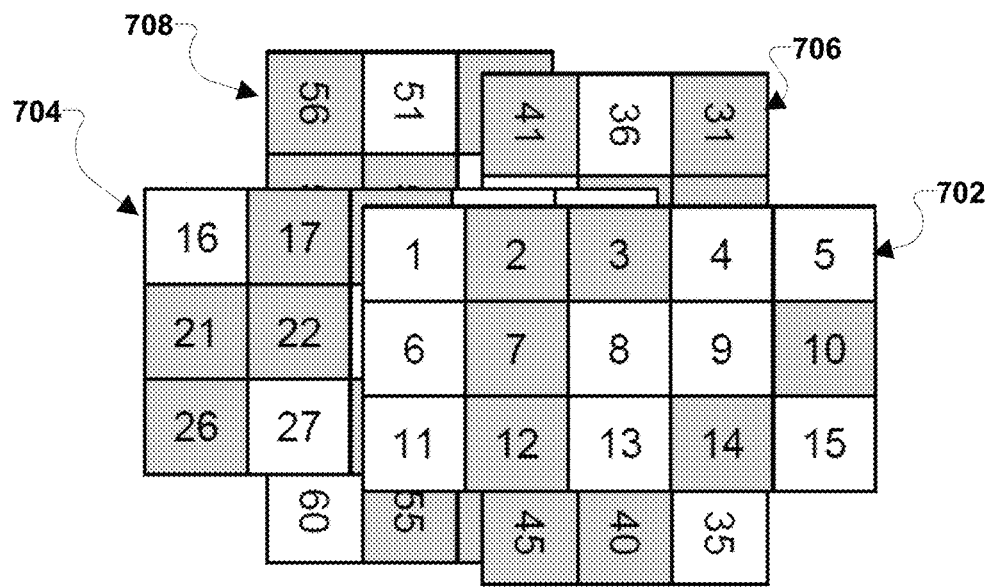
FIGS. 9A, 9B, 9C, and 9D illustrate machine mapping of a stacked varying-size pattern ball drop reel game according to an embodiment.
Figure 9A:
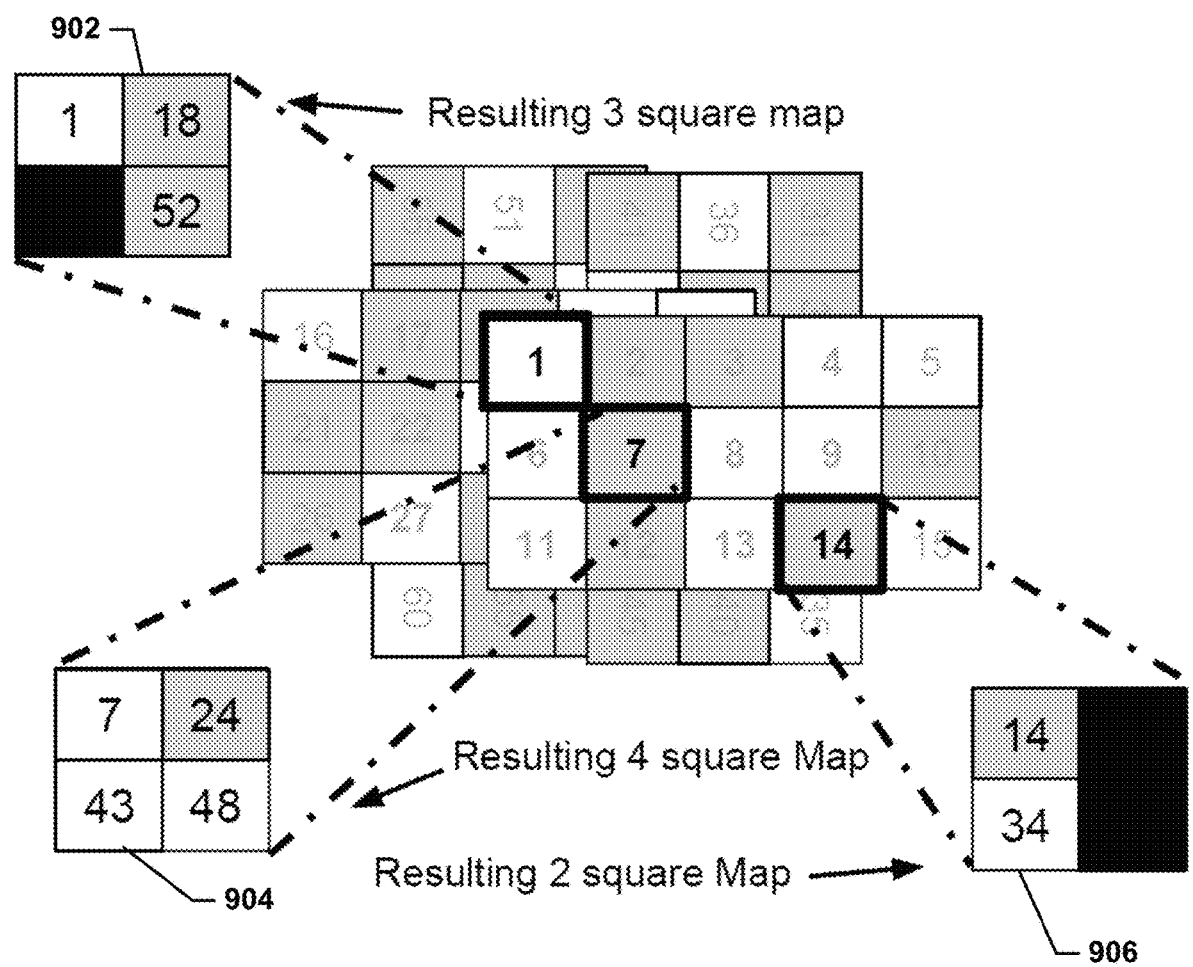

FIGS. 9A, 9B, 9C, and 9D illustrate machine mapping of a stacked varying-size pattern ball drop reel game according to an embodiment. Various operations of methods 100, 200, 300, and/or 401 described above may be executed by one or more servers and/or one or more computing devices (e.g., EGMs) to provide the reel game illustrated in FIGS. 9A, 9B, 9C, and 9D. FIGS. 9A, 9B, 9C, and 9D show a sequence of graphics of a portion of a play through of a 3×5 reel game. In the game, cards are stacked to create a combined map to produce four-block patterns which determine reel stops. The cards 702, 704, 706, and 708 are the same as discussed above with reference to FIG. 7A and populated by the same ball drop or draw as used in Class II gaming of common numbers 750. However, rather than merely aligning the cards 702, 704, 706, and 708 over one another, a portion of the cards 702, 704, 706, and 708 may be rotated with reference to another portion of the cards 702, 704, 706, and 708 and offset from one another. Specifically, FIG. 9A shows cards 706 and 708 rotated 90 degrees to cards 702 and 704 and cards 704 and 708 shifted two columns to the left of cards 702 and 706. The overlapping positions may be used to create a two square map 906, a three square map 902, and a four square map 904.

Figure 9B:
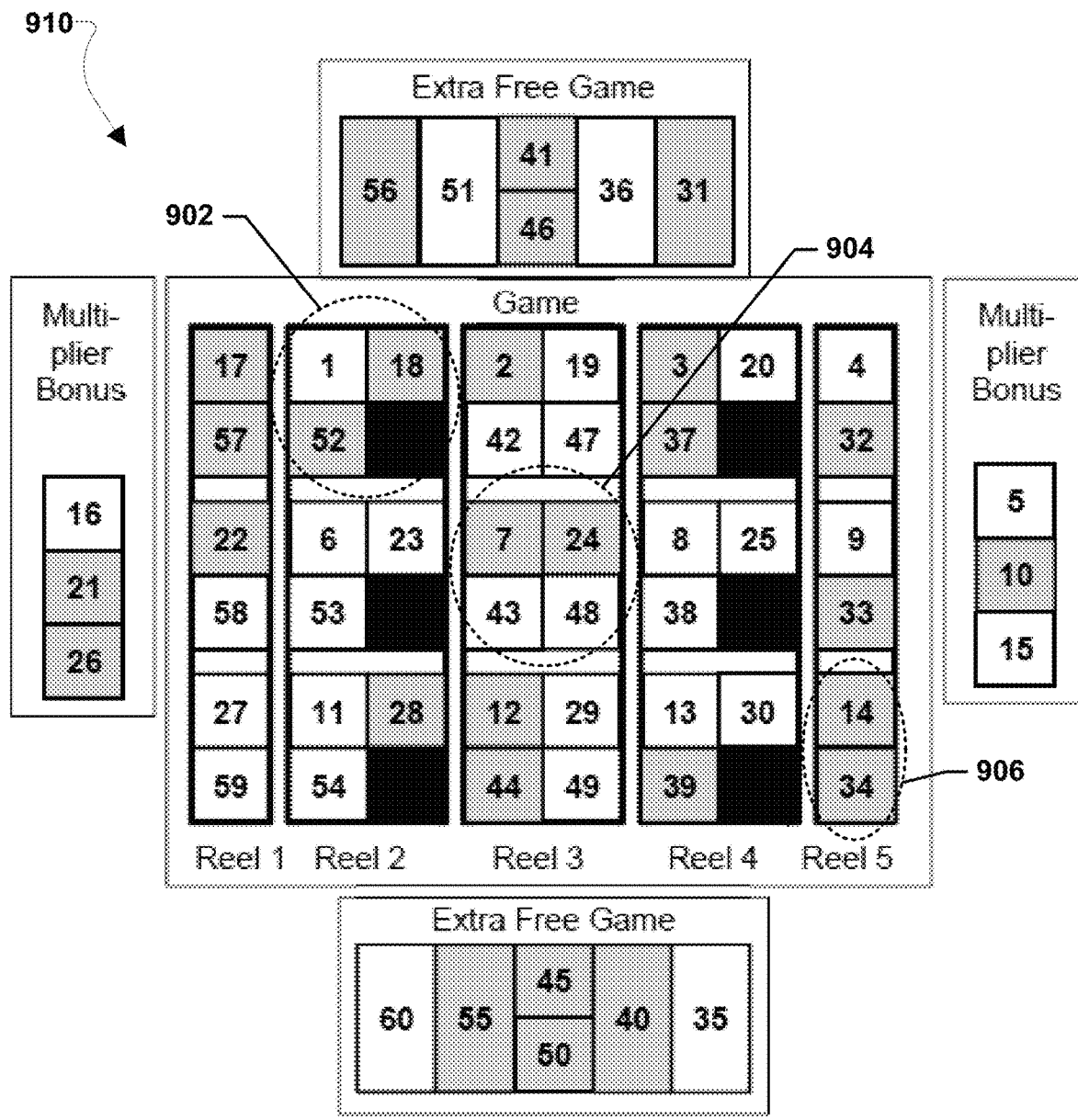
Figure 9C:
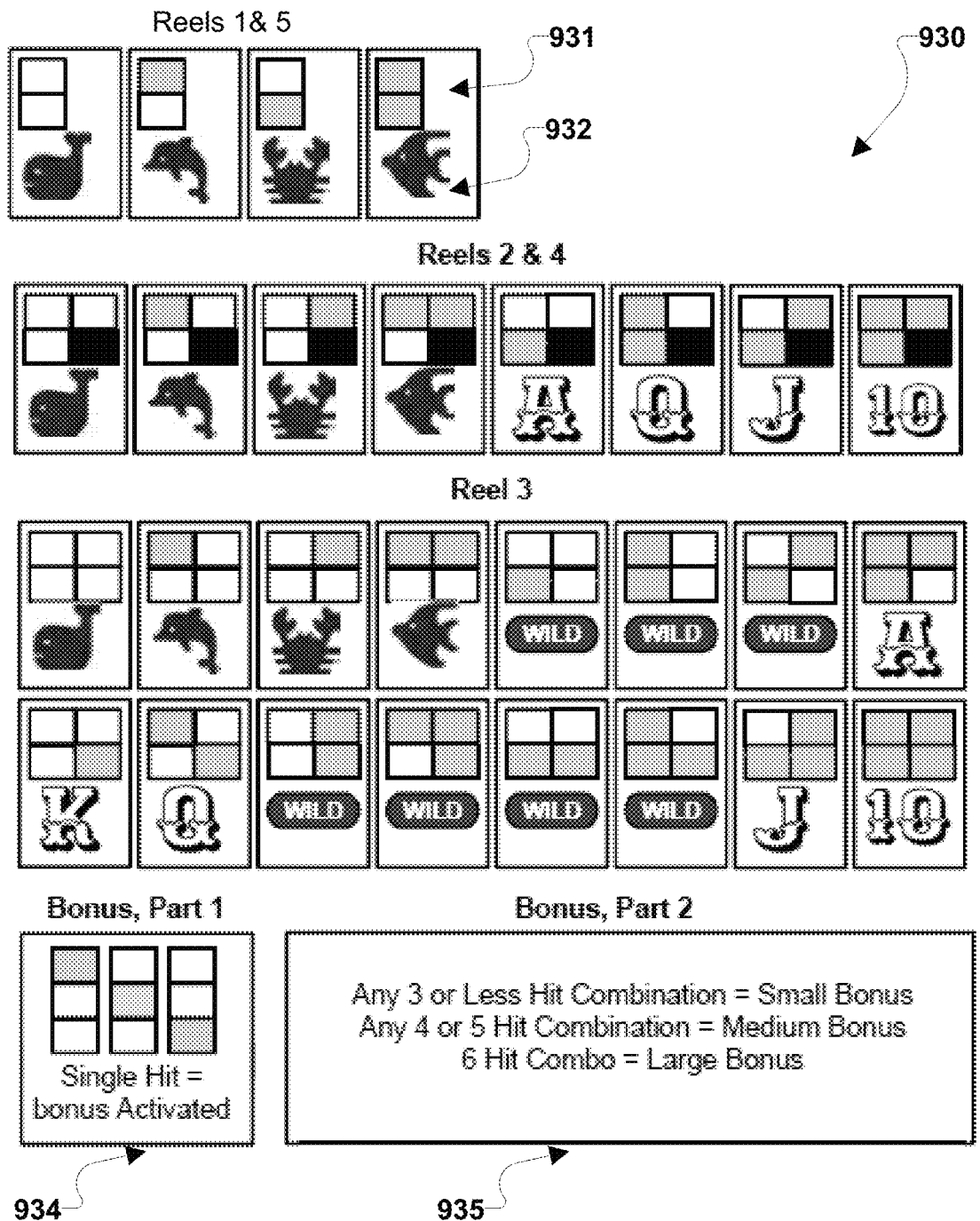
Figure 9D:
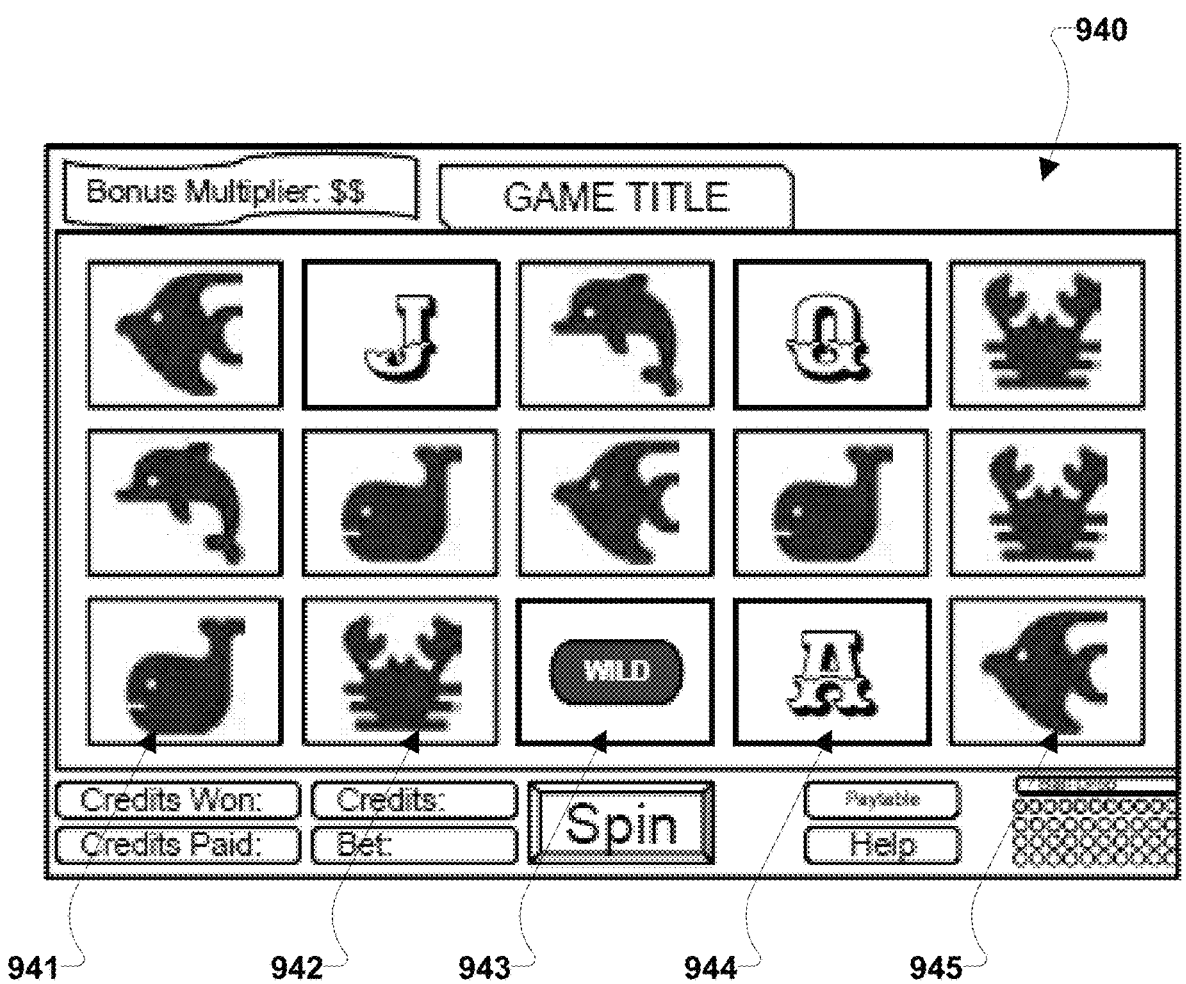

As shown in FIG. 9B, these varying number square maps (such as maps, 902, 904, and 906), may be mapped to reel positions for a three by five reel pattern map 910 with bonus maps. The EGM may use the pattern map 910 with a reel pattern key stored in memory to select symbols for display on the reels shown to the player. For example, a reel pattern key 930 as shown in FIG. 9C may include different array size pattern representations of possible hit and miss patterns associated with symbols for display on the reels. 2×1 patterns may be used for reels 1 and 5, such as pattern 931 associated with a fish symbol 932, 4×4 patterns may be used for reels 2, 3, and 4, and a 3×3 pattern may be used for a bonus 934. Additionally, other bonus rules 935 may be described in the pattern map 910. Display 940 in FIG. 9D shows example reels 941, 942, 943, 944, and 945 populated with symbols according to the pattern map 910 and reel pattern key 930. In this manner, the player may experience a simulated five spinning reel game with bonuses provided by a ball drop or draw as used in Class II gaming from the common numbers 750.

FIGS. 10A, 10B, 10C, 10D, and 10E illustrate machine mapping of a stacked five-number pattern ball drop reel game according to an embodiment. Various operations of methods 100, 200, 300, and/or 401 described above may be executed by one or more servers and/or one or more computing devices (e.g., EGMs) to provide the reel game illustrated in FIGS. 10A, 10B, 10C, 10D, and 10E. FIGS. 10A, 10B, 10C, 10D, and 10E show a sequence of graphics of a portion of a play through of a 5×5 reel game. In the game, cards are stacked to create a combined map to produce five-block patterns which determine reel stops.

Figure 10A:
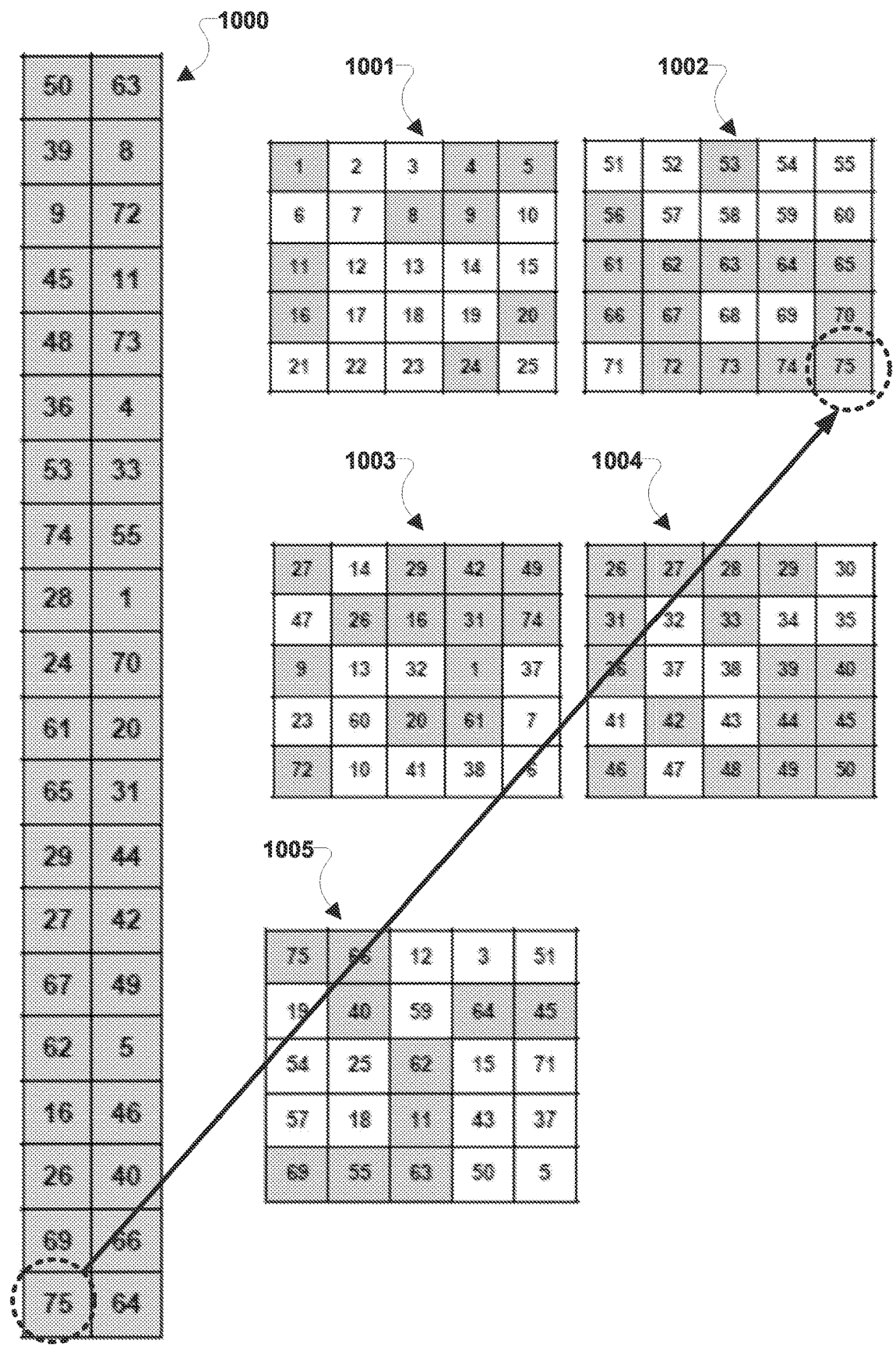
FIGS. 10A, 10B, 10C, 10D, and 10E illustrate machine mapping of a stacked five-number pattern ball drop reel game according to an embodiment.

Referring to FIG. 10A, at the start of the game a server may randomly pick common numbers 1000 for use by all EGMs offering a game at that time. The randomly picked common numbers 1000 may represent a ball drop or draw as used in Class II gaming. Each EGM may have a set of five randomly populated cards, such as cards 1001, 1002, 1003, 1004, and 1005. There may be sets for each EGM playing at the time, and the number of playing EGMs may be any number of EGMs. The set of cards 1001, 1002, 1003, 1004, and 1005 may be unique bingo type cards. The server may provide the common numbers 1000 to each EGM and the EGMs may daub the selected corresponding numbers on their respective cards 1001, 1002, 1003, 1004, and 1005. For example, the selected number 75 on the common numbers 1000 may result in the number 75 at the fifth row fifth column position of card 1002 being daubed on at the EGM storing card 1002.

Figure 10B:
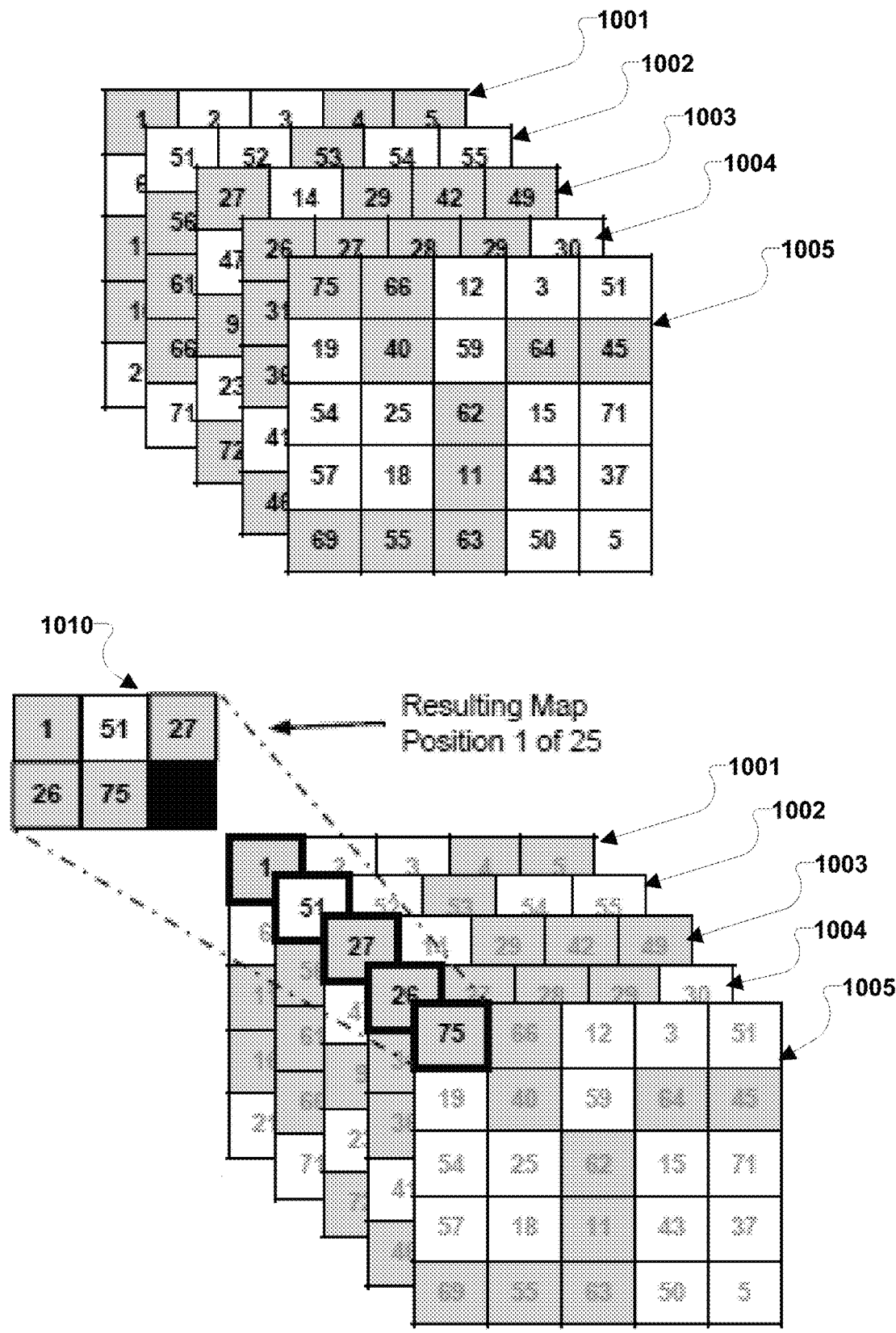
Figure 10C:
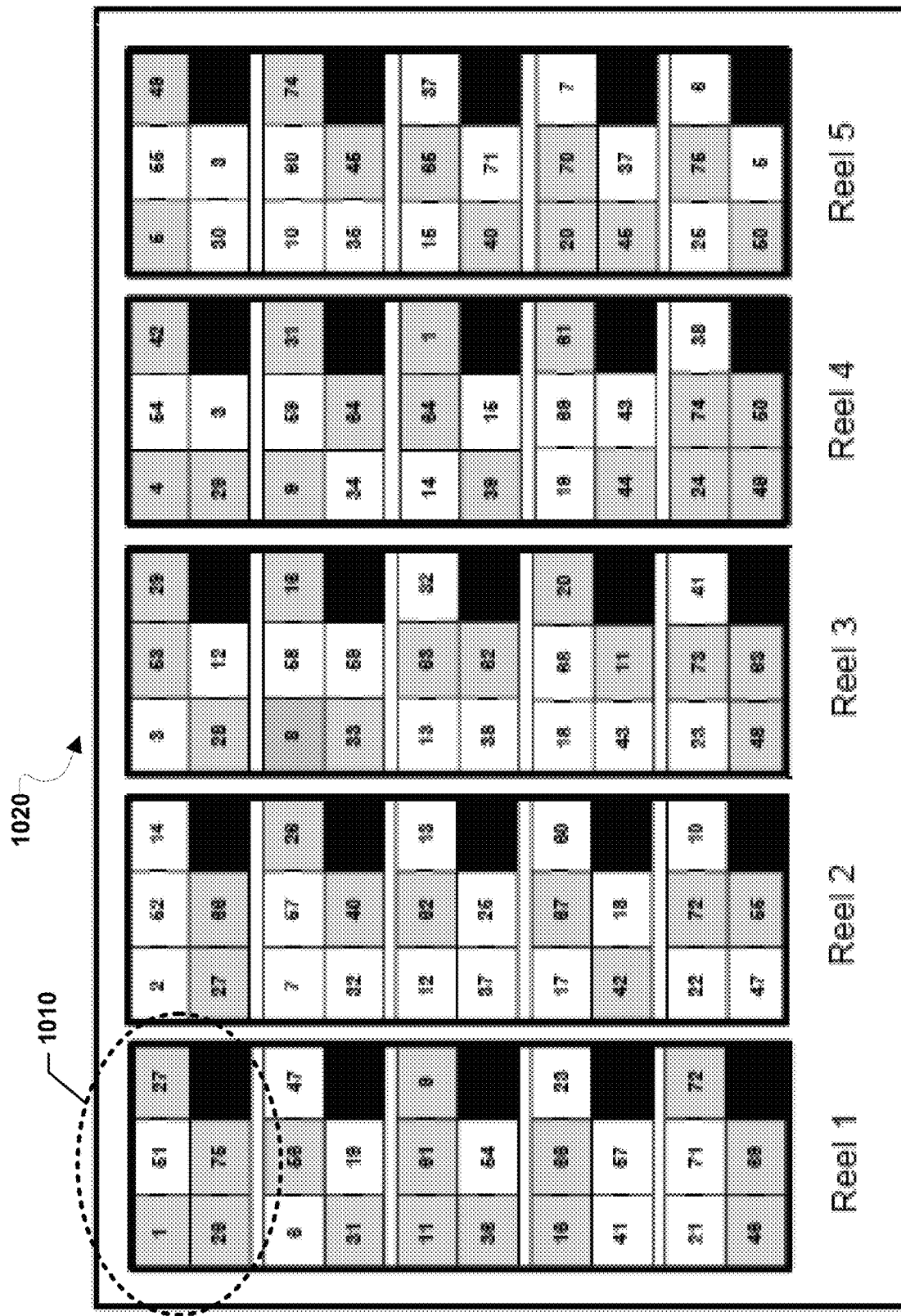

Once all the numbers on the cards 1001, 1002, 1003, 1004, and 1005 from the common numbers 1000 are daubed on the cards 1001, 1002, 1003, 1004, and 1005, the EGM may combine the cards 1001, 1002, 1003, 1004, and 1005. For example, the cards 1001, 1002, 1003, 1004, and 1005 may be combined by associating the cards 1001, 1002, 1003, 1004, and 1005 overtop one another such that each position in each card 1001, 1002, 1003, 1004, and 1005 is associated with its counterpart position on the other cards 1001, 1002, 1003, 1004, and 1005. FIG. 10B illustrates that the combined cards 1001, 1002, 1003, 1004, and 1005 may be used to generate a series of five block pattern cards. For example, the first row and first column position on each card 1001, 1002, 1003, 1004, and 1005 may be combined to form a five block pattern card 1010. Each row and column position on the cards 1001, 1002, 1003, 1004, and 1005 may be used in a similar manner to form five block pattern cards, and these cards may be mapped to reel positions for a five by five reel pattern map 1020 as shown in FIG. 10C.

Figure 10D:
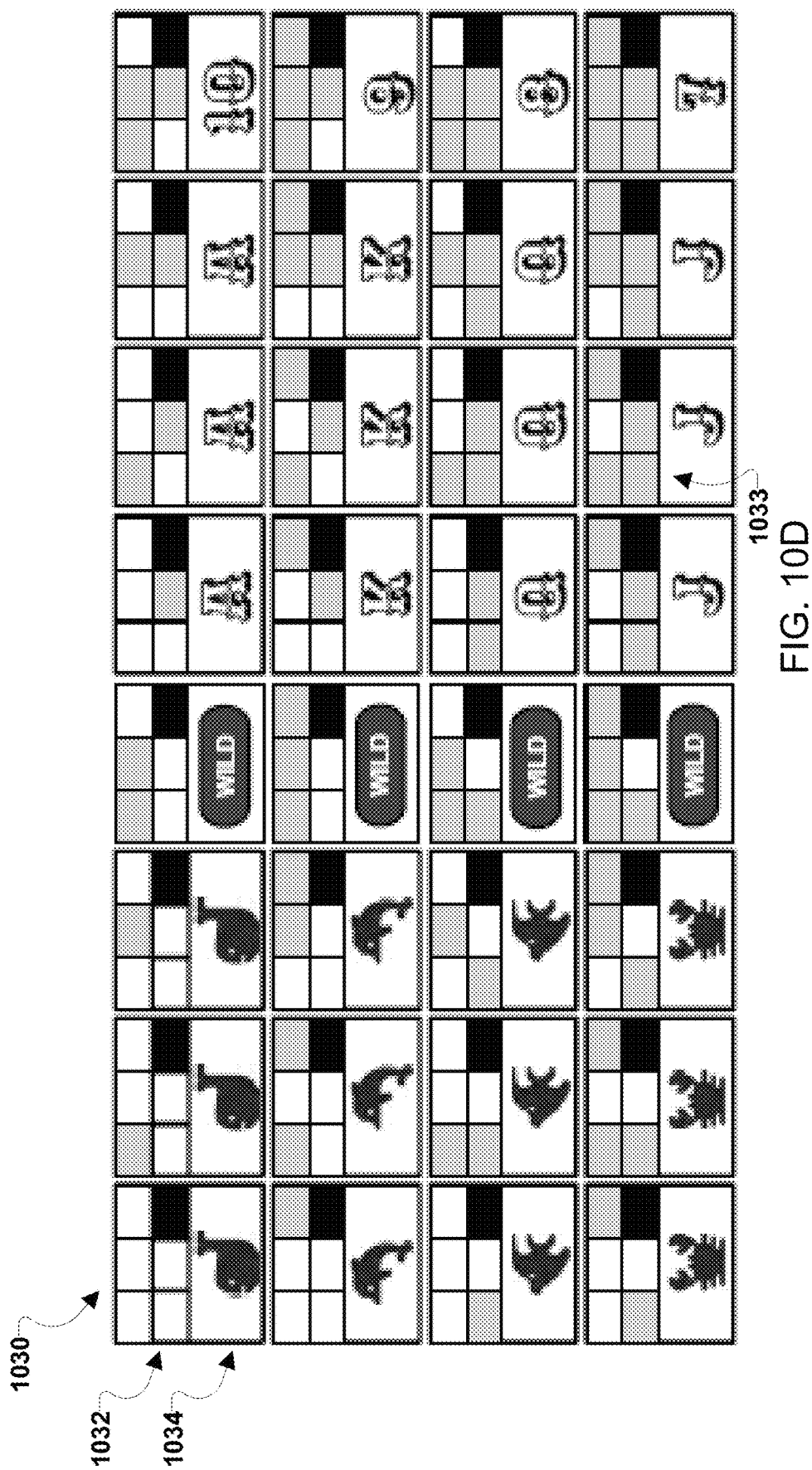

The EGM may use the pattern map 1020 with a reel pattern key stored in memory to select symbols for display on the reels shown to the player. For example, a reel pattern key 1030 as shown in FIG. 10D may include a 2×3 representation of possible hit and miss patterns for five block cards associated with symbols for displays on the reels. The reel pattern key 1030 includes different patterns mapped to symbols for use on the reels 1-5. For example, pattern 1032 of all misses may be mapped to a whale symbol 1034. As another example, the pattern of hits in five block pattern card 1010 may be associated with the symbol "J" 1033.

Figure 10E:
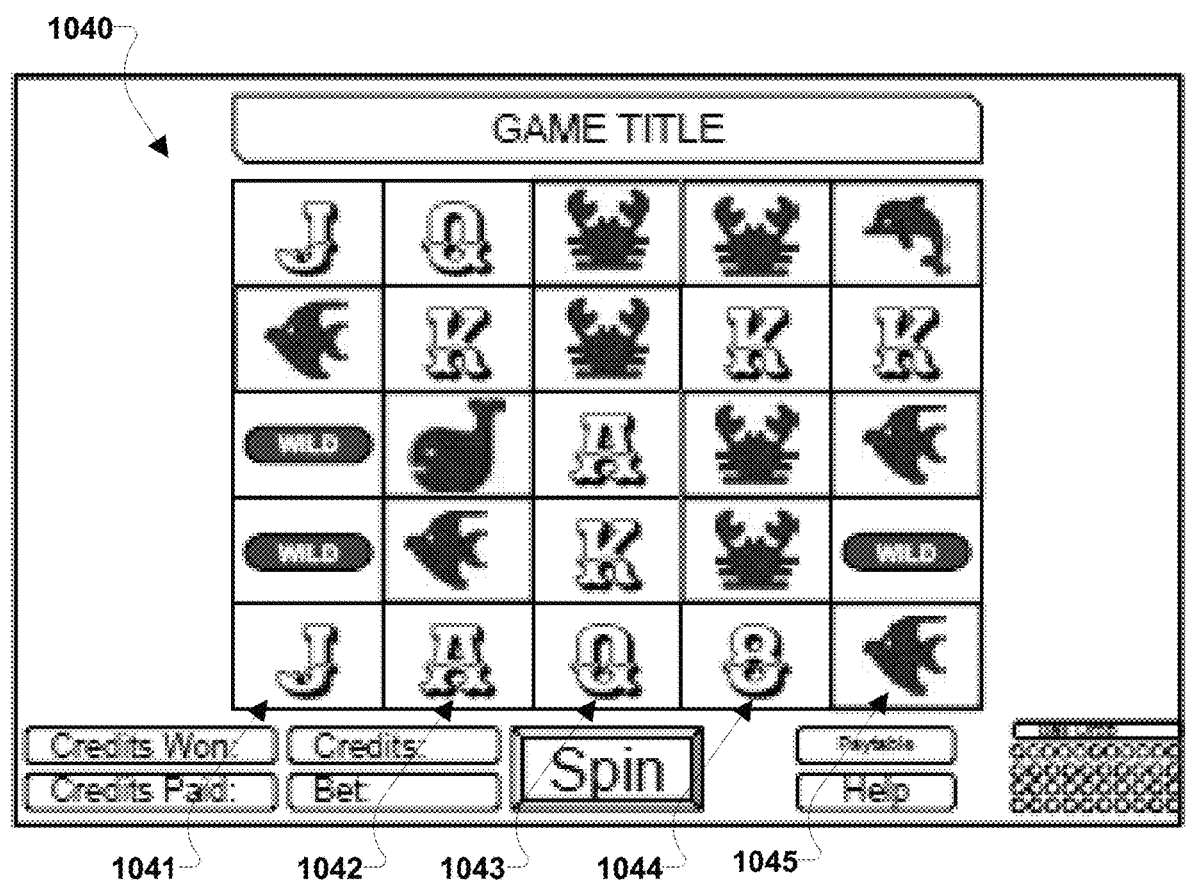

FIG. 10E shows a resulting display of a 5×5 reel strip game display 1040 according to the pattern map 1020 and a reel pattern key 1030 according to various embodiments. The drawn pattern map 1020 is used by the EGM to output symbols on each of the reels 1041, 1042, 1043, 1044, and 1045 on the display 1040. In this manner, the player may experience a simulated spinning reel game provided by a ball drop or draw as used in Class II gaming from the common numbers 1000.

FIGS. 11A, 11B, 11C, and 11D illustrate a reel game based on machine mapping of ball drop patterns to reel stops according to an embodiment. Various operations of methods 100, 200, 300, and/or 401 described above may be executed by one or more servers and/or one or more computing devices (e.g., EGMs) to provide the reel game illustrated in FIGS. 11A, 11B, 11C, and 11D. FIGS. 11A, 11B, 11C, and 11D show a sequence of graphics of a portion of a play through of a 3×5 reel game. In the game, machine mapping is used to determine reel stops on a reel strip. The example game illustrated includes 60 stops, but more or less stops may be used in various embodiments.

Figure 11A:
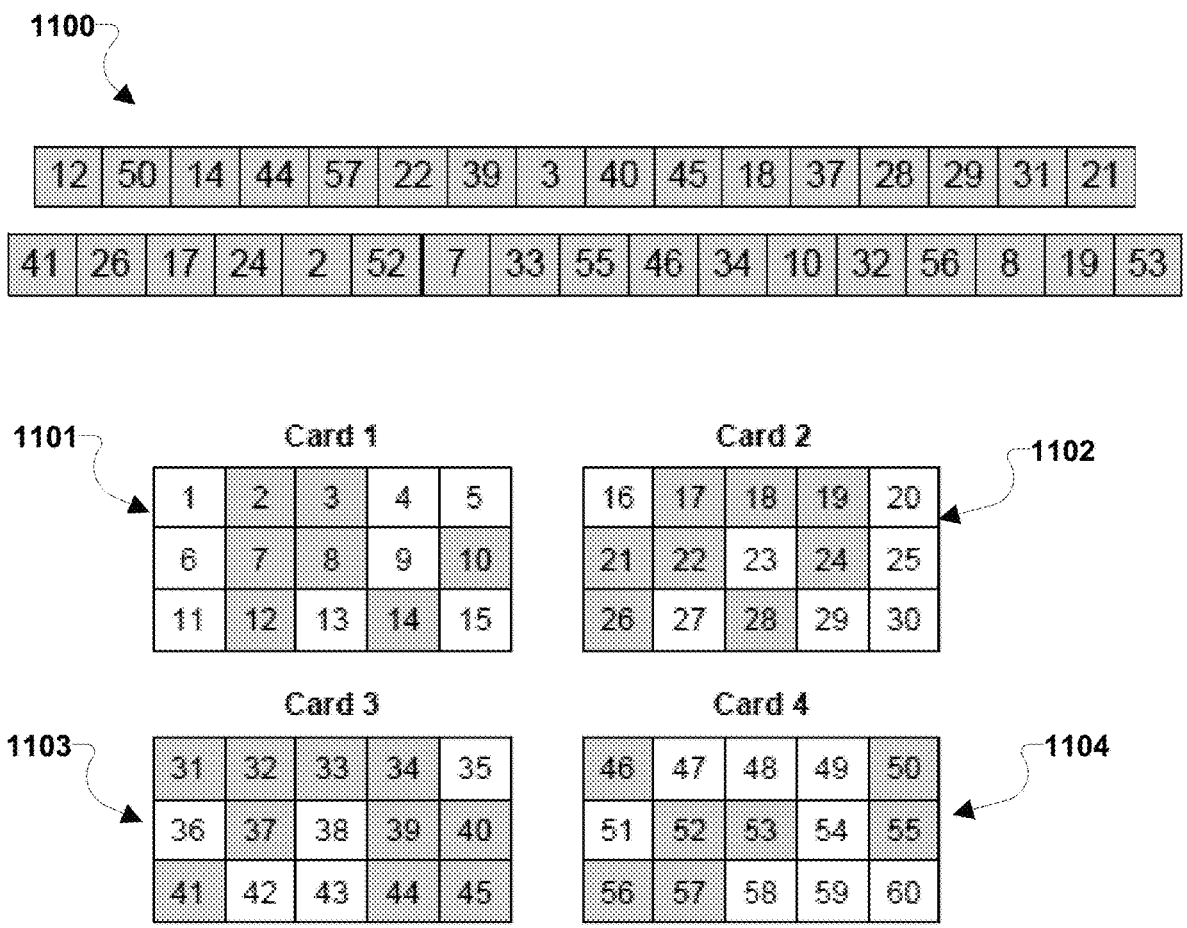
FIGS. 11A, 11B, 11C, and 11D illustrate a reel game based on machine mapping of ball drop patterns to reel stops according to an embodiment.
Figure 11B:
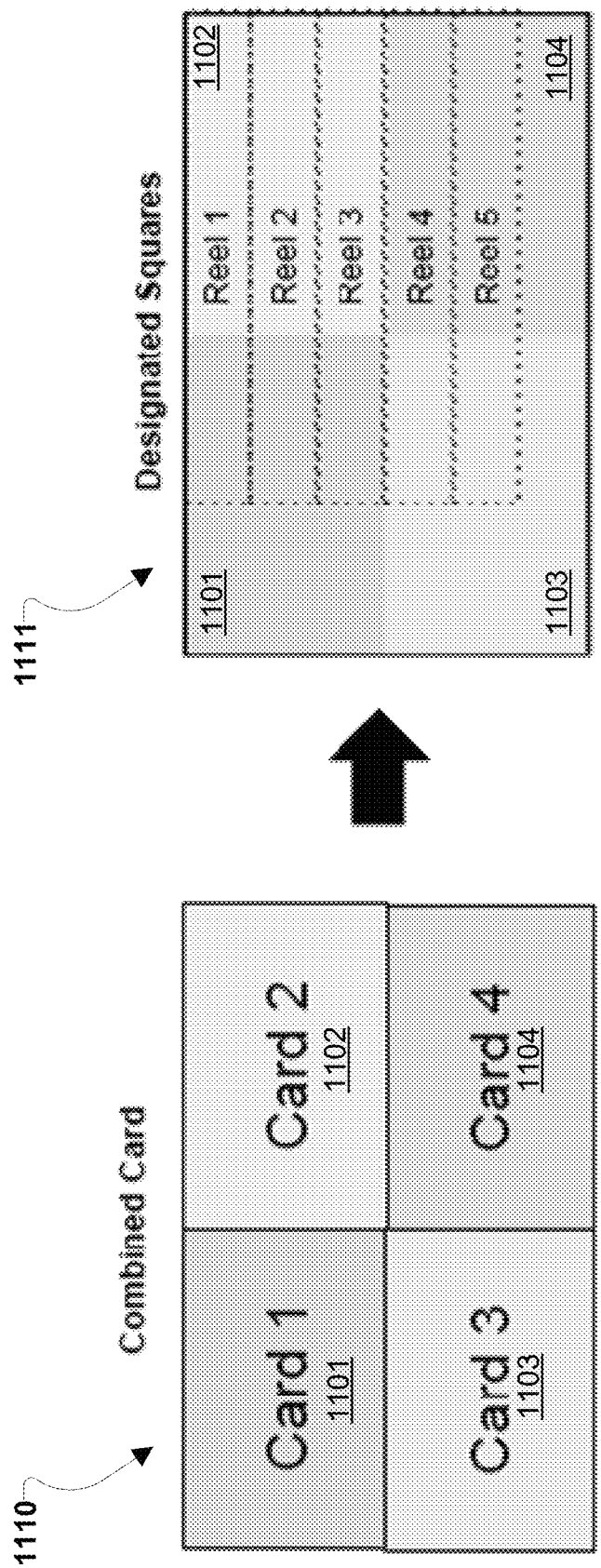
Figure 11C:
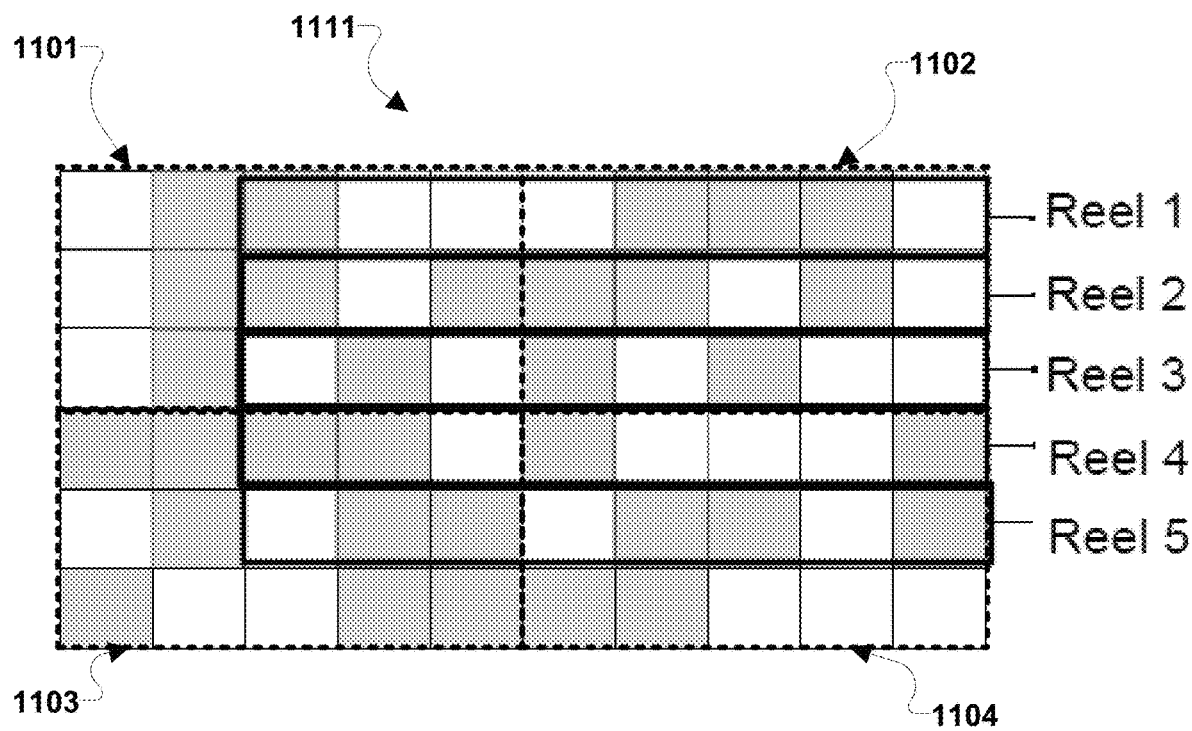
Figure 11C:
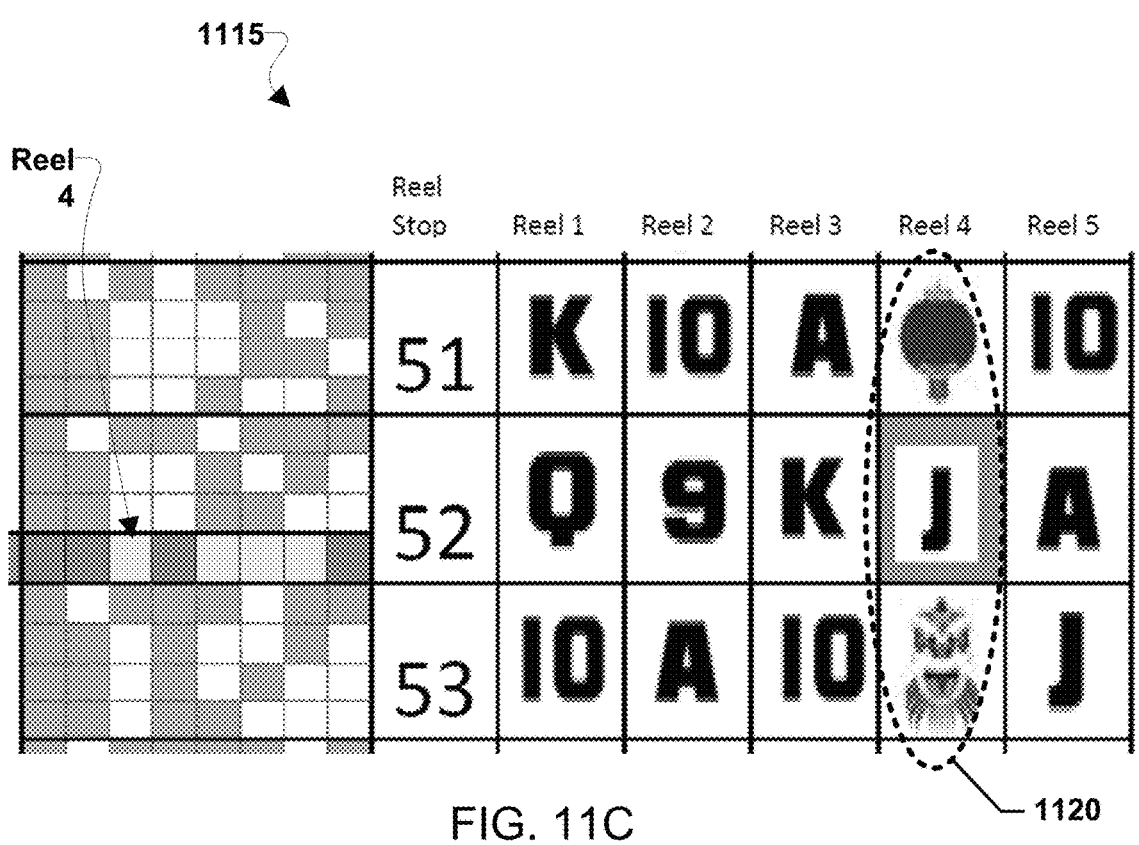
Figure 11D:
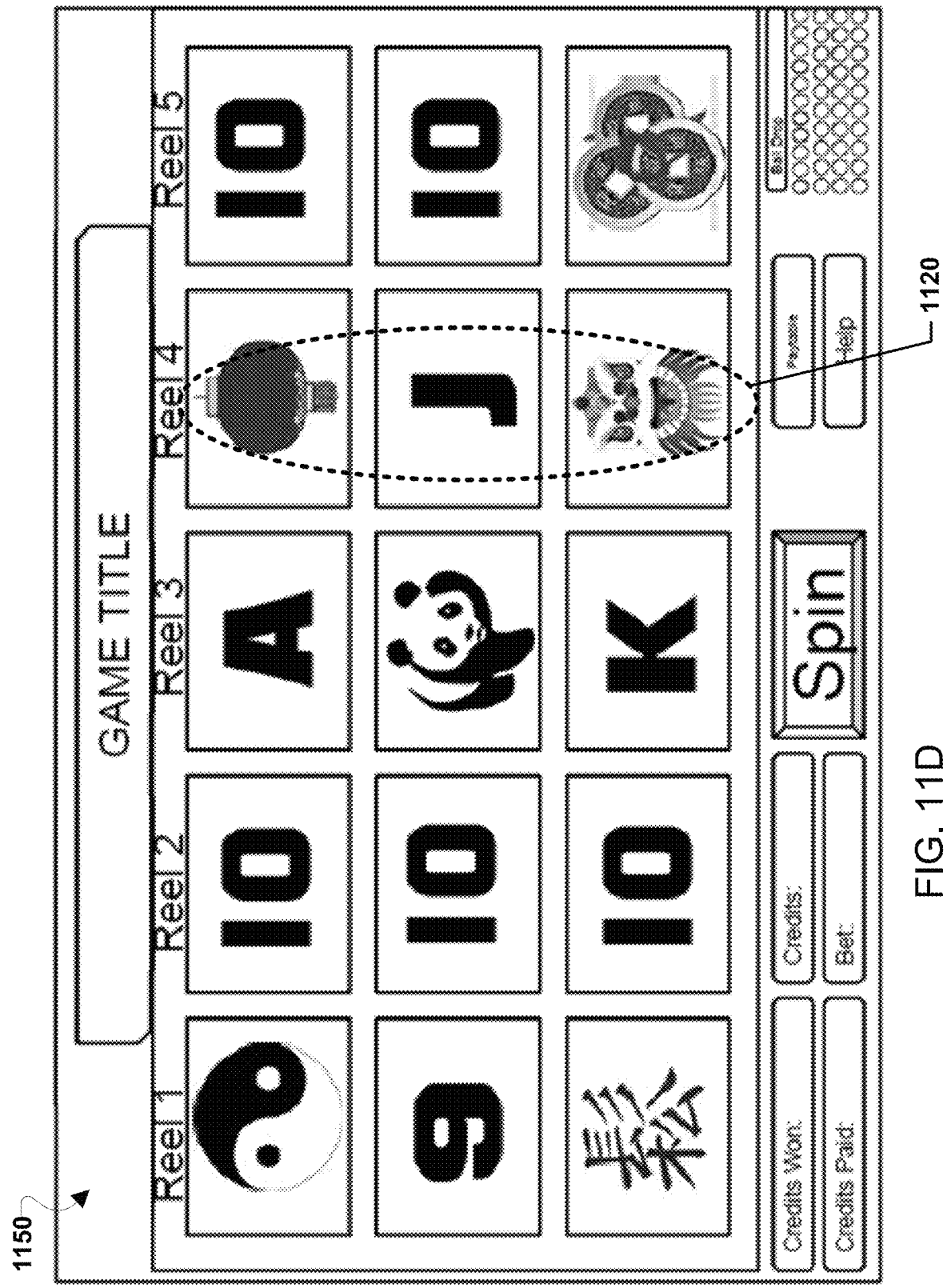

Referring to FIG. 11A, at the start of the game a server may randomly pick common numbers 1100 for use by all EGMs offering a game at that time. The randomly picked common numbers 1100 may represent a ball drop or draw as used in Class II gaming. Each EGM may have a set of four randomly populated cards, such as cards 1101, 1102, 1103, and 1104. There may be sets for each EGM playing at the time, and the number of playing EGMs may be any number of EGMs. The set of cards 1101, 1102, 1103, and 1104 may be unique bingo type cards. The server may provide the common numbers 1100 to each EGM and the EGMs may daub the selected corresponding numbers on their respective cards 1101, 1102, 1103, and 1104. As shown in FIG. 11B, the four cards 1101, 1102, 1103, and 1104 may be combined into one card 1110. Five designated eight square areas 1111 may be overlaid on the card 1110 that correspond to each of the five reels of the game as shown in FIG. 11B. FIG. 11C shows the daubed versions of the combined card 1110 with the reels 1-5 for areas 1111 overlaid. The EGM may include a reel stop key in memory, a portion of which 1115 is illustrated in FIG. 11C. The reel stop key may map all possible 8-square patterns of hits and misses to reel stops. For example, the patterns may be mapped to 60 reel stops. The pattern for each reel 1-5 in the areas 1111 may be compared to the reel stop key to select the reel stop for that reel. For example, using the reel stop portion 1115 reel 4's pattern may be associated with reel stop 52 resulting in reel 4 displaying the symbols 1120 in the three positions. FIG. 11D shows a game display 1150 with reel 4 showing such symbols 1120. In this manner, the player may experience a simulated spinning reel game provided by a ball drop or draw as used in Class II gaming from the common numbers 1100.

FIGS. 12A, 12B, 12C, and 12D illustrate a video poker game based on machine mapping of ball drop patterns according to an embodiment. Various operations of methods 100, 200, 300, and/or 401 described above may be executed by one or more servers and/or one or more computing devices (e.g., EGMs) to provide the video poker game illustrated in FIGS. 12A, 12B, 12C, and 12D. FIGS. 12A, 12B, 12C, and 12D show a sequence of graphics of a portion of a play through of a video poker game. In the game, machine mapping is used to determine cards to display.

Figure 12B:
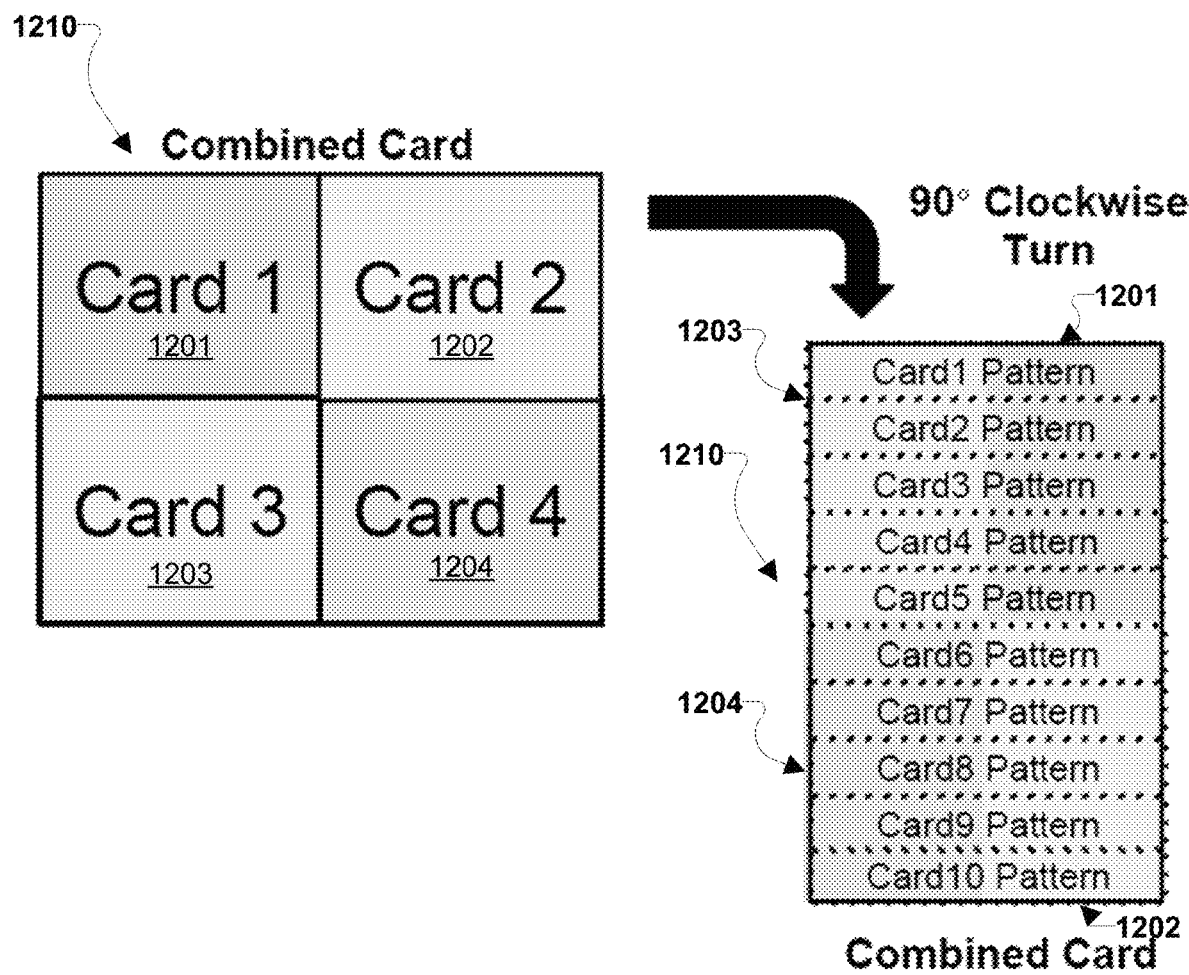
Figure 12C:
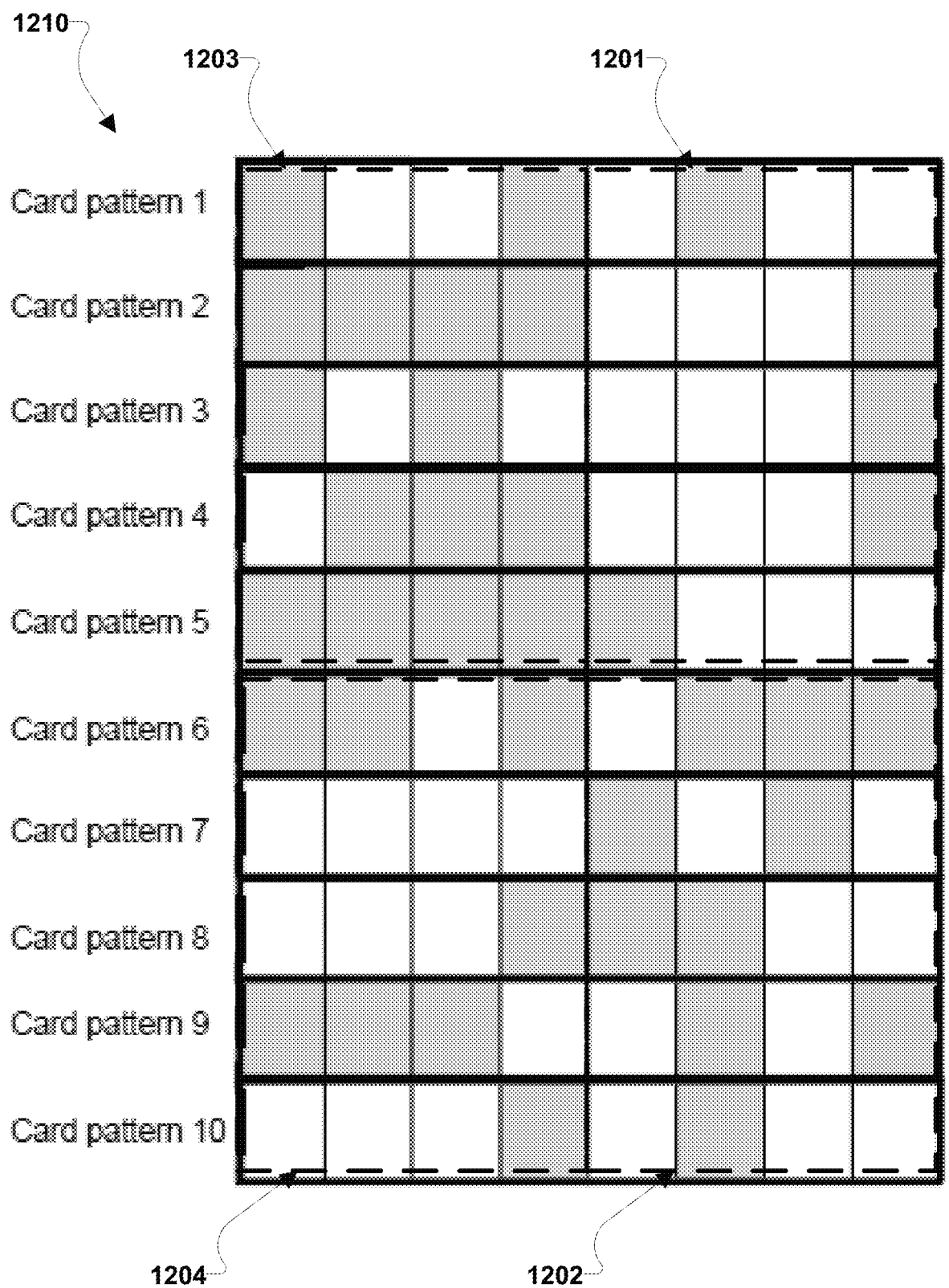
Figure 12D:
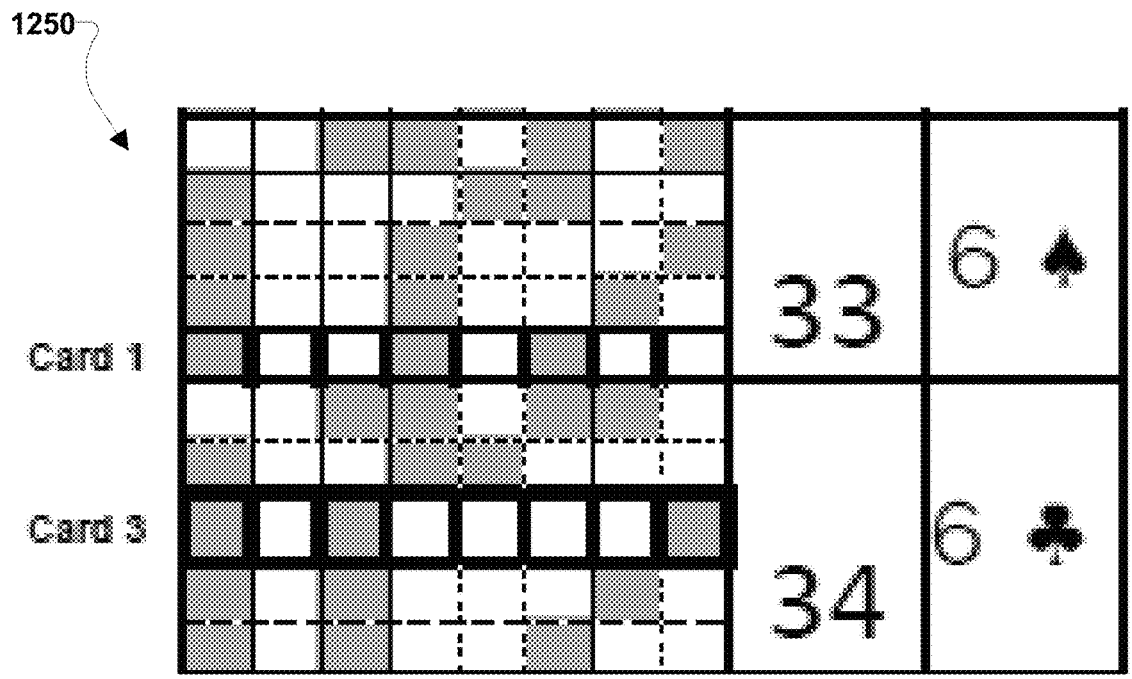
Figure 12D:
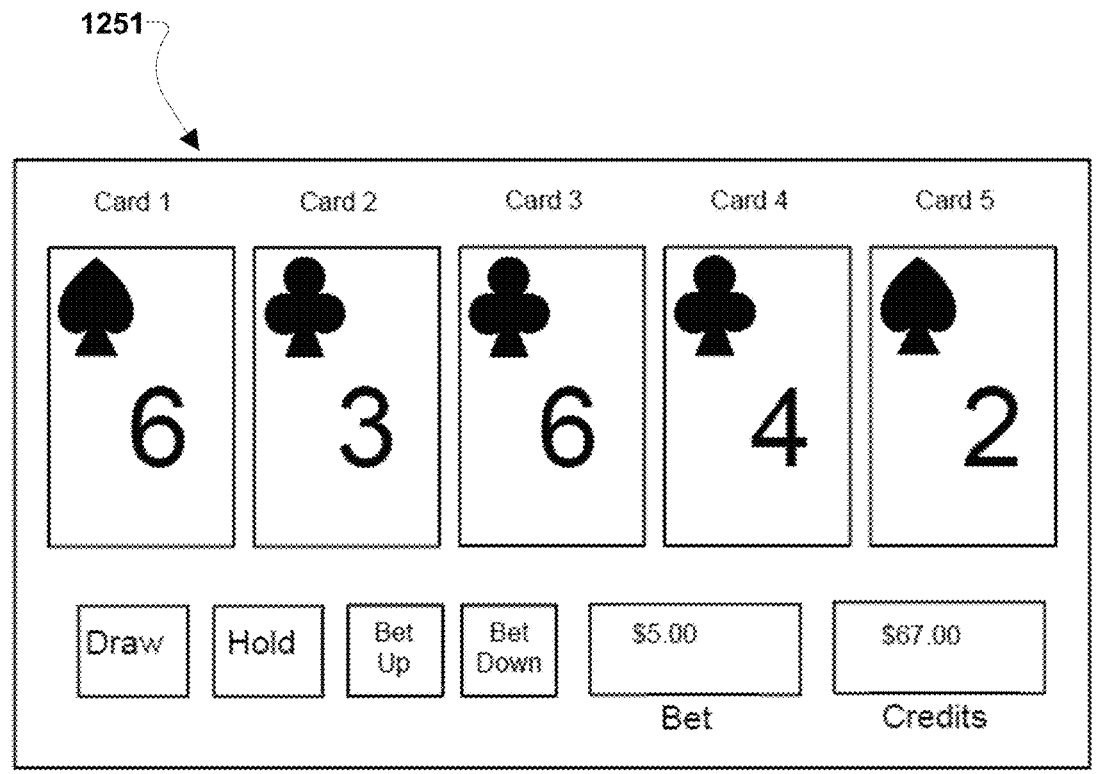

Referring to FIG. 12A, at the start of the game a server may randomly pick common numbers 1200 for use by all EGMs offering a game at that time. The randomly picked common numbers 1200 may represent a ball drop or draw as used in Class II gaming. Each EGM may have a set of four randomly populated cards, such as cards 1201, 1202, 1203, and 1204. There may be sets for each EGM playing at the time, and the number of playing EGMs may be any number of EGMs. The set of cards 1201, 1202, 1203, and 1204 may be unique bingo type cards. The server may provide the common numbers 1200 to each EGM and the EGMs may daub the selected corresponding numbers on their respective cards 1201, 1202, 1203, and 1204. As shown in FIG. 12B, the four cards 1201, 1202, 1203, and 1204 may be combined into one card 1210. The combined card 1210 may be rotated ninety degrees and 10 card patterns of eight squares each may be overlaid across the rows of the combined card 1210, each card pattern associated with the ten possible cards to be used for five card draw video poker. FIG. 11C shows the daubed versions of the combined card 1210 with the cards pattern areas overlaid. The EGM may include a card key in memory associating all possible 8-square patterns with the 52 cards in a deck and any wilds used in the game. A portion of such a card key 1250 is illustrated in FIG. 12D. In some embodiments, duplicate patterns may be handled by the EGM replacing the second instance of the card with the next card in order. In some embodiments, duplicate patterns may be handled by the EGM replacing the card with the card contained in a next column. The pattern for each card in the areas may be compared to the card key to select the card to display. For example, using the card key portion 1250 card 1's pattern may be associated with the six of spades and card 3's pattern may be associated with the six of clubs. FIG. 12D shows a game display 1251 with the five cards displayed to the player. In this manner, the player may experience a video poker game provided by a ball drop or draw as used in Class II gaming from the common numbers 1200.

Figure 13A:
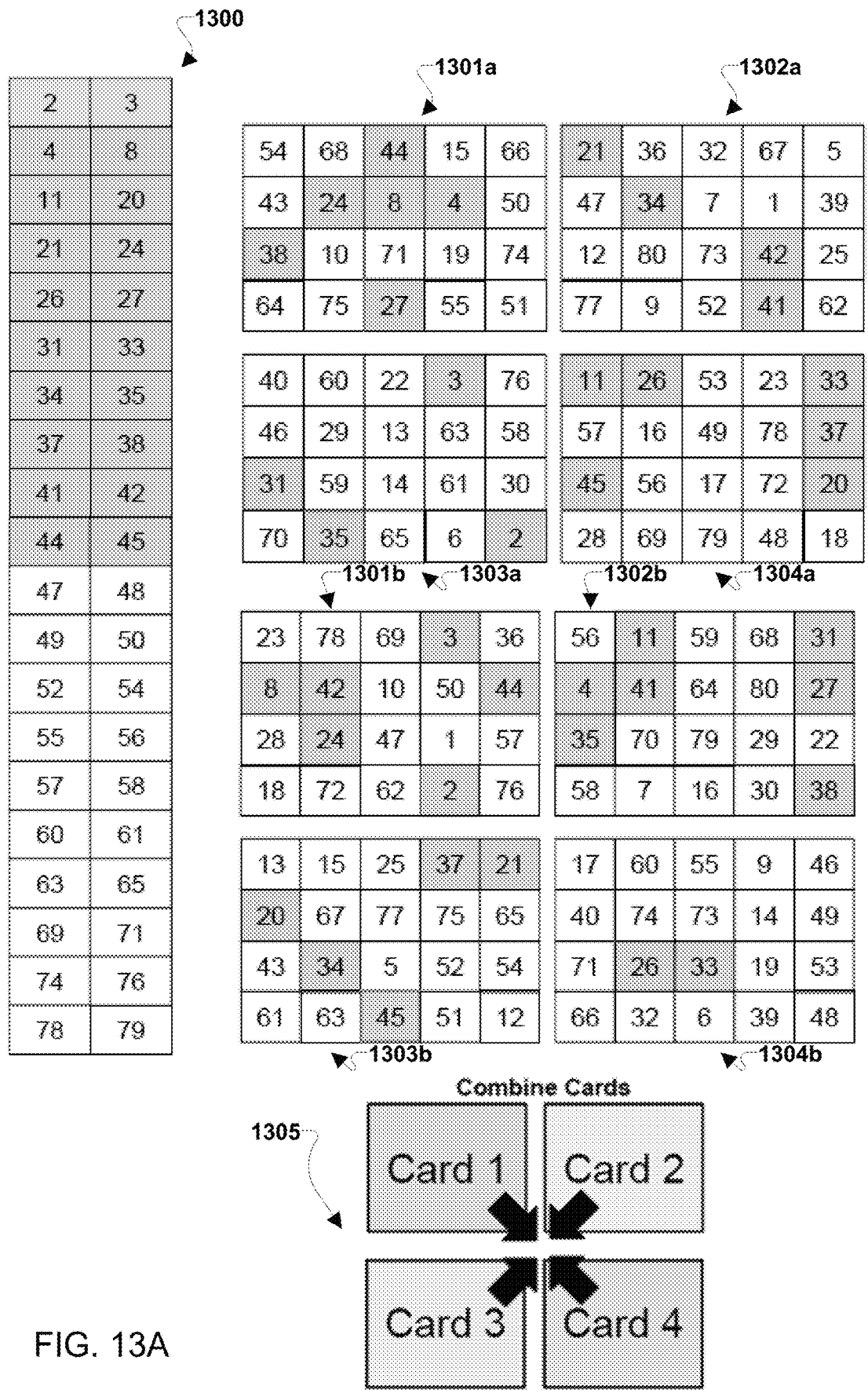
Figure 13B:
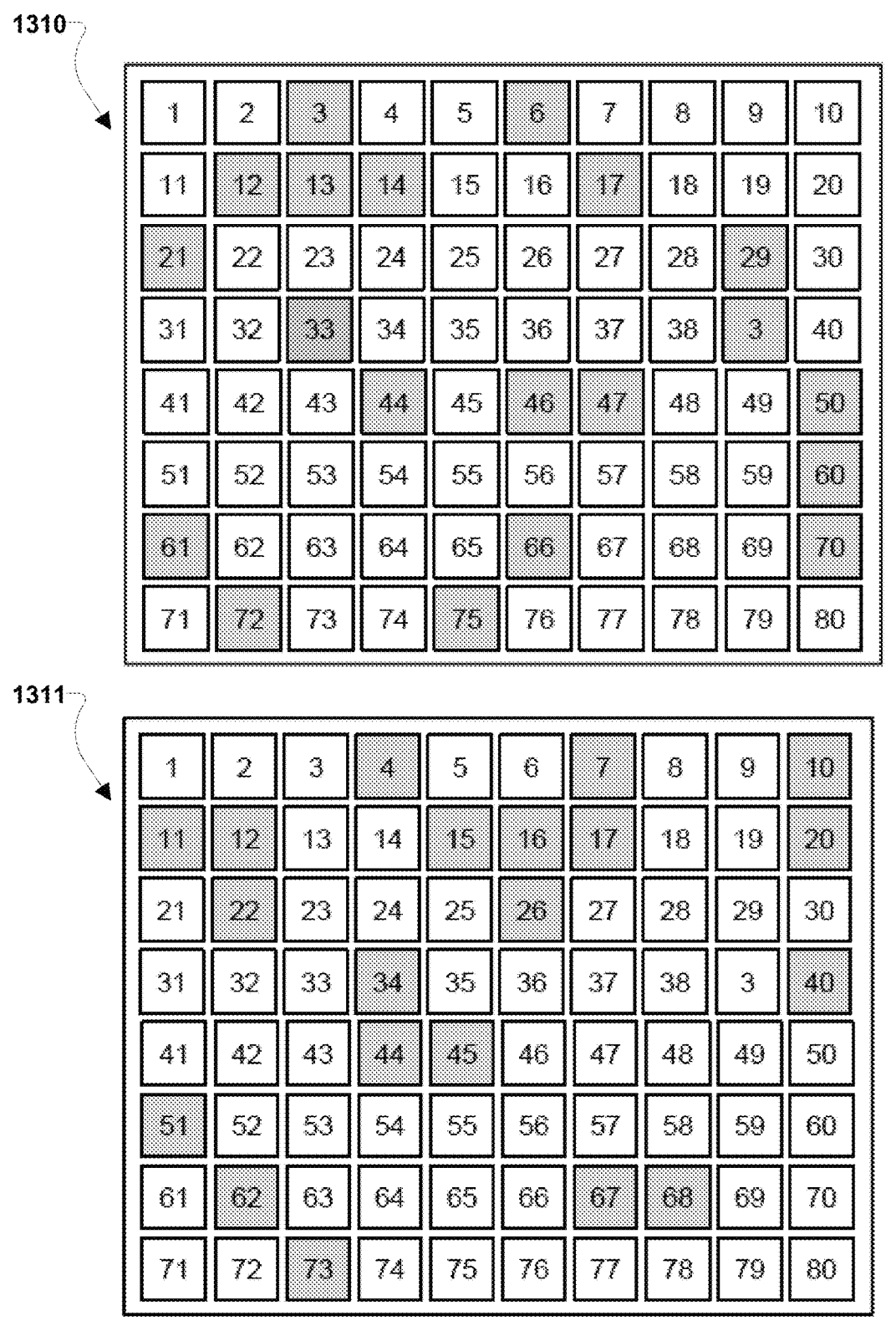

FIGS. 13A and 13B illustrate a keno game based on machine mapping of ball drop patterns according to an embodiment. Various operations of methods 100, 200, 300, and/or 401 described above may be executed by one or more servers and/or one or more computing devices (e.g., EGMs) to provide the keno game illustrated in FIGS. 13A and 13B. FIGS. 13A and 13B show a sequence of graphics of a portion of a play through of a keno game on two EGMs. In the game, machine mapping is used to determine keno results to display.

Referring to FIG. 13A, at the start of the game a server may randomly pick common numbers 1300 for use by all EGMs offering a game at that time. The randomly picked common numbers 1300 may represent a ball drop or draw as used in Class II gaming. Each EGM may have a set of four randomly populated cards, such as cards 1301a, 1302b, 1303c, and 1303d for a first EGM and a set of cards 1301b, 1302b, 1303c, and 1304d for a second EGM. There may be sets for each EGM playing at the time, and the number of playing EGMs may be any number of EGMs. The set of cards 501 may include four cards 501a, 501b, 501c, and 501d. The set of cards 502 may include four cards 502a, 502b, 502c, and 502d. The cards 1301a, 1302b, 1303c, 1303d, 1301b, 1302b, 1303c, and 1304d may be unique bingo type cards. The server may provide the common numbers 1300 to each EGM and the EGMs may daub the selected corresponding numbers on their respective cards 1301a, 1302b, 1303c, 1303d, 1301b, 1302b, 1303c, and 1304d. At each EGM, the cards for that respective EGM may be combined into a common card 1305 (i.e., cards 1301a, 1302b, 1303c, and 1303d combined into a common card at a first EGM and the cards 1301b, 1302b, 1303c, and 1304d combined into a common card at a second EGM. As shown in FIG. 13B the common card 1305 for each EGM may be used by that EGM to reflect the results of Keno in its respective display 1310 for the first EGM and 1311 for the second EGM. In this manner, the player may experience a keno game provided by a ball drop or draw as used in Class II gaming from the common numbers 1300.

FIGS. 14A, 14B, 15A, 15B, 16A, 16B, and 16C illustrate game ending pattern implementations according to various embodiments. In various embodiments, selected areas on a Class II machine bingo card and a pattern key may be used to determine a game ending pattern (GEP) winner with every ball drop. This may alleviate two rare but serious problems with existing systems. First, if no game has a GEP, number can be drawn one at a time until a game wins or a GEP is completed. This slows down rate of play and limits daily coin in with existing systems. Second, any particular game can actually get no hits from the numbers drawn which leads to creating an unsatisfying player experience and reduced player retention with existing systems. Using the embodiment GEP methods depicted in FIGS. 14A, 14B, 15A, 15B, 16A, 16B, and 16C, a GEP winner may be predetermined with every new ball drop and using the machine mapping of the various embodiments cards may always have winning numbers, thereby increasing both player retention and player satisfaction. Various operations of methods 100, 200, 300, and/or 401 described above may be executed by one or more servers and/or one or more computing devices (e.g., EGMs) to provide the GEP methods illustrated in FIGS. 14A, 14B, 15A, 15B, 16A, 16B, and 16C.

Figure 14A:
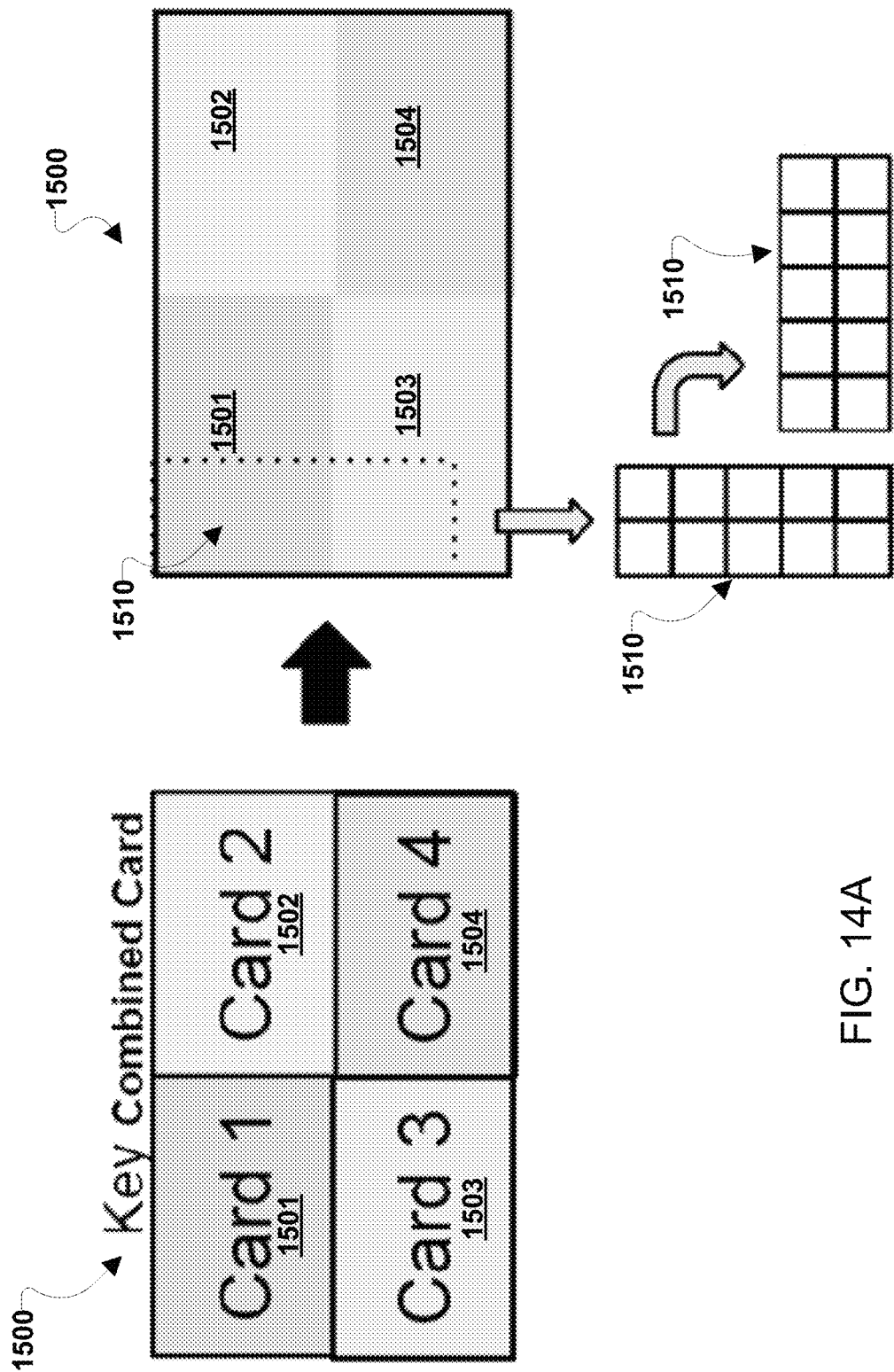
FIGS. 14A, 14B, 15A, 15B, 16A, 16B, and 16C illustrate game ending pattern implementations according to various embodiments.
Figure 14B:
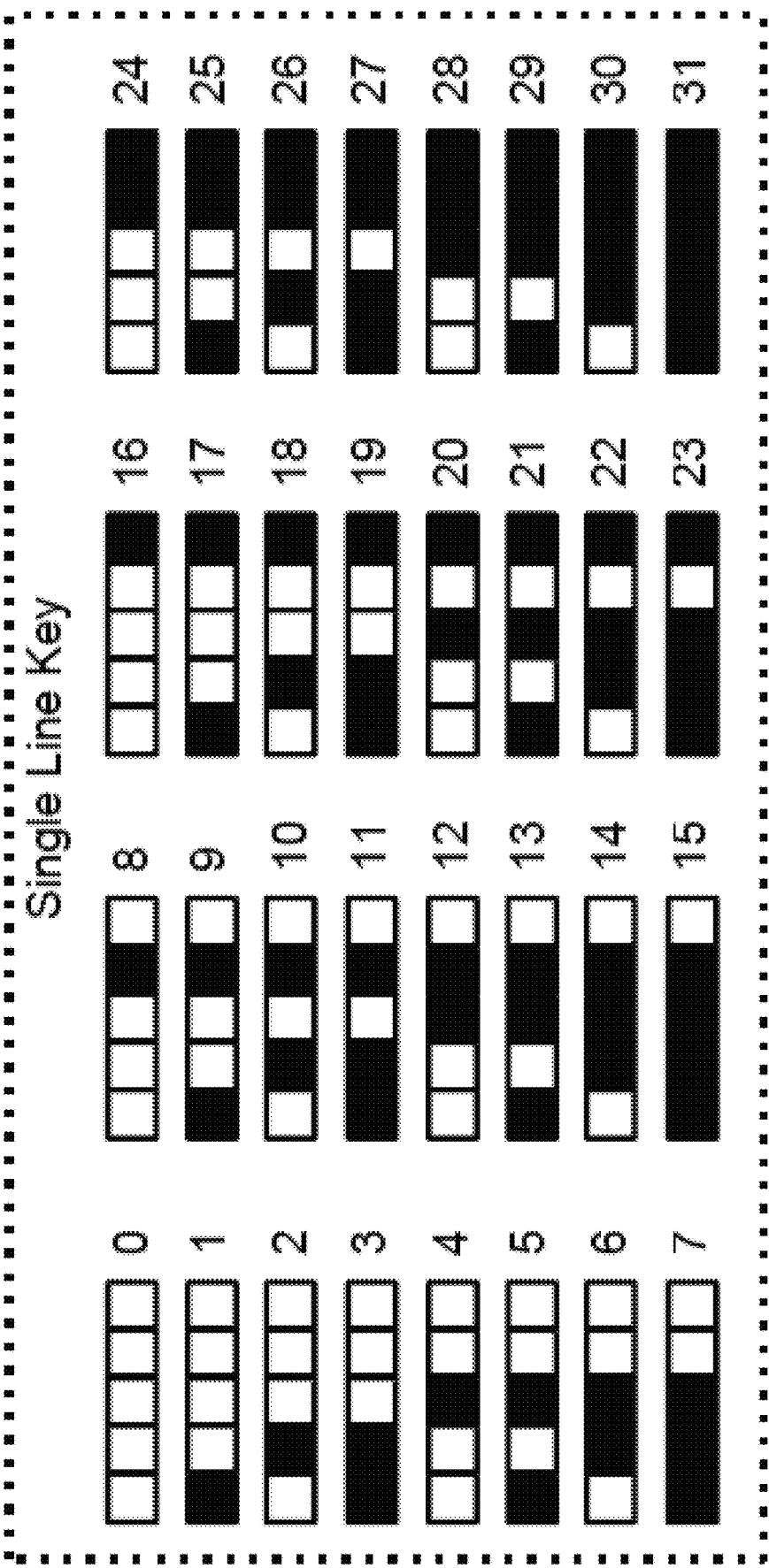

FIG. 14A illustrates the area 1510 of a combined card 1500 formed from cards 1501, 1502, 1503, and 1504 used to create a GEP. The area 1510 may be rotated ninety degrees and the resulting patterns compared to GEP patterns, such as single line key patterns shown in FIG. 14B. The single line key patterns may each have a numerical result value assigned, such as 1-31 points value. The two lines combined score from the area 1510 on each combined card 1500 may be used to determine that EGM's GEP score. The EGM with the highest GEP score may be the winner that round assuming no game wins resulting in the need to use a GEP to select a winner.

Figure 15A:
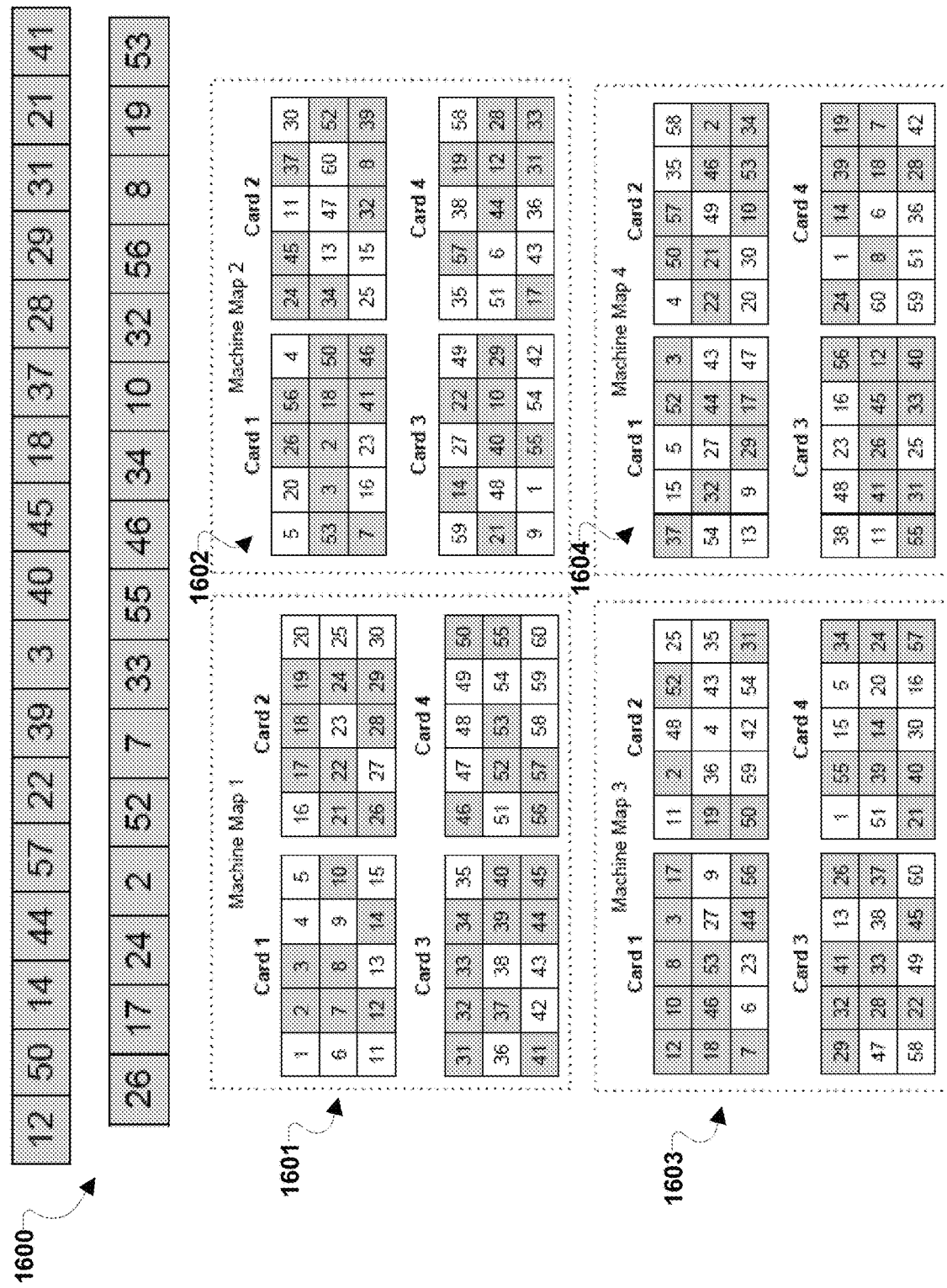
Figure 15B:
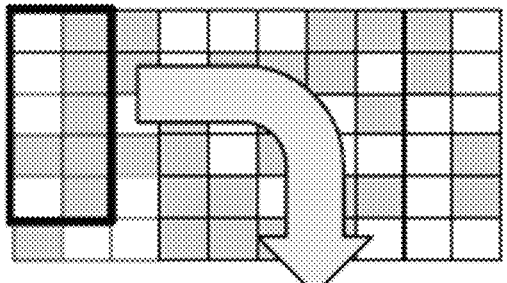
Figure 15B:
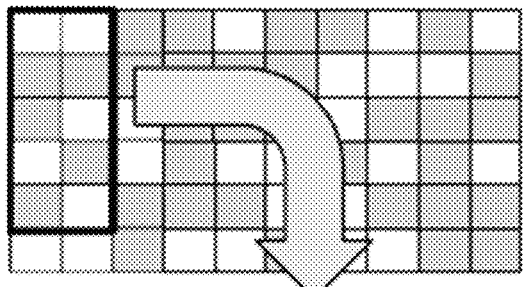
Figure 15B:
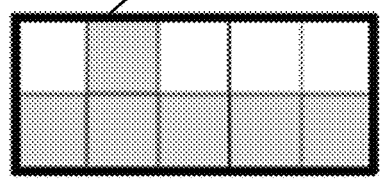
Figure 15B:
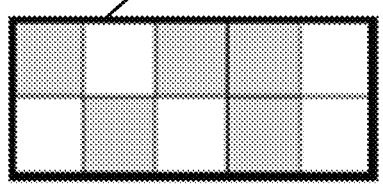
Figure 15B:
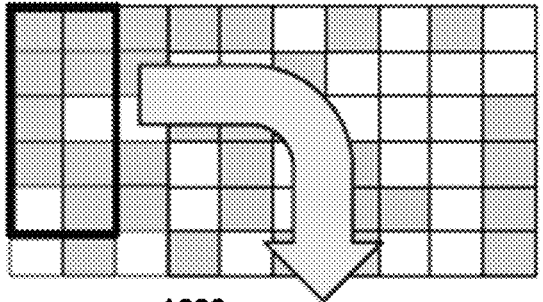
Figure 15B:
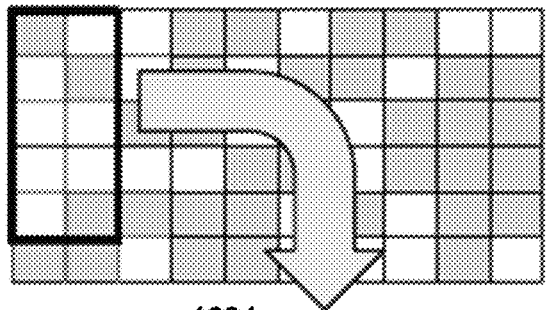
Figure 15B:
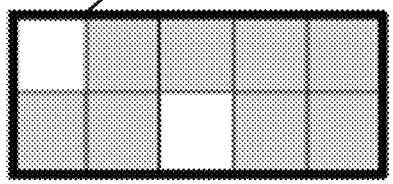
Figure 15B:
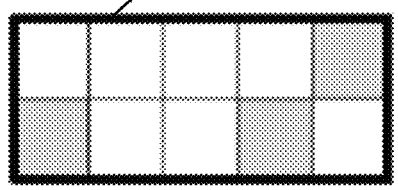

FIG. 15A illustrates a four EGM play through using a GEP as described above with reference to FIGS. 14A and 14B. At the start of the game a server may randomly pick common numbers 1600 for use by all EGMs offering a game at that time. The randomly picked common numbers 1600 may represent a ball drop or draw as used in Class II gaming. The selected common numbers 1600 may be used to daub locations on sets of four machine map cards 1601, 1602, 1603, and 1604 at each of the respective four EGMs playing the game. In FIG. 15B the common cards 1621, 1622, 1623, and 1624 formed at each EGM respectively from that EGM's respective set of four machine map cards 1601, 1602, 1603, 1604 is illustrated with the areas 1631, 1632, 1633, and 1634 selected and rotated ninety degrees for each respective EGM. The GEP score for each machine may be determined based on the resulting point value for each line of the areas 1631, 1632, 1633, and 1634 for that machine using a single line key pattern, such as the single line key pattern shown in FIG. 14B. In this example, the first EGM may have a GEP score of 33, the second EGM may have a GEP score of 23, the third EGM may have a GEP score of 57, and the fifth EGM may have a GEP score of 25. As the third EGM has the highest GEP score of 57, the third EGM would win should the GEP be needed to determine a winner that round.

Figure 16A:
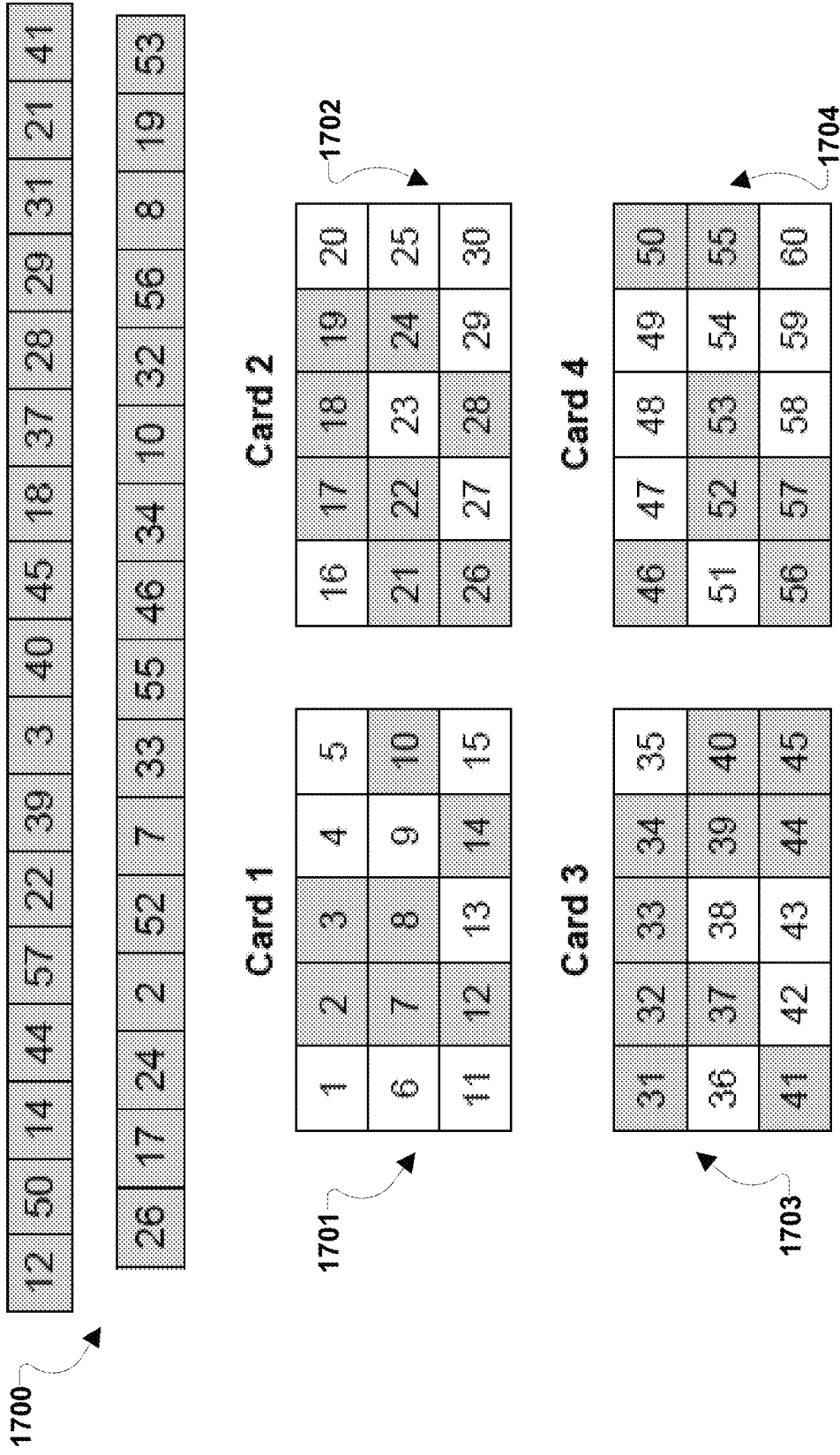
Figure 16B:
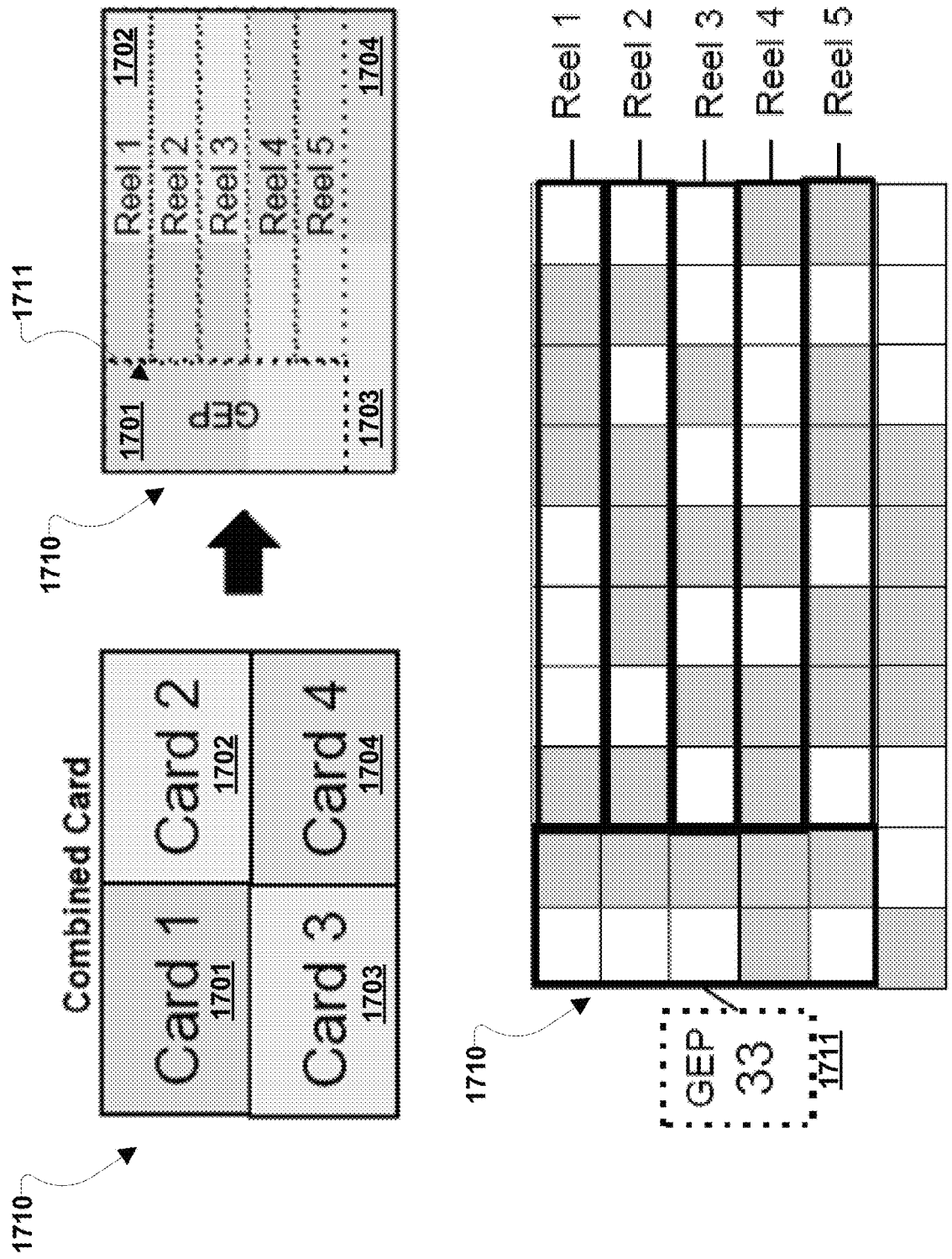
Figure 16C:
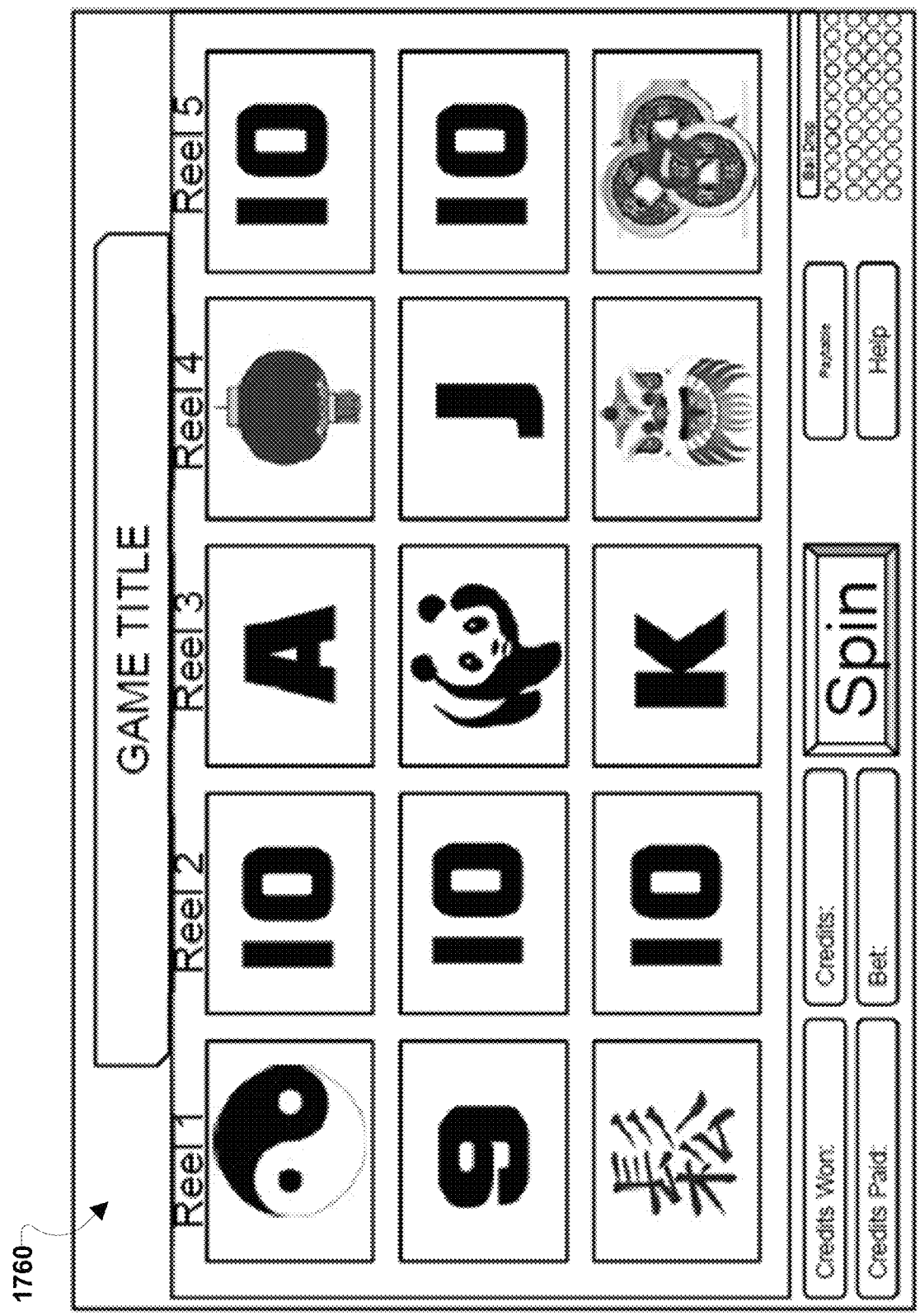

FIGS. 16A, 16B, and 16C a single machine play through of using a GEP 1711 on a common card 1710 to select a winner for a reel game. At the start of the game a server may randomly pick common numbers 1700 for use by all EGMs offering a game at that time. The randomly picked common numbers 1700 may represent a ball drop or draw as used in Class II gaming. The selected common numbers 1700 may be used to daub locations on a set of four machine map cards 1701, 1702, 1703, and 1704 at the EGM playing the game. In FIG. 17B the common card 1710 formed at the EGM from that EGM's four machine map cards 1701, 1702, 1703, 1704 is illustrated with the areas GEP 1711 selected and reel areas for reels 1-5 overlaid on the common card 1710. The score for the GEP area may be determined using a single key line pattern, such as the single key line pattern shown in FIG. 14B. FIG. 16C illustrates the game display 1760 of the reels displayed on the EGM using the reel areas for reels 1-5. Though no pay line may have hit in display 1760 or the displays of other players that round, the player of the EGM with display 1760 may be declared the winner if the score of 33 for the GEP 1711 is the highest among all players that round.

FIGS. 17A, 17B, 17C, 17D, and 18 illustrate poker games based on machine mapping of ball drop patterns according to various embodiments. Various operations of methods 100, 200, 300, and/or 401 described above may be executed by one or more servers and/or one or more computing devices (e.g., EGMs) to provide the poker games illustrated in FIGS. 17A, 17B, 17C, 17D, and 18. FIGS. 17A, 17B, 17C, 17D, and 18 show a sequence of graphics of a portion of a play through of a different poker games. In the games, machine mapping is used to determine cards to display.

Figure 17A:
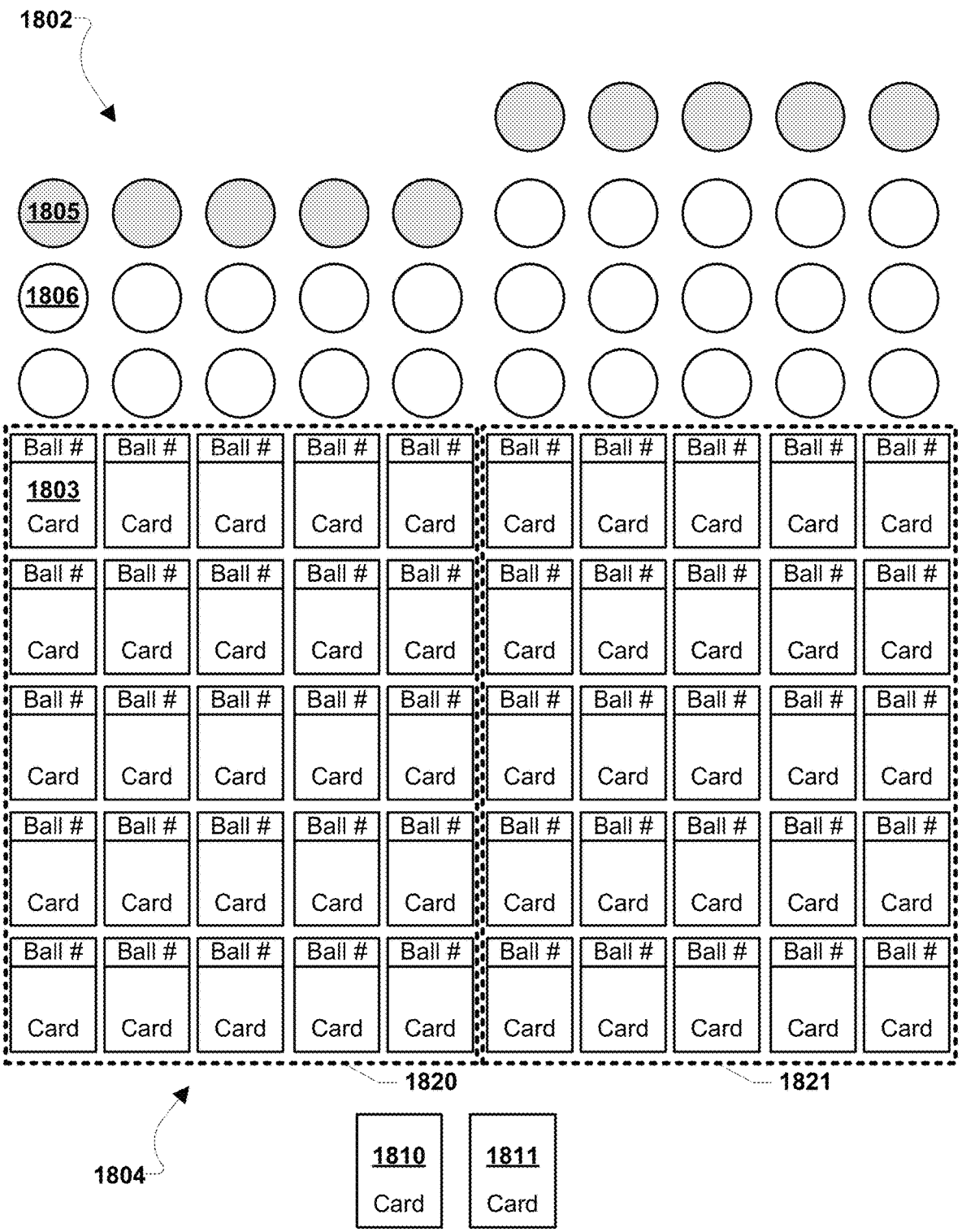
Figure 17B:
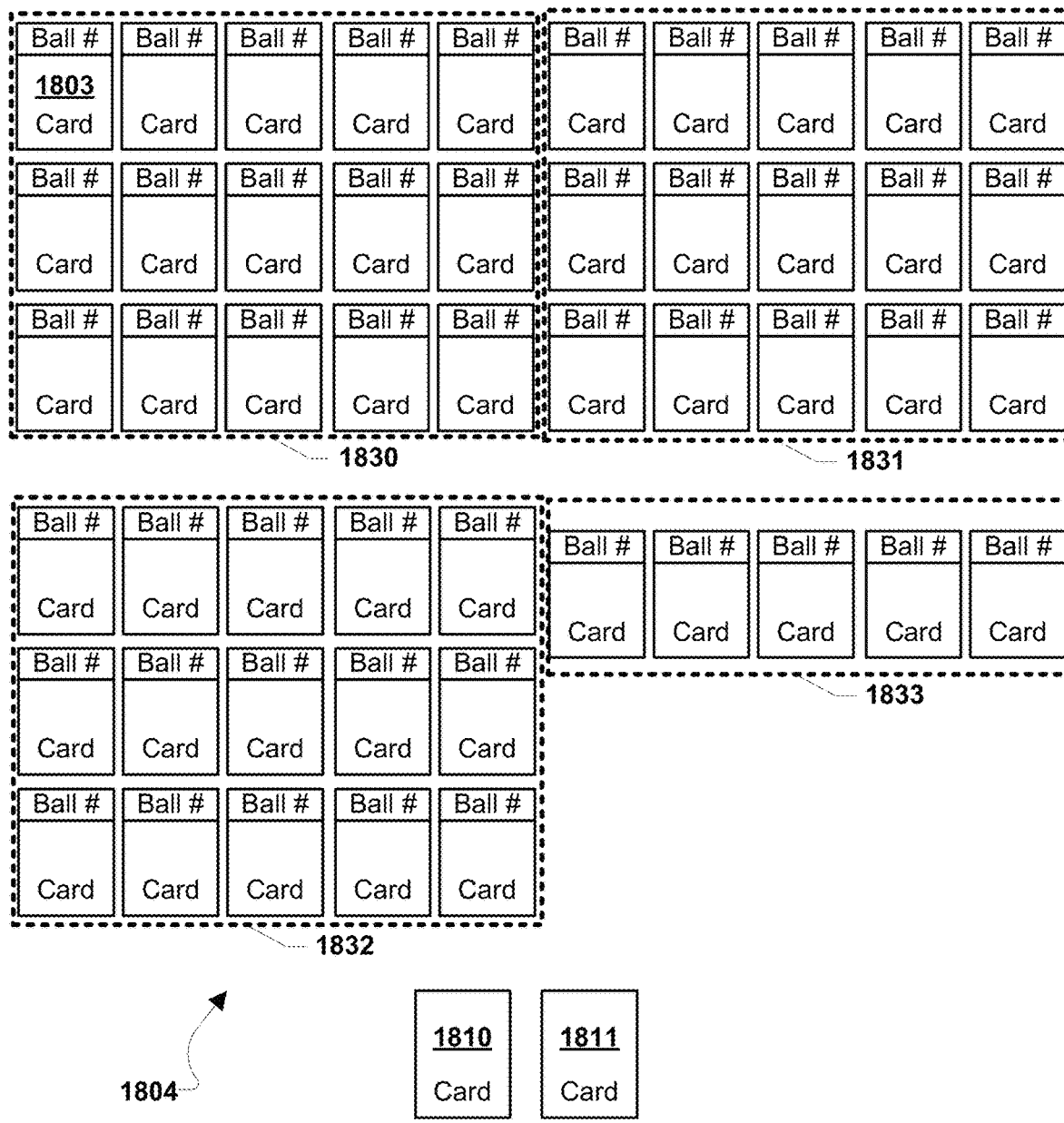
Figure 17C:
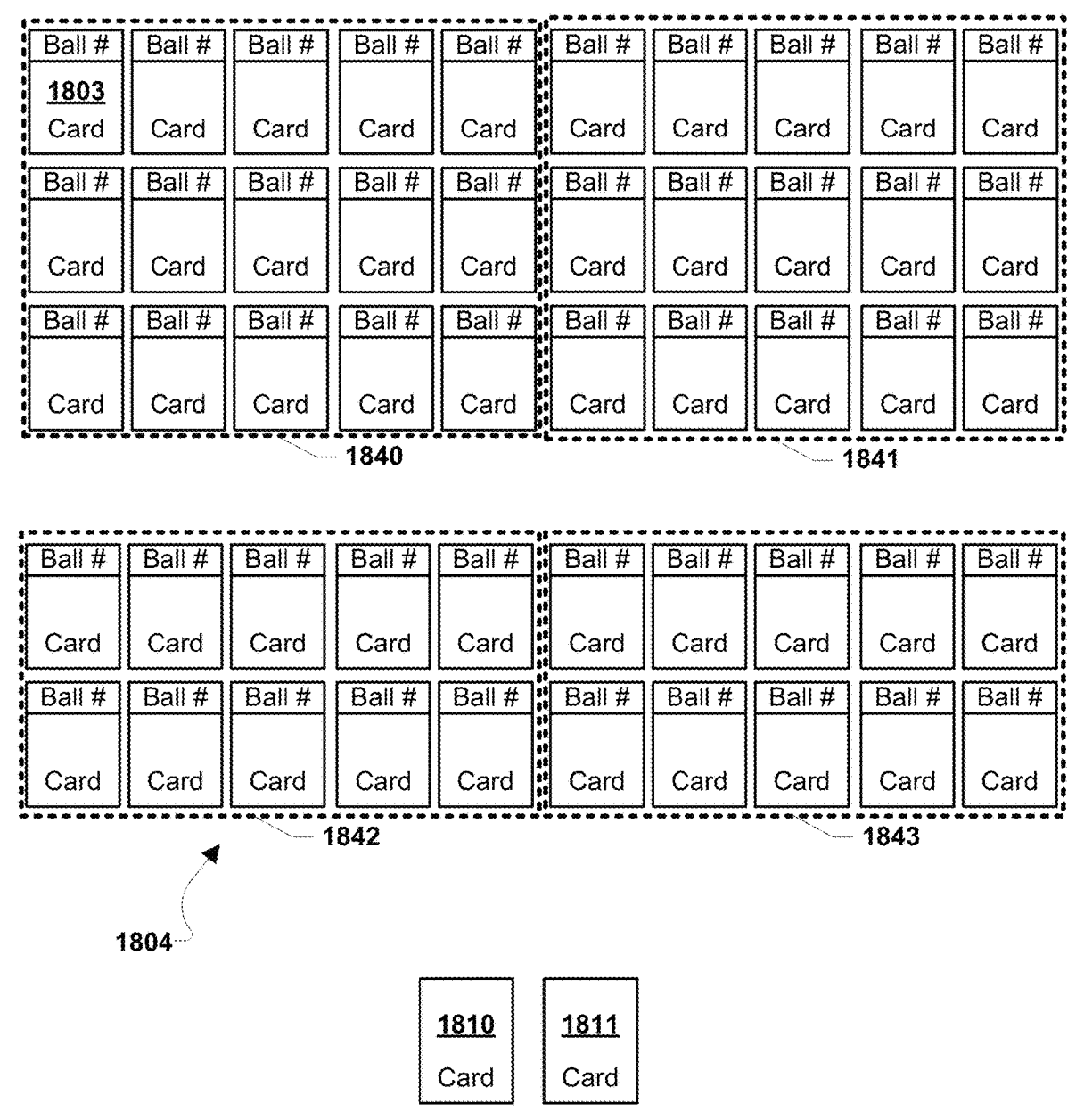
Figure 17D:
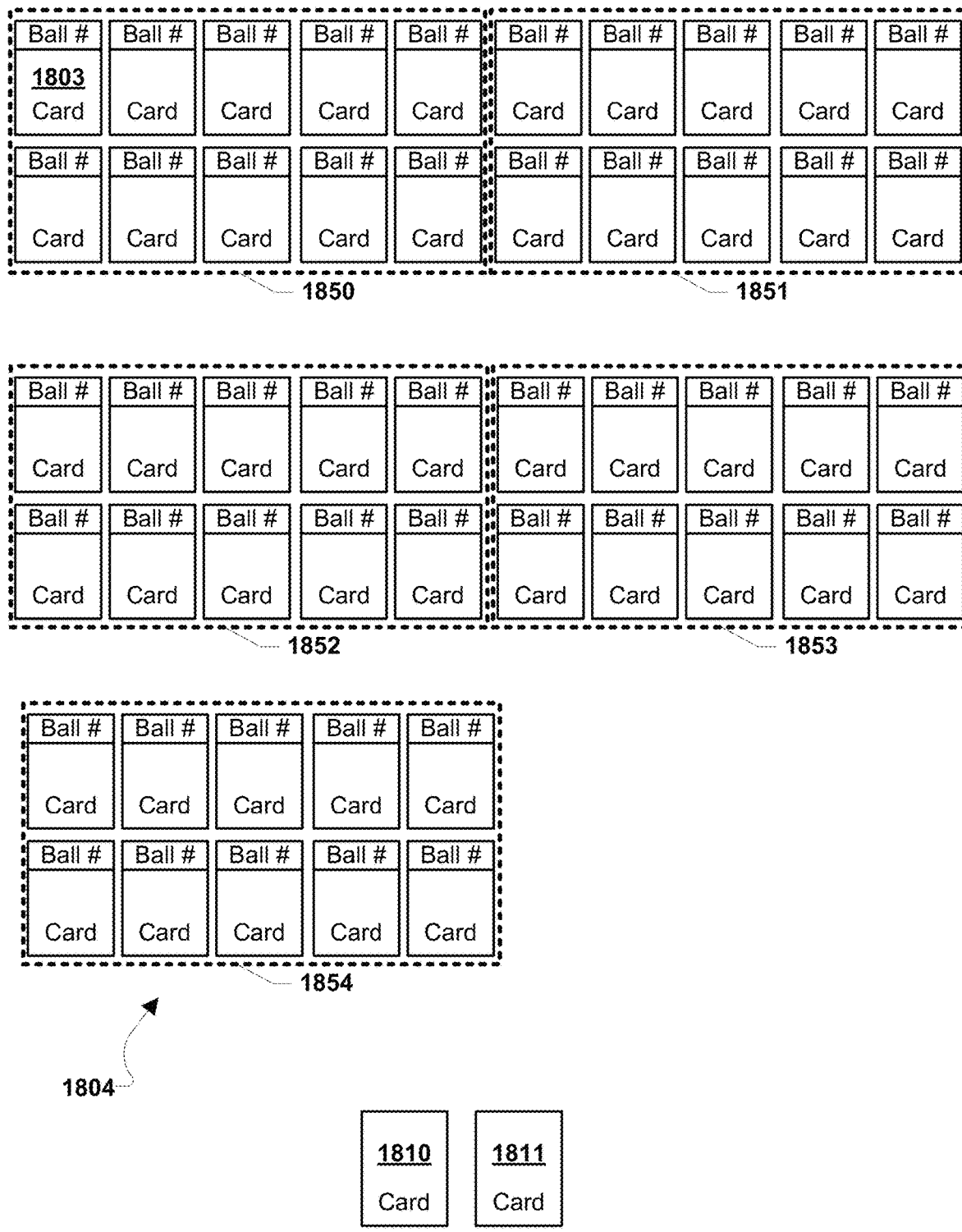

FIG. 17A illustrates a set of balls 1802 resulting from a ball drop or draw as used in Class II gaming. For example, the set of balls may include 25 regular play balls 1806 and up to 10 bonus play balls 1805 that a player may purchase. A set of bingo cards 1804, such as two bingo cards 1820 and 1821, may be daubed based on the set of balls 1802. The bingo cards 1820 and 1821 may be 5×5 cards populated with fifty of the fifty two cards in a deck of playing cards, and each playing card value may be associated with a ball number on the bingo cards 1820 and 1821. For example, playing card 1803 may be the seven of clubs associated with ball number 2. If a 2 is in the set of balls 1802 (either as a regular play ball 1806 or bonus play ball 1805 purchased by the player), the playing card 1803 may be daubed. The player is given the two remaining playing cards 1810 and 1811 in the deck which are displayed as the player's hold cards. The wins and payout amounts for the player may be based on the pay table for the game which may reflect values for poker hands that may be made by the player using the hold cards 1810 and 1811 and the daubed cards. In this manner a Class II hold'em poker game may be presented to the player. FIG. 17B illustrates a variation of the game from FIG. 17A in which the set of bingo cards 1804 is four cards 1830, 1831, 1832, and 1833. Cards 1830, 1831, and 1832 may be 3×5 bingo cards and card 1833 may be a single line bonus card. FIG. 17C illustrates a variation of the game from FIG. 17A in which the set of bingo cards 1804 is four cards 1840, 1841, 1842, and 1843. Cards 1840 and 1841 may be 3×5 bingo cards and cards 1842 and 1843 may be a 2×5 bonus cards. FIG. 17D illustrates a variation of the game from FIG. 17A in which the set of bingo cards 1804 is five 2×5 bingo cards 1850, 1851, 1852, 1853, and 1854.

Figure 18:
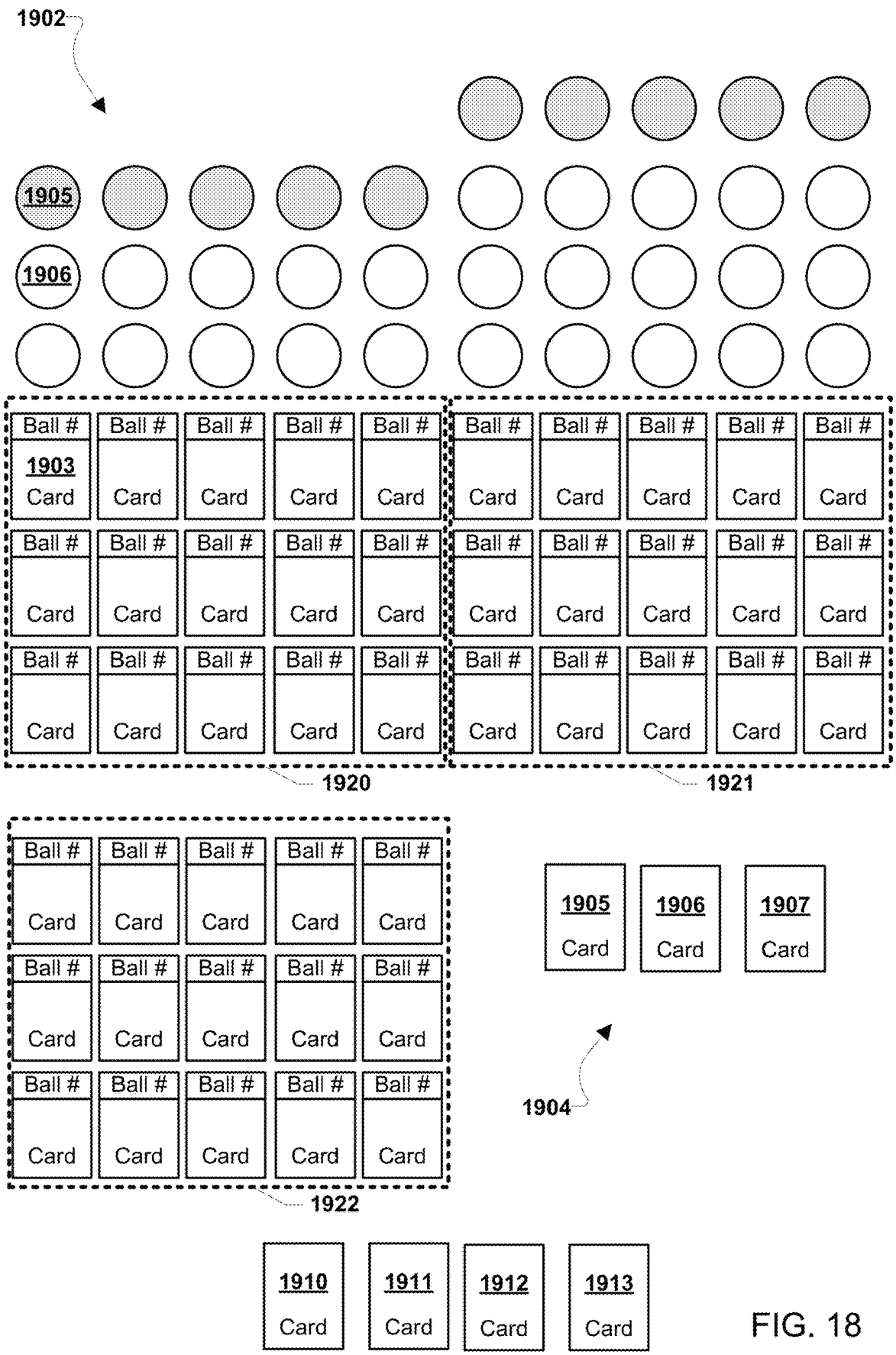

FIG. 18 illustrates an Omaha poker high-low game similar to the hold'em games illustrated in FIGS. 17A, 17B, 17C, and 17D. FIG. 18 illustrates a set of balls 1902 resulting from a ball drop or draw as used in Class II gaming. For example, the set of balls may include 25 regular play balls 1906 and up to 10 bonus play balls 1905 that a player may purchase. A set of bingo cards, such as three bingo cards 1920, 1921, and 1922 may be daubed based on the set of balls 1902. The bingo cards 1920, 1921, and 1922 may be 3×5 cards populated with forty five of the fifty two cards in a deck of playing cards, and each playing card value may be associated with a ball number on the bingo cards 1920, 1921, and 1922. For example, playing card 1903 may be the seven of clubs associated with ball number 2. If a 2 is in the set of balls 1902 (either as a regular play ball 1906 or bonus play ball 1905 purchased by the player), the playing card 1903 may be daubed. A set of discard cards 1904 may include three cards 1905, 1906, 1907 and the player may be dealt four cards 1910, 1911, 1912, and 1913. The four cards 1910, 1911, 1912, and 1913 may be displayed as the player's cards. The wins and payout amounts for the player may be based on the pay table for the game which may reflect values for poker hands that may be made by the player using the hold cards 1910, 1911, 1912, and 1913 and the daubed cards. In this manner a Class II Omaha poker game may be presented to the player.

In a similar manner as described above with reference to FIGS. 17A, 17B, 17C, 17D, and 18, other poker games may be presented to a player, such as pigskin poker in which winning card hands determine a random football play yardage in efforts to win a progressive jackpot.

While described above with general reference to providing new reel games, existing non-Class II games (e.g., existing Class III) games may be converted to Class II games according to the various embodiments by using the machine mapping of the various embodiments to control the reels displayed in those games. For example, mapping the reel stops used in a current Fish'n Reels Class III game to reel stop key patterns or reel pattern keys as described above (e.g., 770, 775, 829, 930, 1030, etc.) may enable a ball drop or draw as used in Class II gaming to daub positions on a set of bingo cards that may be used with the reel stop key patterns or reel pattern keys to select and output reel symbols. In this manner, the player may experience the same game play he or she was used to on a Class III game (e.g., Fish'n Reels), but the game may comply with Class II gaming requirements.

Figure 19:
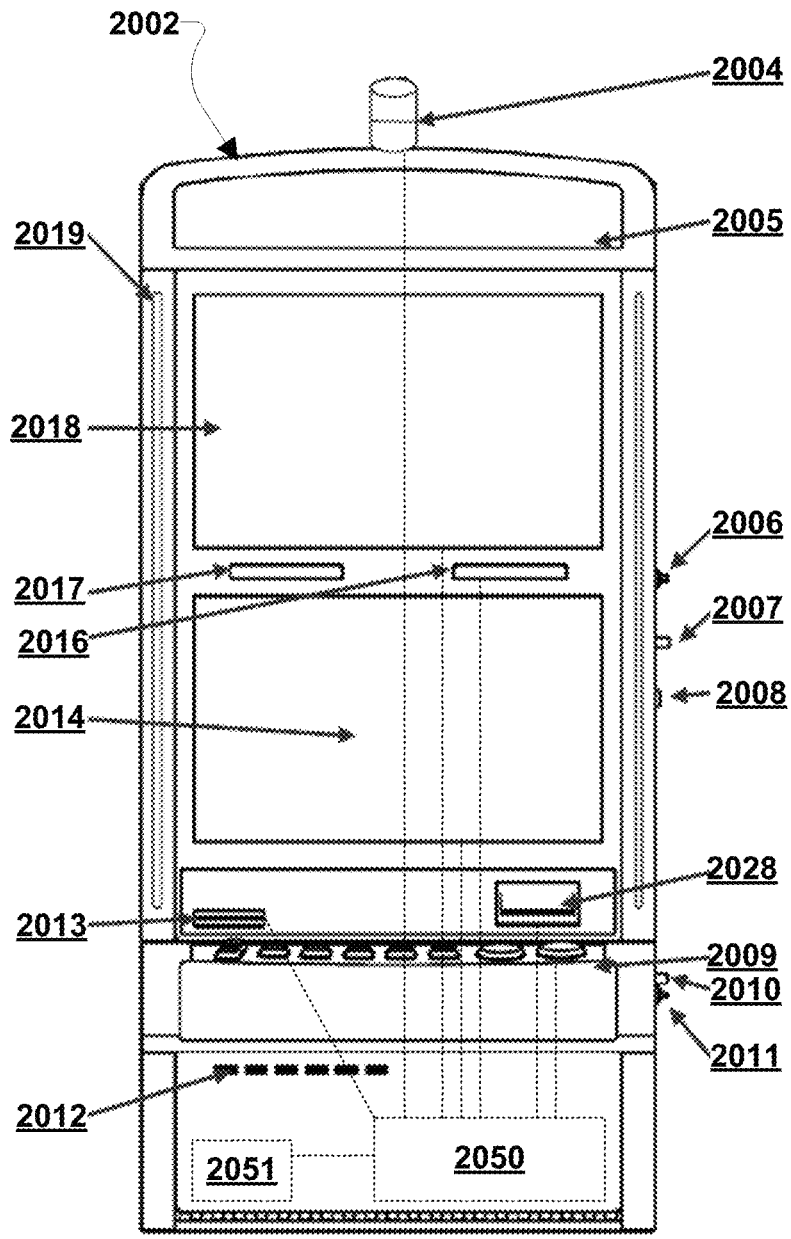
FIG. 19 is a component block diagram of an electronic gaming machine suitable for use in the various embodiments.

The various embodiment methods may also be performed partially or completely on a computing device, such as an electronic gaming machine (EGM) 2002 illustrated in FIG. 19. Such an EGM 2002 may include a housing including a candle light tower 2004, LED trim 2019, top box art 2005, door latch 2007, door lock 2006, key switch panel 2008, bill validator 2028, button panel 2009, belly door latch 2010, belly door lock 2011, meters 2012, printer 2013, lower display 2014 (e.g., a LCD touch screen), upper display 2018 (e.g., LCD touch screen), and speakers 2017. The EGM 2002 may include a processor 2050 coupled to various memories (e.g., volatile and nonvolatile). The processor 2050 may be connected to one or more of the candle light tower 2004, LED trim 2019, top box art 2005, door latch 2007, door lock 2006, key switch panel 2008, bill validator 2028, button panel 2009, belly door latch 2010, belly door lock 2011, meters 2012, printer 2013, lower display 2014, upper display 2018, speakers 2017, and/or other components of the EGM 2002 to control the operations of the EGM 2002 to provide various games to a player. The processor 2050 may be any programmable microprocessor, microcomputer or multiple processor chip or chips that may be configured by software instructions (applications) to perform a variety of functions, including the functions of the various embodiments described above. Typically, software applications may be stored in the internal memory before they are accessed and loaded into the processor 2050. The processor 2050 may include internal memory sufficient to store the application software instructions. The EGM 2002 may also include network access ports 2051 coupled to the processor 2050 for establishing data connections with a network, such as a network of electronic gaming machines, servers, and other computing devices in one or more gaming establishments.

Figure 20:
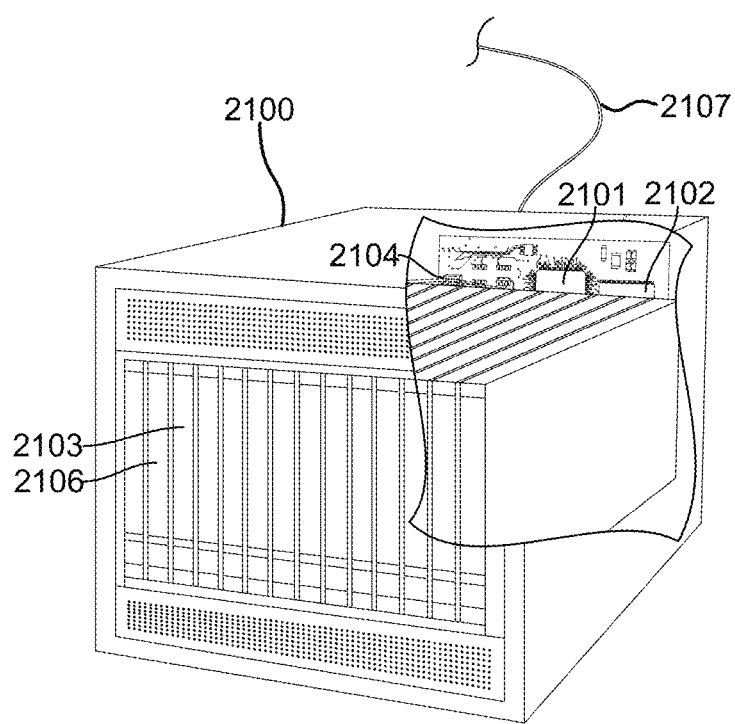
FIG. 20 is a component block diagram of a server suitable for use in the various embodiments.

The various embodiment methods may also be performed partially or completely on a server. Such embodiments may be implemented on any of a variety of commercially available server devices, such as the server 2100 illustrated in FIG. 20. Such a server 2100 typically includes a processor 2101 coupled to volatile memory 2102 and a large capacity nonvolatile memory, such as a disk drive 2103. The server 2100 may also include a floppy disc drive, compact disc (CD) or DVD disc drive 2106 coupled to the processor 2101. The server 2100 may also include network access ports 2104 coupled to the processor 2101 for establishing data connections with a network 2107, such as a network of electronic gaming machines and other computing devices in one or more gaming establishments. The processor 2101 may be any programmable microprocessor, microcomputer or multiple processor chip or chips that may be configured by software instructions (applications) to perform a variety of functions, including the functions of the various embodiments described above. Typically, software applications may be stored in the internal memory 2102, 2103 before they are accessed and loaded into the processor 2101. The processor 2101 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An electronic gaming machine configured for use by a casino, comprising:
   a housing;
   a display; and
   a processor within the housing and connected to the display, the processor configured with processor executable instructions to perform operations comprising:
      mapping a set of common numbers received via a network data connection from a server to a unique machine map of bingo cards to daub positions on the machine map of bingo cards, wherein the unique machine map of bingo cards comprises a plurality of row and column positions defined in a memory each associated with its own respective number;
      combining at least one position from each bingo card of the unique machine map of bingo cards to create one or more block pattern cards in response to daubing the positions on the machine map of bingo cards, each of the one or more block pattern cards having a respective randomized pattern of daubing;
      selecting symbols of a game of chance that are associated with patterns in a key stored in the memory that correspond to the randomized patterns of daubing of the one or more block pattern cards; and
      outputting the game of chance on the display based at least in part on the selected symbols of the game of chance.

2. The electronic gaming machine of claim 1, wherein the set of common numbers are determined based on a Class II gaming ball drop.

3. The electronic gaming machine of claim 2, wherein the ball drop is a common server ball drop.

4. The electronic gaming machine of claim 2, wherein the selected symbols of the game of chance are one or more reel strip symbols, each of the one or more reel strip symbols corresponding to one or more of the respective randomized patterns of daubing on the one or more block pattern cards.

5. The electronic gaming machine of claim 1, wherein the unique machine map of bingo cards is a map of four or more bingo cards.

6. The electronic gaming machine of claim 1, wherein the selected symbols of the game of chance are playing card values, reel stops, reel symbols, or keno numbers and the unique machine map of bingo cards is a map of a number of bingo cards different than a number of symbols that are the playing card values, reel stops, reel symbols, or keno numbers available for play in the game of chance.

7. The electronic gaming machine of claim 1, wherein the game of chance is a poker game, a keno game, a reel game, or a bingo game.

8. The electronic gaming machine of claim 1, wherein the processor is configured with processor executable instructions to perform operations further comprising evaluating a game ending pattern from the unique machine map of bingo cards to determine a winner.

9. The electronic gaming machine of claim 1, wherein the processor is configured with processor executable instructions to perform operations further comprising:
   receiving an indication of a player input associated with the selected symbols of the game of chance after outputting the game of chance on the display based at least in part on the selected symbols of the game of chance;
   in response to receiving the indication of the player input associated with the selected symbols of the game of chance, mapping a second set of common numbers to a second unique machine map of bingo cards to create additional block pattern cards having new randomized patterns of daubing; and
   outputting the game of chance on the display based at least in part on the additional block pattern cards.

10. A method for playing a Class II game on an electronic gaming machine configured for use by a casino and including a housing, a display, and processor within the housing and connected to the display, the method comprising:
    mapping a set of common numbers received via a network data connection from a server to a unique machine map of bingo cards to daub positions on the machine map of bingo cards, wherein the unique machine map of bingo cards comprises a plurality of row and column positions defined in a memory each associated with its own respective number;
    combining at least one position from each bingo card of the unique machine map of bingo cards to create one or more block pattern cards in response to daubing the positions on the machine map of bingo cards, each of the one or more block pattern cards having a respective randomized pattern of daubing;
    selecting symbols of a game of chance that are associated with patterns in a key stored in the memory that correspond to the randomized patterns of daubing of the one or more block pattern cards; and
    outputting the game of chance on a display of an electronic gaming machine based at least in part on the selected symbols of the game of chance.

11. The method of claim 10, wherein the set of common numbers are determined based on a Class II gaming ball drop.

12. The method of claim 11, wherein the ball drop is a common server ball drop.

13. The method of claim 11, wherein the selected symbols of the game of chance are one or more reel strip symbols, each of the one or more reel strip symbols corresponding to one or more of the respective randomized patterns of daubing on the one or more block pattern cards.

14. The method of claim 10, wherein the unique machine map of bingo cards is a map of four or more bingo cards.

15. The method of claim 10, wherein the selected symbols of the game of chance are playing card values, reel stops, reel symbols, or keno numbers and the unique machine map of bingo cards is a map of a number of bingo cards different than a number of symbols that are the playing card values, reel stops, reel symbols, or keno numbers available for play in the game of chance.

16. The method of claim 10, wherein the game of chance is a poker game, a keno game, a reel game, or a bingo game.

17. The method of claim 10, further comprising evaluating a game ending pattern from the unique machine map of bingo cards to determine a winner.

18. The method of claim 10, further comprising:
receiving an indication of a player input associated with the selected symbols of the game of chance after outputting the game of chance on the display of the electronic gaming machine based at least in part on the selected symbols of the game of chance;
in response to receiving the indication of the player input associated with the selected symbols of the game of chance, mapping a second set of common numbers to a second unique machine map of bingo cards to create additional block pattern cards having new randomized patterns of daubing; and
outputting the game of chance on the display of the electronic gaming machine based at least in part on the additional block pattern cards.

\* \* \* \* \*